(12) United States Patent
Taylor-Pashow et al.

(10) Patent No.: US 9,597,658 B2
(45) Date of Patent: Mar. 21, 2017

(54) METAL-ORGANIC FRAMEWORK TEMPLATED SYNTHESIS OF POROUS INORGANIC MATERIALS AS NOVEL SORBENTS

(71) Applicants: Kathryn M. L. Taylor-Pashow, Aiken, SC (US); Wenbin Lin, Chicago, IL (US); Carter W. Abney, Chicago, IL (US)

(72) Inventors: Kathryn M. L. Taylor-Pashow, Aiken, SC (US); Wenbin Lin, Chicago, IL (US); Carter W. Abney, Chicago, IL (US)

(73) Assignees: Savannah River Nuclear Solutions, LLC, Aiken, SC (US); University of North Carolina-Chapel Hill, Chapel Hill, NC (US); University of Chicago, Chicago, IL (US)

( * ) Notice: Subject to any disclaimer, the term of this patent is extended or adjusted under 35 U.S.C. 154(b) by 233 days.

(21) Appl. No.: 14/242,087

(22) Filed: Apr. 1, 2014

(65) Prior Publication Data
US 2014/0319058 A1  Oct. 30, 2014

Related U.S. Application Data

(60) Provisional application No. 61/807,010, filed on Apr. 1, 2013.

(51) Int. Cl.
| | |
|---|---|
| *B01J 20/30* | (2006.01) |
| *B01J 20/02* | (2006.01) |
| *B01J 20/06* | (2006.01) |
| *G21F 9/12* | (2006.01) |
| *G21F 9/16* | (2006.01) |
| *B01D 53/02* | (2006.01) |
| *B01J 20/04* | (2006.01) |
| *B01J 20/22* | (2006.01) |
| *B01J 20/28* | (2006.01) |
| *C02F 1/28* | (2006.01) |
| *C02F 101/00* | (2006.01) |
| *C02F 101/20* | (2006.01) |
| *C02F 103/08* | (2006.01) |
| *C02F 103/10* | (2006.01) |

(52) U.S. Cl.
CPC .......... *B01J 20/3085* (2013.01); *B01D 53/02* (2013.01); *B01J 20/0211* (2013.01); *B01J 20/045* (2013.01); *B01J 20/06* (2013.01); *B01J 20/226* (2013.01); *B01J 20/28083* (2013.01); *B01J 20/3057* (2013.01); *C02F 1/288* (2013.01); *G21F 9/12* (2013.01); *G21F 9/167* (2013.01); *B01D 2253/204* (2013.01); *C02F 1/281* (2013.01); *C02F 1/285* (2013.01); *C02F 2101/006* (2013.01); *C02F 2101/20* (2013.01); *C02F 2103/08* (2013.01); *C02F 2103/10* (2013.01)

(58) Field of Classification Search
CPC ................ B01J 20/3085; B01J 20/3057; B01J 20/28083; B01J 20/226; B01J 20/045
USPC ............. 423/305, 509, 561.1, 608; 502/400; 556/51
See application file for complete search history.

(56) References Cited

U.S. PATENT DOCUMENTS

| | | | |
|---|---|---|---|
| 7,652,132 B2 | 1/2010 | Yaghi et al. | |
| 7,687,432 B2 | 3/2010 | Zhou et al. | |
| 7,842,827 B2 | 11/2010 | Schubert et al. | |
| 8,115,024 B2 | 2/2012 | Schubert et al. | |
| 8,123,834 B2 | 2/2012 | Masel et al. | |
| 8,257,519 B1 | 9/2012 | Nelson et al. | |
| 2008/0142440 A1 | 6/2008 | Liu et al. | |
| 2009/0198079 A1 | 8/2009 | Schubert et al. | |
| 2012/0121904 A1 | 5/2012 | Serre et al. | |
| 2012/0259117 A1 | 10/2012 | Yaghi et al. | |

FOREIGN PATENT DOCUMENTS

| | | |
|---|---|---|
| EP | 2398812 | 12/2011 |
| WO | WO2004042270 | 5/2004 |
| WO | WO 2012115980 | 8/2012 |

OTHER PUBLICATIONS

Serre, Christian, et al.; Very Large Breathing Effect in the First Nanoporous Chromium (III)-Based Solids; MIL-42 or $CR^{III}$ (OH) {O2C—C6H4—CO2} {H02C—C6H4—CO2H} x*H2Oy) J. Am. Chem. Soc. 2002, 124, 13519-13526, France.

Taylor-Pashow, et al.; Postsynthetic Modifications of Iron-Caroxylate Nonoscale Metal-Origanic Frameworks for Imaging and Drug Delivery; J. Am Chem. Soc. 2009, 131, 14261-14263; Chapel Hill, North Carolina.

Ferrey, et al.; A Chorium Terephtalate-Based Solid with Unusally Large Pore Volumes and Surface Area; Sep. 23, 2005, vol. 309 Science www.sciencemag.org; 2040-2042.

Dan-Hardi, et al.; A New Photoactive Crystalline Highly Porous Titanium(IV) Dicarboxylate; J. Am. Chem. Soc. 2009, 131, 10857-10589, France.

(Continued)

*Primary Examiner* — Porfirio Nazario Gonzalez
(74) *Attorney, Agent, or Firm* — J. Bennett Mullinax, LLC

(57) ABSTRACT

A novel metal-organic framework (MOF) templated process for the synthesis of highly porous inorganic sorbents for removing radionuclides, actinides, and heavy metals is disclosed. The highly porous nature of the MOFs leads to highly porous inorganic sorbents (such as oxides, phosphates, sulfides, etc) with accessible surface binding sites that are suitable for removing radionuclides from high level nuclear wastes, extracting uranium from acid mine drainage and seawater, and sequestering heavy metals from waste streams. In some cases, MOFs can be directly used for removing these metal ions as MOFs are converted to highly porous inorganic sorbents in situ.

9 Claims, 68 Drawing Sheets

(56) References Cited

OTHER PUBLICATIONS

Yanghe Fu et al.; An Amine-Functionalized Titanium Metal-Organic Framework Photocatalyst with visible-Light-Induced Activity for Co2 Reduction; 2012 Wiley-VCH Verlag GmbH & Co., KGaA, Weinheim, Angew. Chem Int. Ed. 2012, 51, 3364-3367; wileyonlinelibrary.com.

Dekrafft, et al.; Metal-Organic Framework Templated Synthesis of Fe2O3/TiO2 Nanocomposite for Hydrogen Production; 2012 Wiley-VCH Verlag GmbH & Co. KgaA, Weinheim Adv. Master. 2012, 24 2014-2018; wileyonlinelibrary.com.

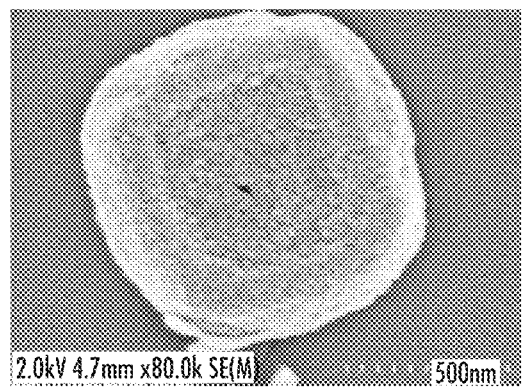
FIG. 2C
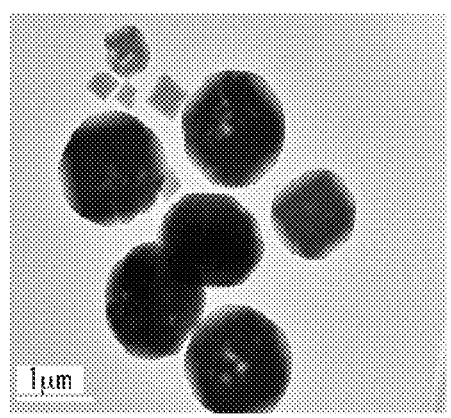 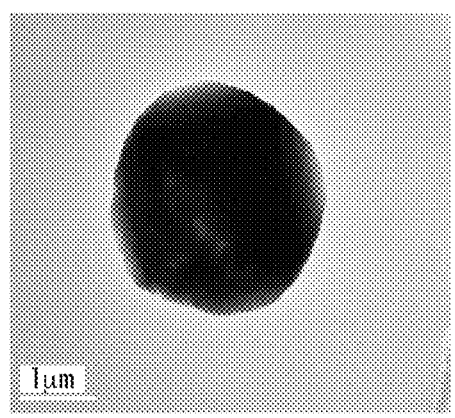
FIG. 3A  FIG. 3B

DYE UPTAKE

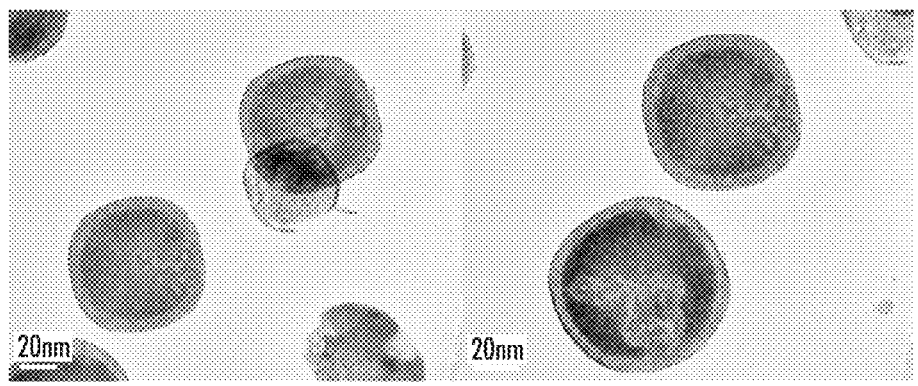
FIG. 11A    FIG. 11B
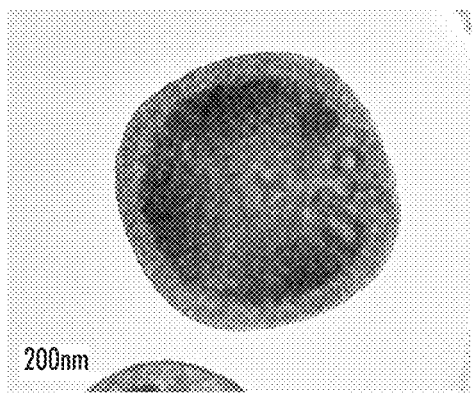 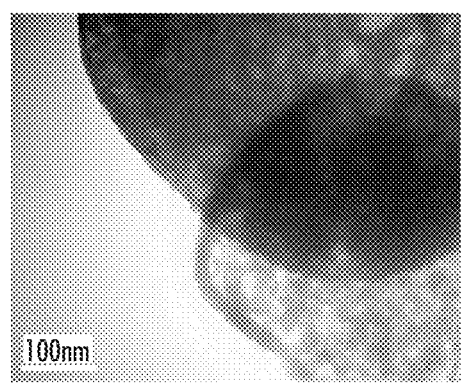
FIG. 11C    FIG. 11D

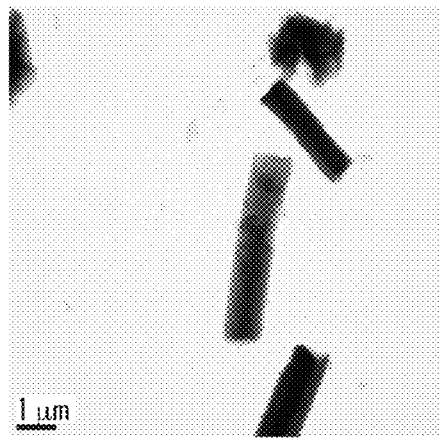
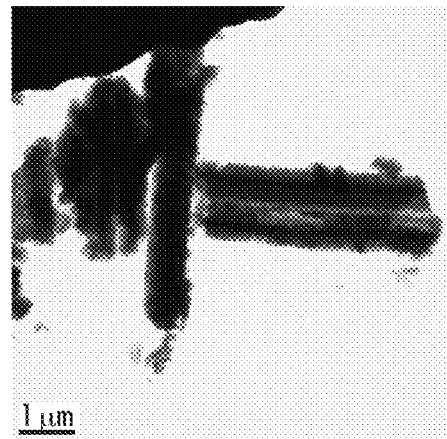
FIG. 69A  FIG. 69B
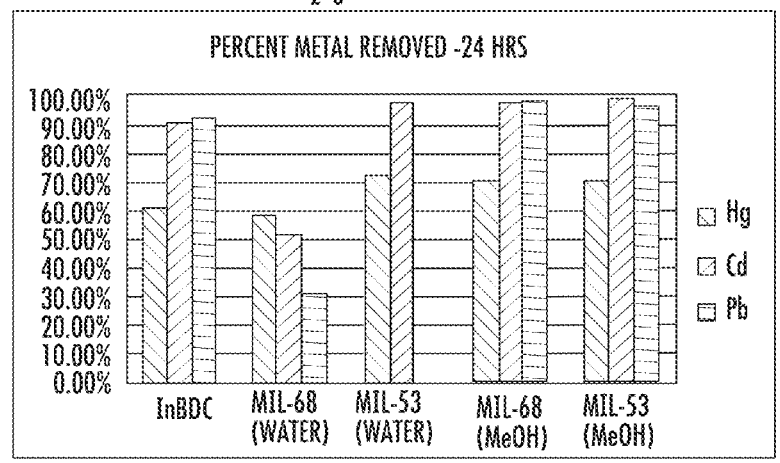
FIG. 70

METAL-ORGANIC FRAMEWORK TEMPLATED SYNTHESIS OF POROUS INORGANIC MATERIALS AS NOVEL SORBENTS

RELATED APPLICATIONS

This application claims the benefit of U.S. Provisional Application No. 61/807,010 filed on Apr. 1, 2013 and which is incorporated herein by reference.

STATEMENT AS TO RIGHTS TO INVENTIONS MADE UNDER FEDERALLY SPONSORED RESEARCH AND DEVELOPMENT

This invention was made with Government support under Contract No. DE-AC09-08SR22470 awarded by the United States Department of Energy. The Government has certain rights in the invention.

BACKGROUND OF THE INVENTION

Inorganic materials are widely used as sorbents for removing or separating metal ions in a variety of applications. They are advantageous over their organic counterparts in that they are stable to harsh environments including high radiation fields and extreme pH conditions encountered in certain applications. Inorganic sorbents can also be less expensive than other sorbent materials, enabling their use in many separation and environmental remediation applications.

Metal-organic frameworks (MOFs) are hybrid materials that are built from metal ion connectors and polydentate bridging ligands and have shown potential in a number of applications such as nonlinear optics, gas adsorption, catalysis, and more recently, biomedical imaging and drug delivery. Because of relatively weak metal-ligand bonds compared to typical covalent bonds, MOFs also act as interesting templates or starting materials to prepare other useful functional materials. The present invention relates to the use of MOFs as templating materials to develop highly porous inorganic materials that can be used as sorbents for various applications, including but not limited to, radionuclide removal from high level nuclear waste, treating acid mine drainage, extraction of uranium from seawater as sustainable nuclear fuel, removal of radioactive Sr from contaminated seawater, decontamination of heavy metal ions from soil and other sources.

SUMMARY OF THE INVENTION

The present invention relates to the use of MOFs as sorbents or as templating materials to develop highly porous inorganic sorbents for various applications where the selective separation of metal ions is desired. Specific applications considered include the separation of radionuclides in areas such as high level waste remediation and environmental cleanup, extraction of uranium from acid mine drainage and from seawater, and separation of other heavy metals in the treatment of various industrial waste streams and environmental cleanup applications.

Metal-organic frameworks (MOFs) are highly porous coordination polymers composed of organic bridging ligands and inorganic secondary building units (SBUs), which can be either individual metals or metal clusters. Their vast potential is largely due to the structural control afforded by tuning the bridging ligand with respect to length, symmetry, and functionality, lending them to investigation for use in gas storage and separations, catalysis, molecular sensing, and many other applications. The relatively weak coordination bond strength between the SBU and the bridging ligand, while a bottleneck for many proposed applications of MOFs, can be exploited to afford new materials that benefit from the modest chemical stability and uniquely modifiable structure.

Several promising applications leverage this intrinsic characteristic to great advantage. For instance, the relative weakness of the metal-ligand bond makes nanoMOFs an ideal delivery vehicle for imaging contrast agents and chemotherapeutics, as degradation in biological systems allows release of cargoes in a timely fashion. Alternatively, MOFs have been explored as sacrificial templates for the preparation of porous carbon or cross-linked cubic polymer gels, as the fragile metal-ligand bond accommodates removal of the metal from the MOF. Conversely, by removing the organic bridging ligand, MOFs can also be used as templates for the synthesis of inorganic materials.

In the present invention, MOFs are used as templates to prepare new stable and porous inorganic materials by a novel, controlled ligand extraction process. Similar to post-synthetic functionalization, post-synthetic exchange, and metal-ion exchange, common MOF precursors can form different functional materials by extracting the ligands and substituting with inorganic moieties dissolved in the extraction solution. Unlike thermally prepared porous metal oxides, changing the ligand extraction solution allows for varying the composition and retaining surface area, porosity, and most importantly, delicate surface functionality of the final material. The resulting robust inorganic materials retain the morphologies of the original MOF templates and are highly effective as sorbents for decontamination of high-level nuclear waste (HLW), lanthanide extraction, remediation of radioactive seawater simulating the contaminated cooling water from the Fukushima Diiachi disaster, and removal of heavy metal ions from aqueous environments.

The present invention includes:

(1) The use of MOFs as sorbents for decontaminating high level wastes, heavy metal removal, and actinide sequestration;

(2) Methods for MOF-templated porous inorganic sorbent synthesis (hydroxides, oxyphosphates, sulfides, peroxides, etc.);

(3) Use of MOF-derived inorganic sorbents for decontaminating high level wastes, heavy metal removal, and actinide sequestration;

(4) Specific MOFs with desired compositions, structures, and morphologies for use as sorbents and for use as starting materials to prepare porous inorganic sorbents.

BRIEF DESCRIPTION OF THE DRAWINGS

FIG. 2A-2C are SEM images of MIL-25 after treatment of NaOH to form TiOx. The dimensions of "average" TiOx are 1.13 µm in diameter, 0.35 µm thick, and disc-shaped. The volume of the material is 22% less than that of the precursor, MIL-125(Ti), indicating the density increased 4.45×. This yields a density for TiOx of 3.23 g/cm$^3$, in comparison to the literature density of TiO$_2$, 4.23 g/cm$^3$.

FIGS. 3A and 3B are TEM images of as-synthesized MIL-125(Ti).

FIGS. 11A-11D are TEM image of TiOxyPhos.

FIGS. 69A and 69B are TEM images of Mil-68 before treatment with 5 eq $Na_2S$ in methanol (A) and after treatment (B).

FIG. 70 displays percent of metals (Hg, Pb, Cd) removed from solution after 24 hours contact with MOF-templated $In_2S_3$ sorbents. Chart displays MOF template and solvent used for ligand exchange process. MeOH denotes methanol.

DESCRIPTION OF THE PREFERRED EMBODIMENT

Figure 1A:
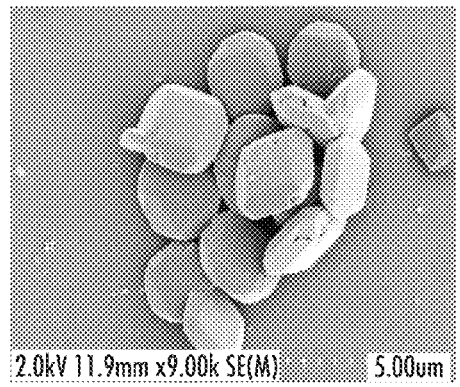
FIG. 1A-1B are SEM images of as-synthesized MIL-125 (Ti). The slight difference in morphology is attributed to different batches of solvents used for the synthesis. Both observed morphologies are highly crystalline by PXRD and exhibit comparable weight loss by TGA. The dimensions of the "average" MIL-125(Ti) MOF are 1.96 µm in diameter, 0.51 µm thick and considered disc-shaped. The reported formula for MIL-125(Ti) is $Ti_8O_8(OH)_8(BDC)_6$, with density of 0.725 g/cm$^3$ by crystallographic information file.
Figure 1B:
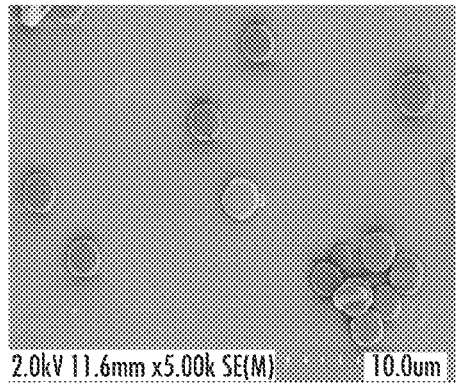
Figure 2A:
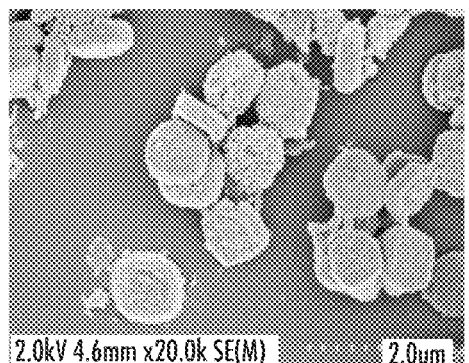
Figure 2B:
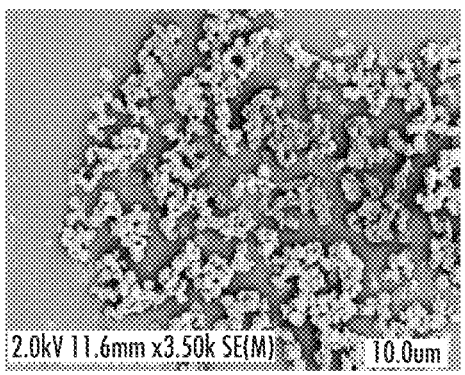
Figure 4A:
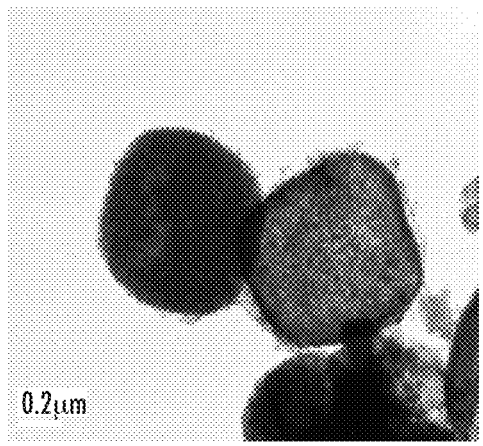
FIG. 4A-4D are TEM Images of TiOx.
Figure 4B:
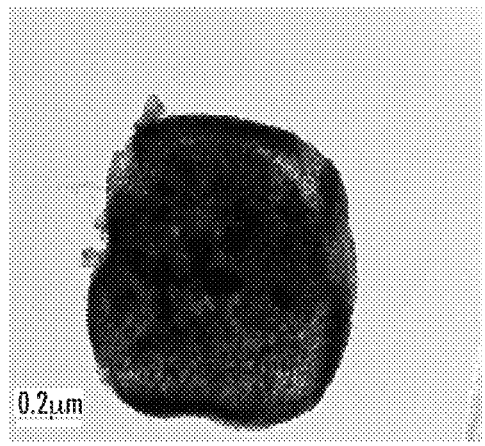
Figure 4C:
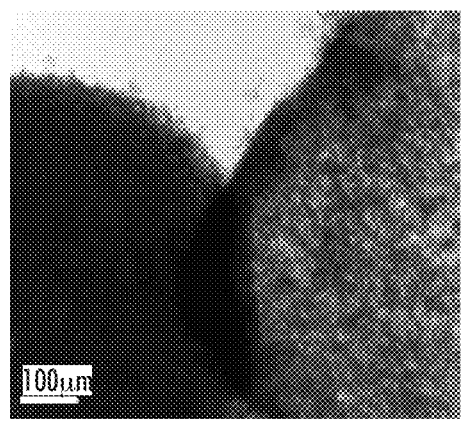
Figure 4D:
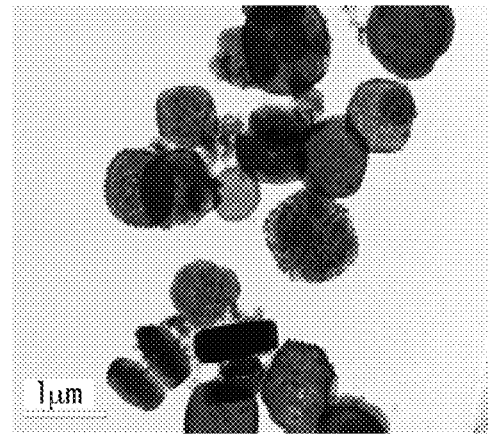
Figure 5:
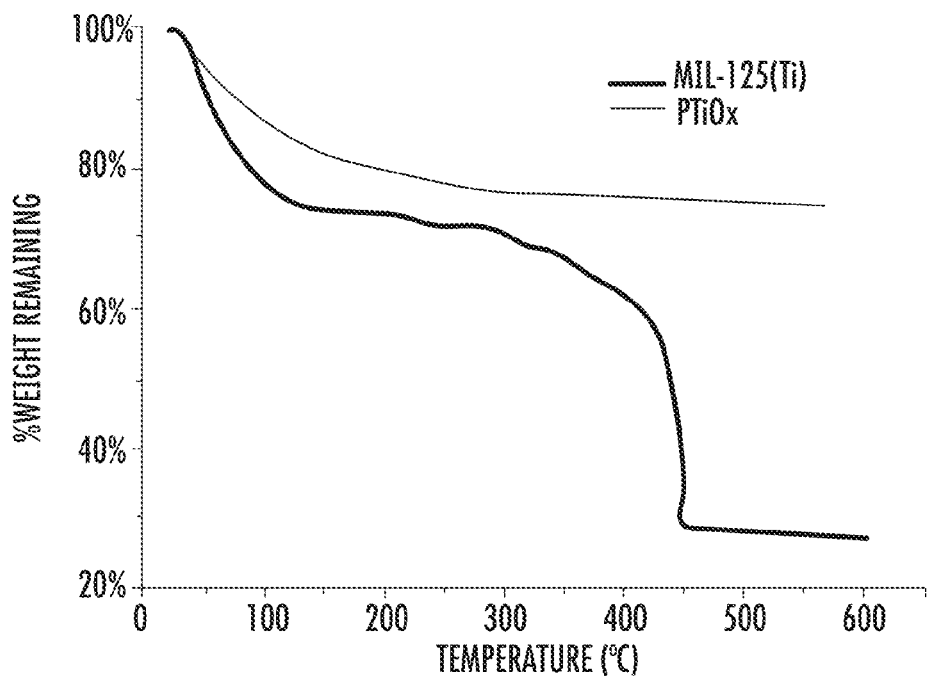
FIG. 5 is a thermogravimetric analysis of MIL-125(Ti) and TiOx (Labeled PTiOx).
Figure 6:
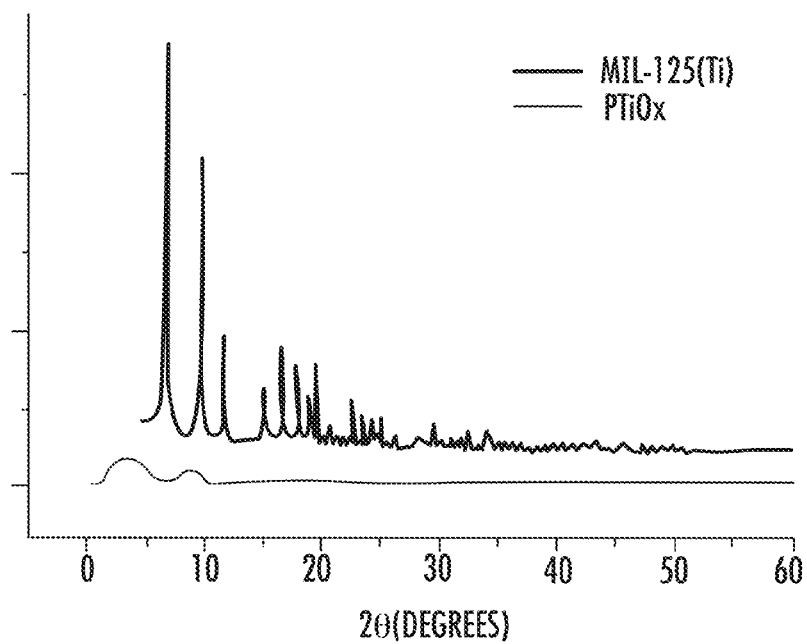
FIG. 6 is a powder X-ray diffraction patterns of MIL-125 (Ti) and TiOx (Labeled PTiOx).
Figure 7:
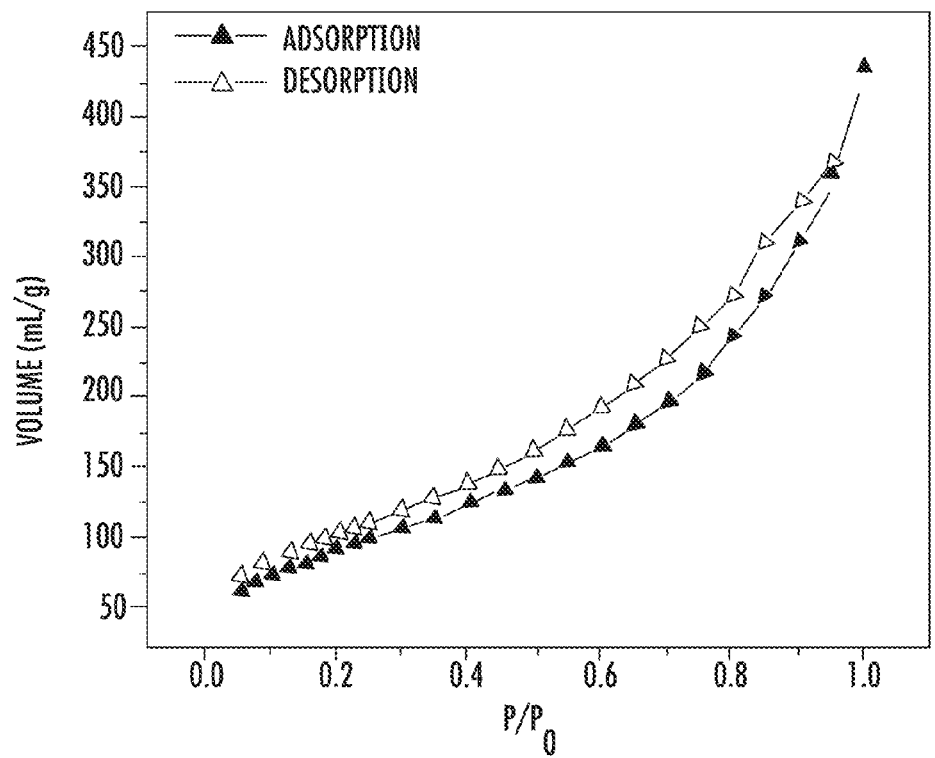
FIG. 7 is a N$_2$ adsorption isotherm of TiOx. Multipoint BET isotherm with 11 points gives a surface area of 329 m$^2$/g with a correlation coefficient of R$^2$=0.9997. A corresponding volumetric surface area of 1392 m$^2$/cm$^3$ is obtained by using the bulk density of TiO$_2$. This is significantly higher than the volumetric surface area of the precursor MIL-125(Ti), 1124 m$^2$/cm$^3$.
Figure 8:
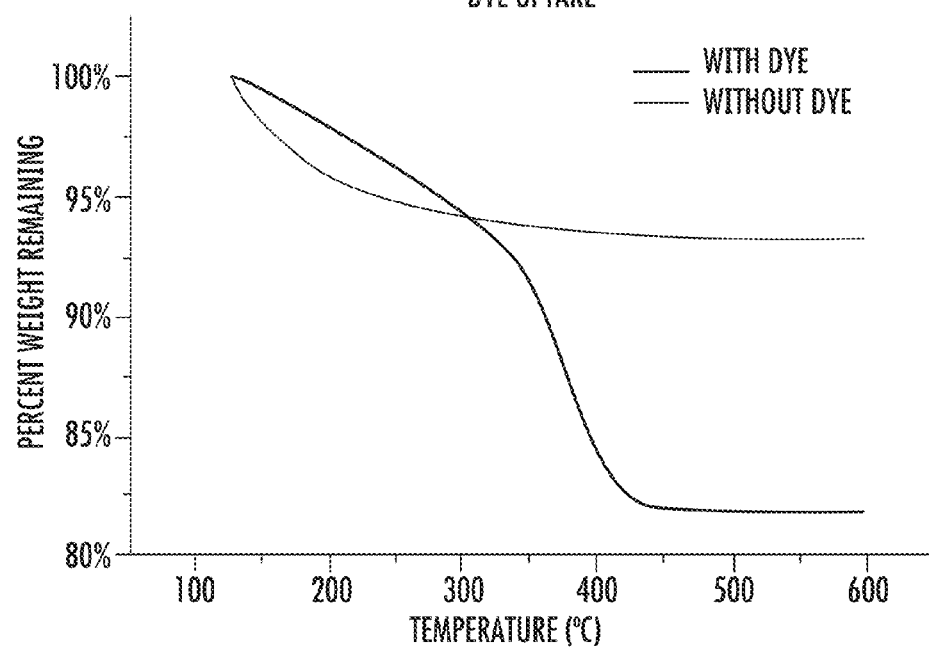
FIG. 8 is a graph of dye uptake by TiOx. This plot shows the pores in TiOx are capable of absorbing a large quantity of the cationic dye, Rhodamine B. The weight loss of the material without dye is due to solvent loss from the channels. The base-treated material was heated at 100° C. for 1 hour in the TGA before increasing temperature to the point of organic decomposition.
Figure 9:
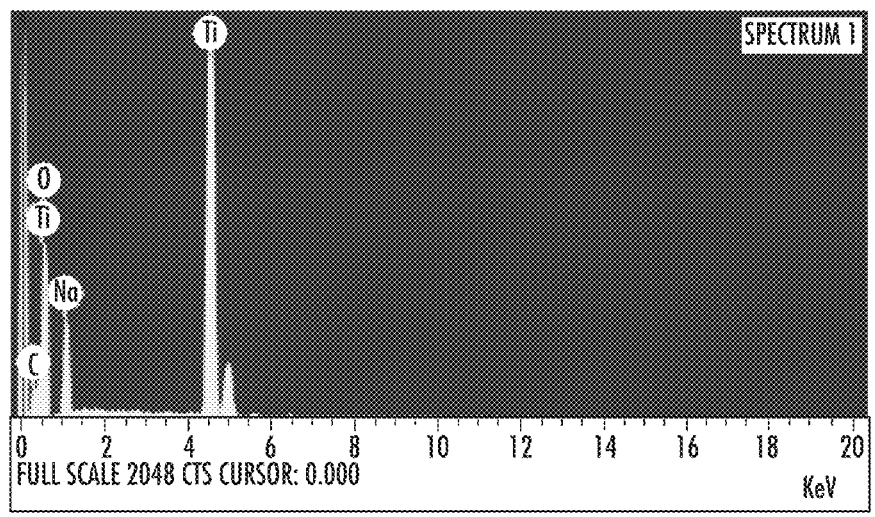
FIG. 9 is an EDS of TiOx. Prior to composition determination the EDS was calibrated against a Cu standard. Composition of material was derived from an average of three analyses from different areas of the sample. Material composition was determined to be 11.24% C, 42.93% O, 6.57% Na, 39.25% Ti by mass. This result was corroborated by the ICP-MS analysis of Ti. TiOx was decomposed by suspension in concentrated sulfuric acid, followed by microwaving at 150° C. for 20 minutes. The composition of material was determined to be 41.53% Ti by mass. TGA revealed 25% of the sample mass was solvent remaining in the channels of the material, indicating material composition to be 55.37% Ti if completely dried.
Figures 10A, 10B:
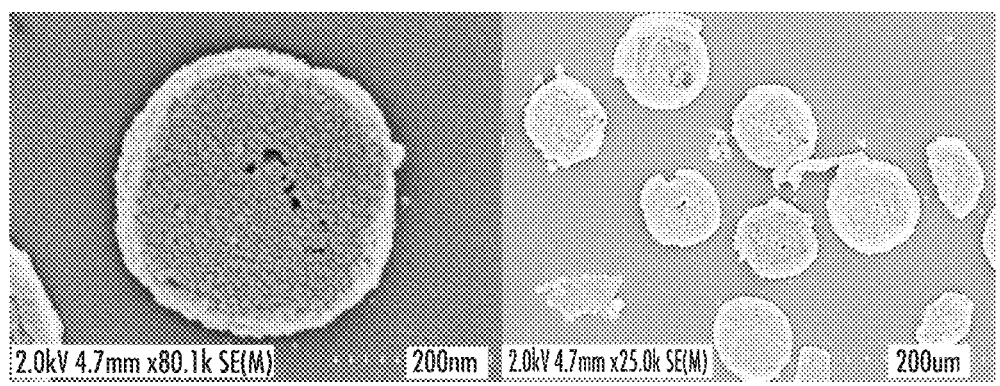
FIGS. 10A-10B are SEM image of TiOxyPhos.
Figure 12:
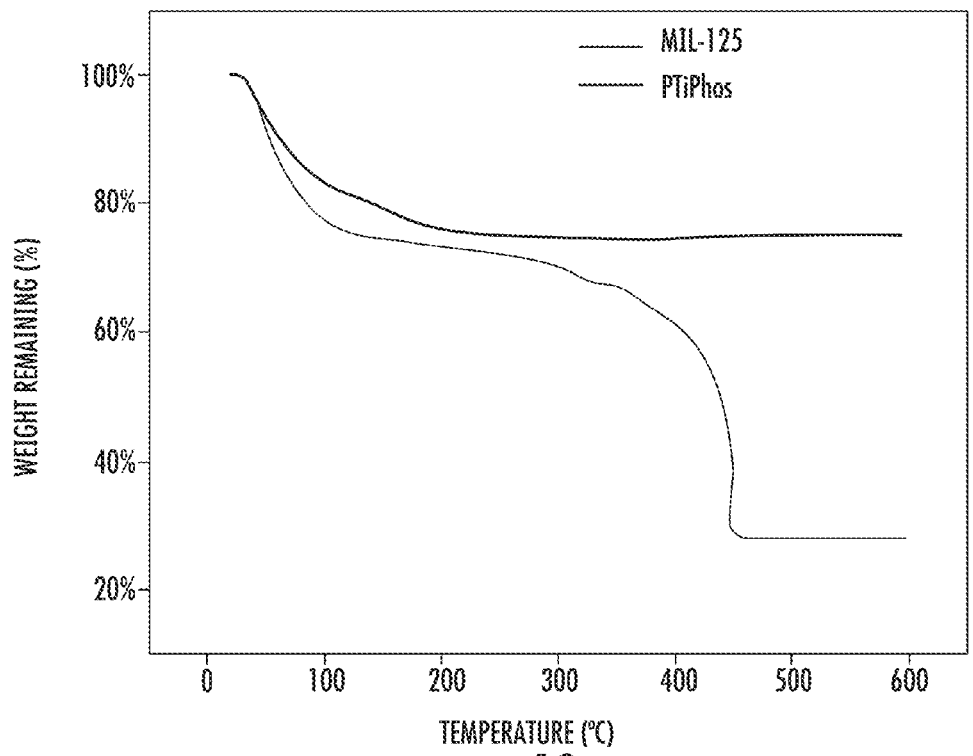
FIG. 12 is a graph of TGA of MIL-125(Ti) and TiOxyPhos. (Labeled PTiPhos)
Figure 13:
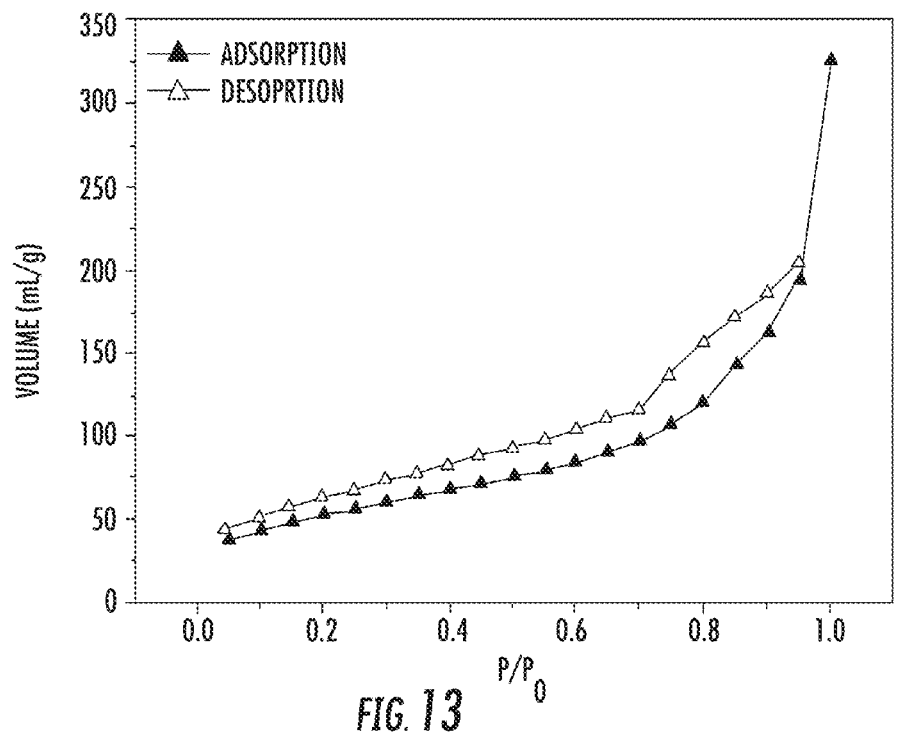
FIG. 13 is a graph of N$_2$ adsorption isotherm of TiOxyPhos. BET Surface area of 182 m$^2$/g with a correlation coefficient of R$^2$=0.9992.
Figures 14A, 14B:
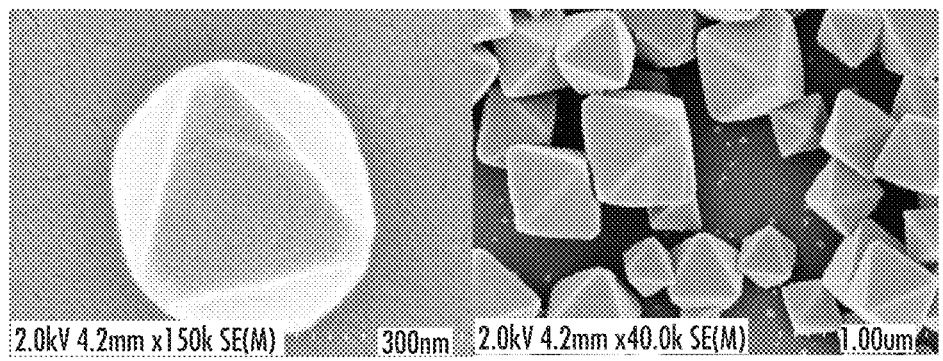
FIGS. 14A-B are SEM images of UiO-66(Zr).
Figures 15A, 15B:
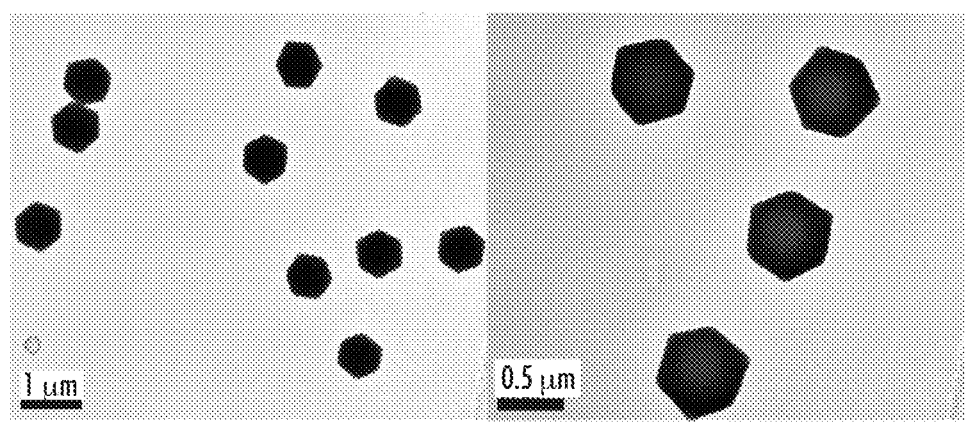
FIGS. 15A-15C are TEM images of UiO-66(Zr).
Figure 15C:
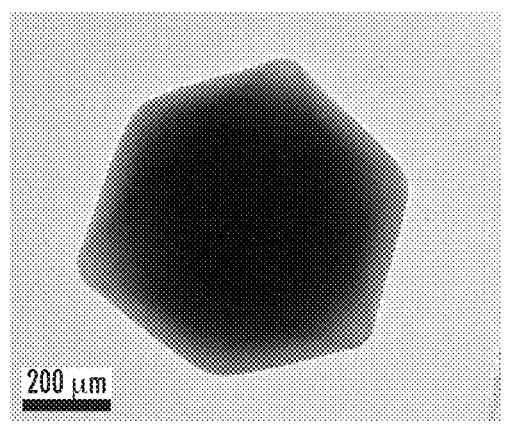
Figures 16A, 16B:
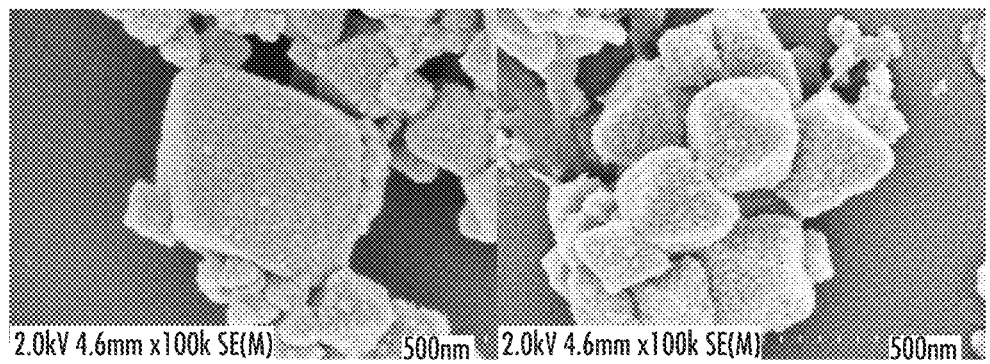
FIGS. 16A and 16B are SEM images of ZrOx.
Figures 17A, 17B:
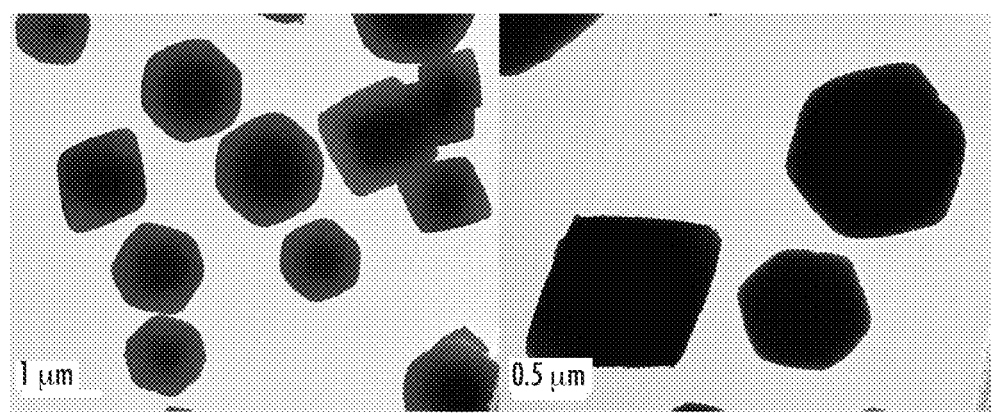
FIGS. 17A-17D are TEM images of ZrOx.
Figures 17C, 17D:
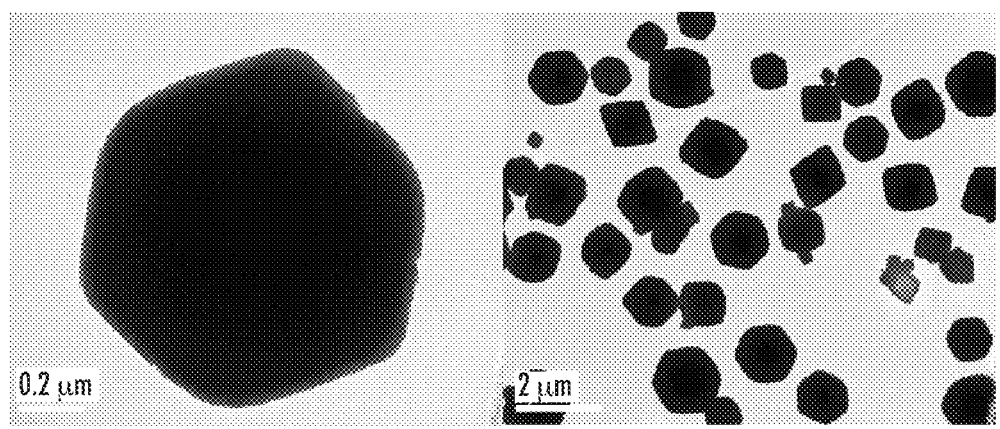
Figure 18:
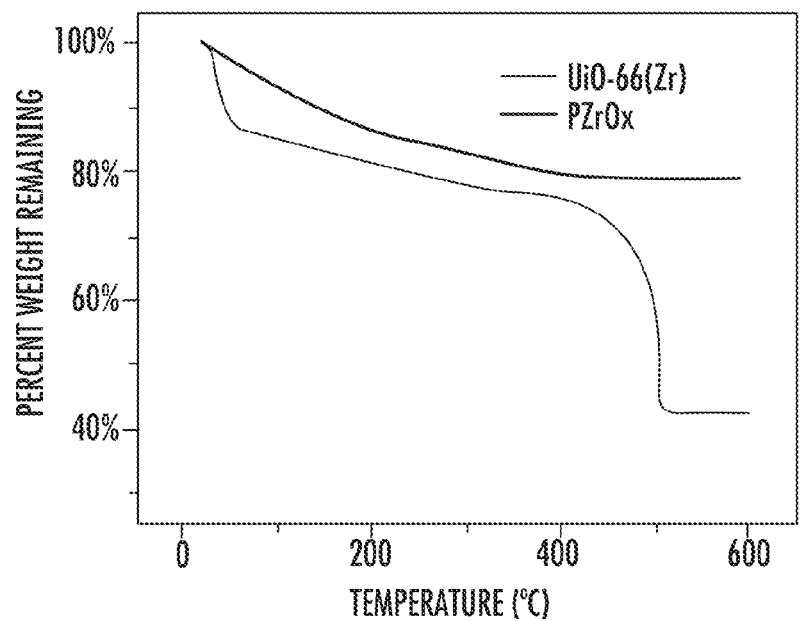
FIG. 18 is a graph of TGA of UiO-66(Zr) and ZrOx (Labeled PZrOx)
Figure 19:
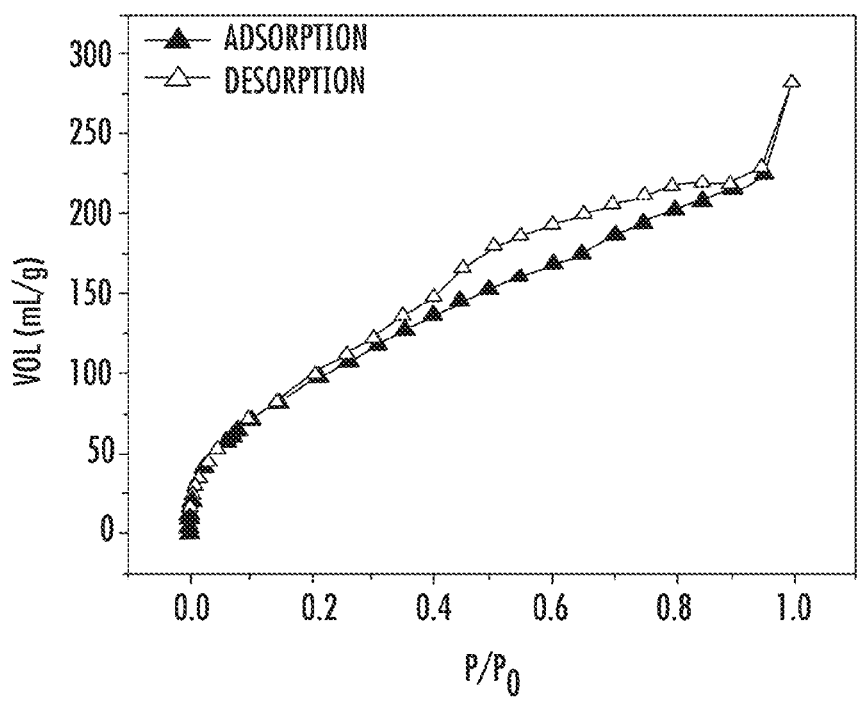
FIG. 19 is a graph of N$_2$ adsorption isotherm of ZrOx. BET Surface area of 379 m$^2$/g with correlation coefficient R$^2$=0.9997.
Figures 20A, 20B:
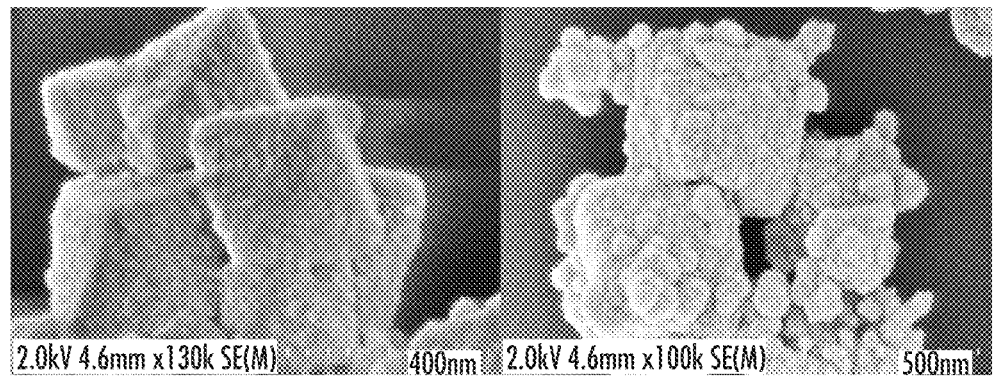
FIGS. 20A-20D are SEM images of ZrOxyPhos.
Figures 20C, 20D:
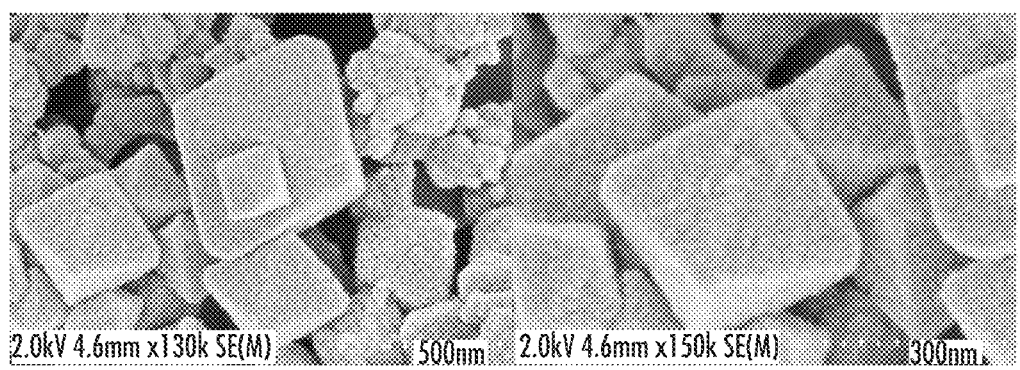
Figures 21A, 21B:
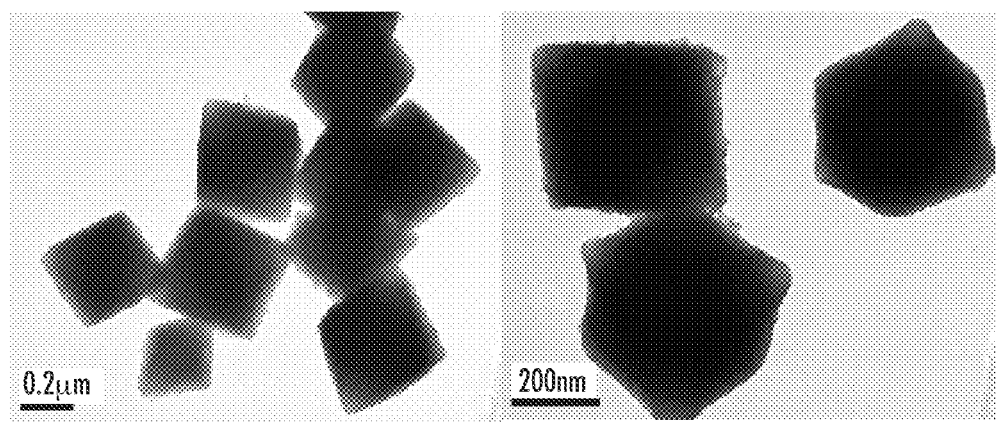
FIGS. 21A-D are TEM images of ZrOxyPhos.
Figures 21C, 21D:
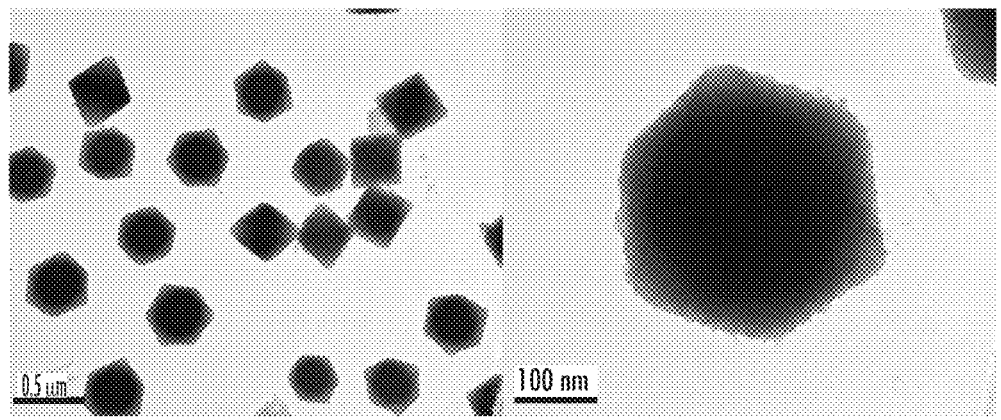
Figure 22:
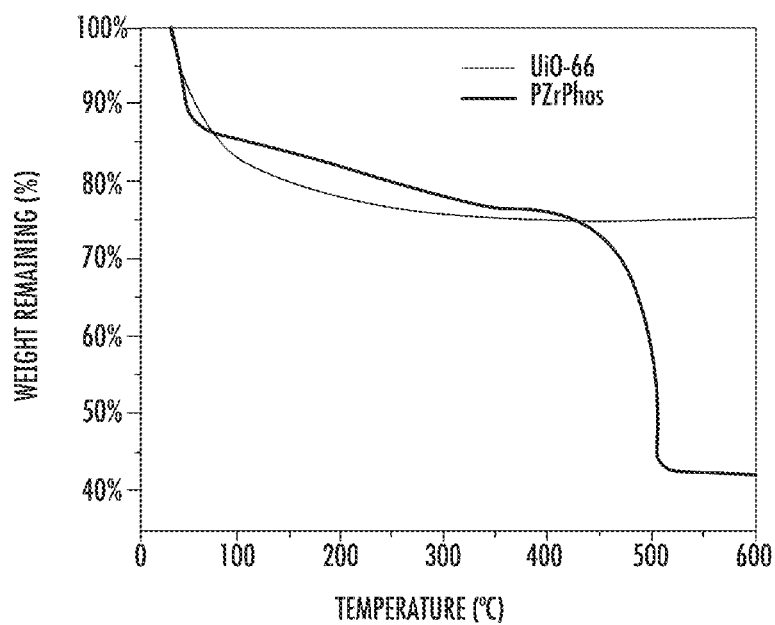
FIG. 22 is a graph of TGA of UiO-66(Zr) and ZrOxyPhos (Labeled PZrPhos).
Figure 23:
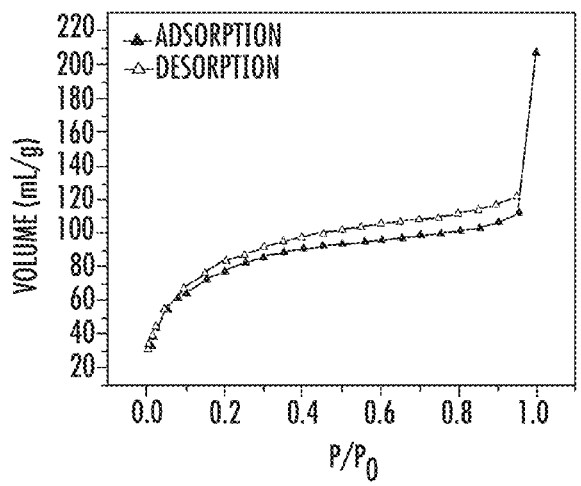
FIG. 23 is a graph of N$_2$ adsorption isotherms of ZrOxyPhos. BET Surface Area of 281 m$^2$/g with correlation coefficient R$^2$=0.9998.
Figure 24:
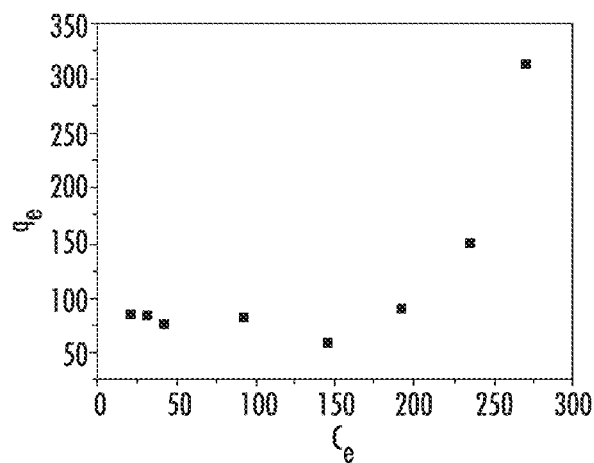
FIG. 24 is a graph of U sorption isotherm for TiOx at pH=3 (typical acid mine drainage pH). m/V=0.1 (1 mg material, 10 mL solution).
Figures 25A, 25B:
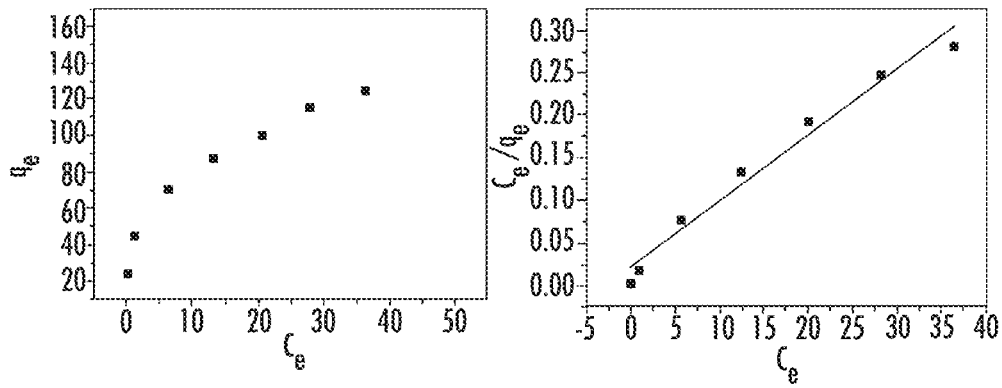
FIGS. 25A & 25B are graphs of U sorption isotherm for TiOx at pH=3 (typical acid mine drainage pH). m/V=0.2 (0.2 mg material, 1 mL solution). $q_{max}$=128 mg/g.
Figure 26:
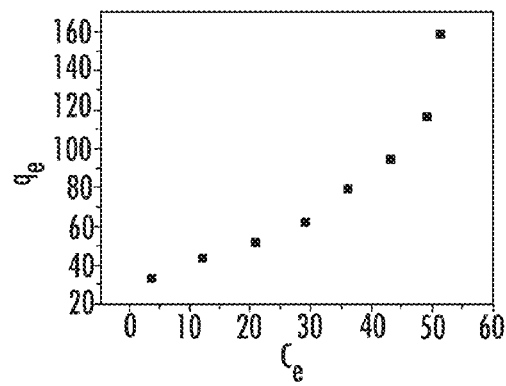
FIG. 26 is a graph of U sorption isotherm for TiOx at pH=8.3 (typical seawater pH). m/V=0.2 (1 mg material, 5 mL solution).
Figure 27:
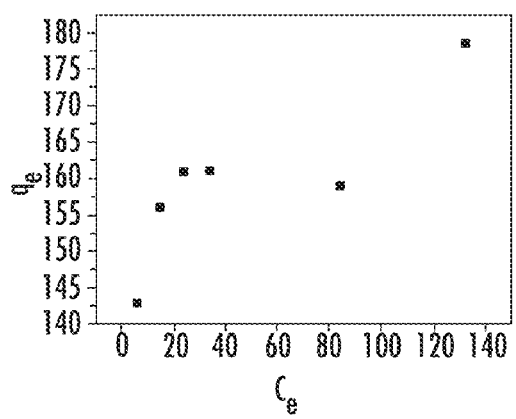
FIG. 27 is a graph of U sorption isotherm for TiOxyPhos at pH=3 (typical acid mine drainage pH). m/V=0.1 (1 mg material, 10 mL solution).
Figure 28A:
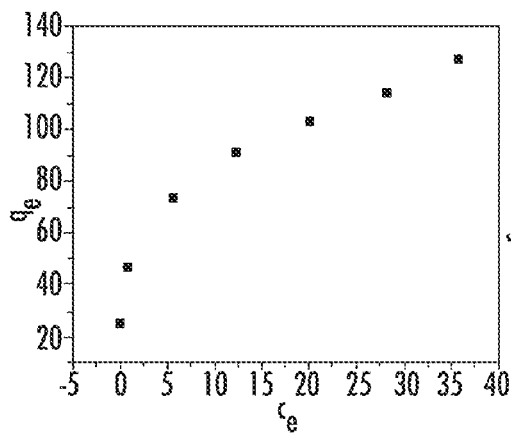
FIGS. 28A and 28B are U sorption isotherms for TiOxyPhos at pH=3 (typical acid mine drainage pH). m/V=0.2 (0.2 mg material, 1 mL solution). $q_{max}$=130 mg/g
Figure 28B:
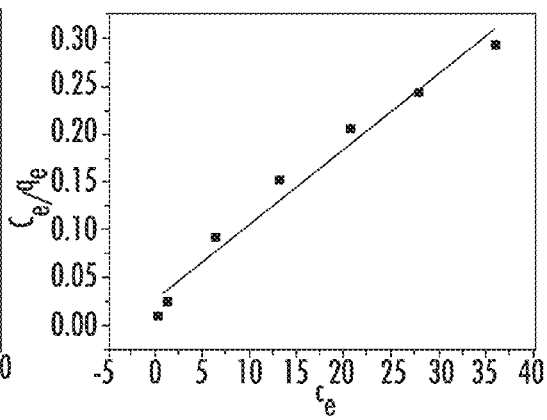
Figure 29:
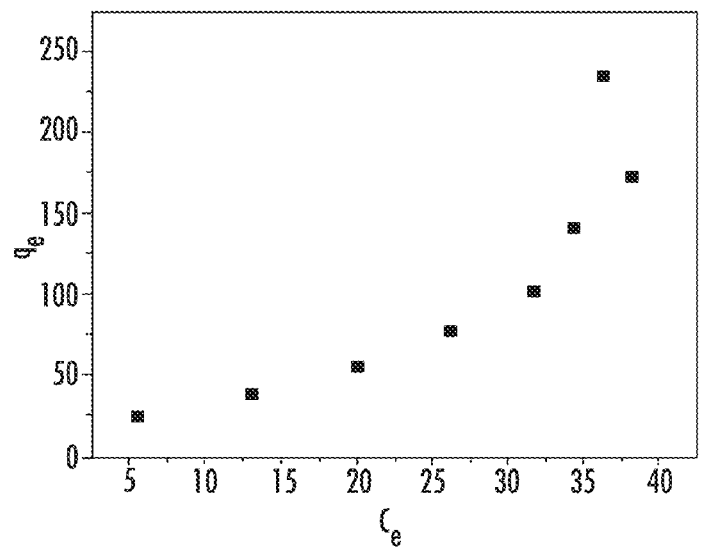
FIG. 29 is a graph of U sorption isotherm for TiOx at pH=8.3 (typical seawater pH). m/V=0.2 (1 mg material, 5 mL solution).
Figure 30:
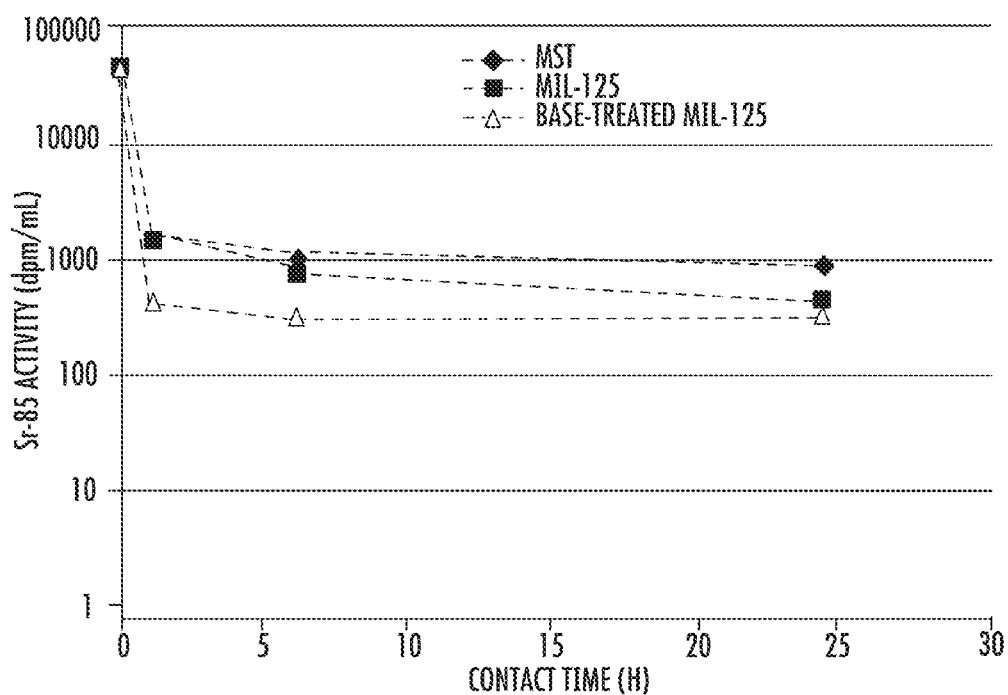
FIG. 30 is a graph of $^{85}$Sr activity versus contact time with MST, MIL-125(Ti), and TiOx. Note activity is on a log scale.
Figure 31:
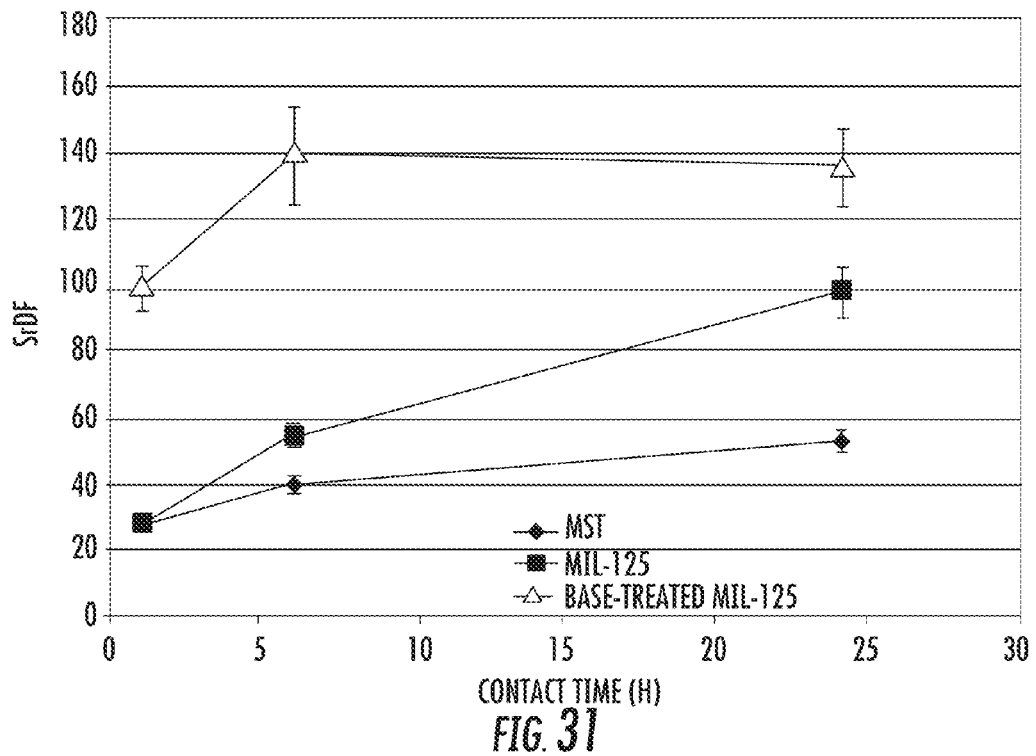
FIG. 31 is a graph of Sr DF versus contact time with MST, MIL-125(Ti), and TiOx.
Figure 32:
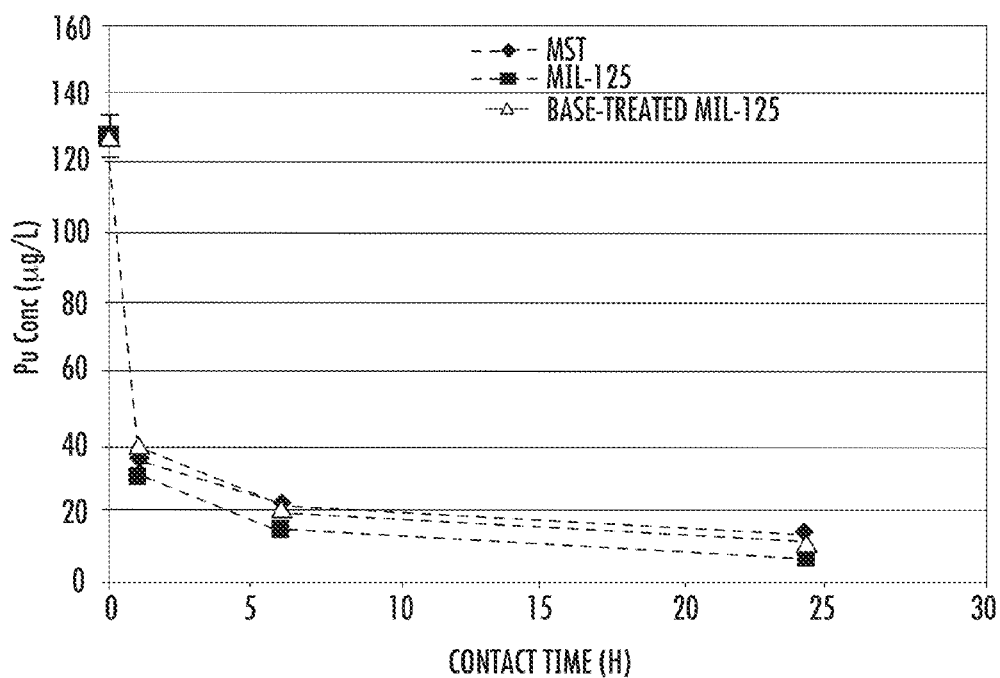
FIG. 32 is a graph of Pu concentration versus contact time with MST, MIL-125(Ti), and TiOx.
Figure 33:
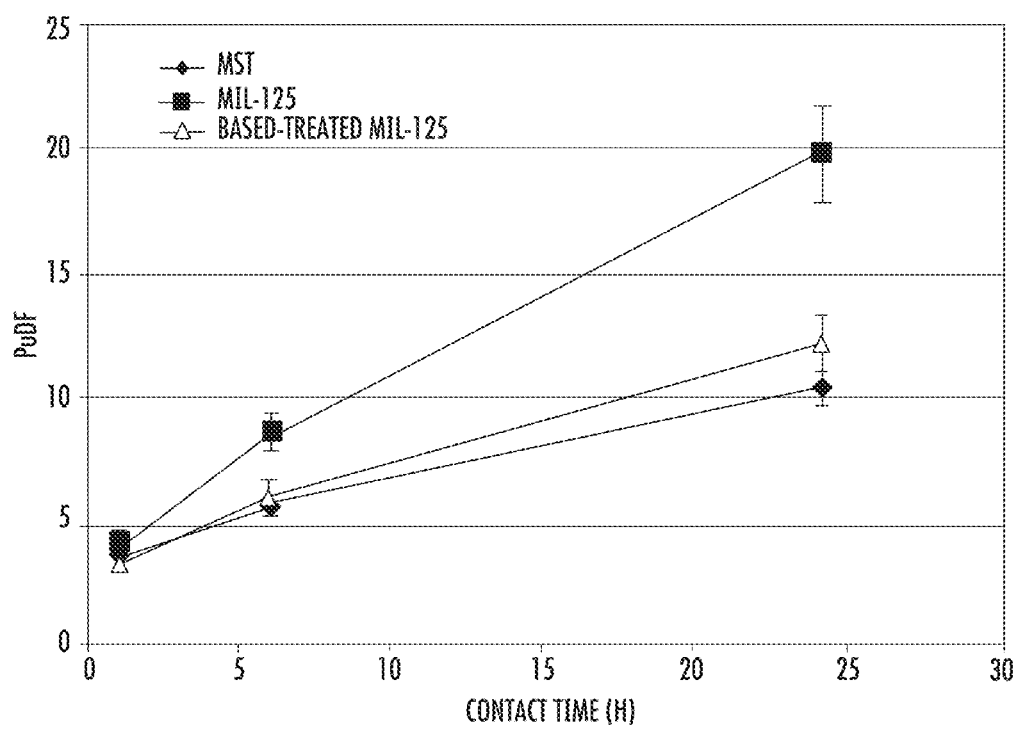
FIG. 33 is a graph of Pu DF versus contact time with MST, MIL-125(Ti), and TiOx.
Figure 34:
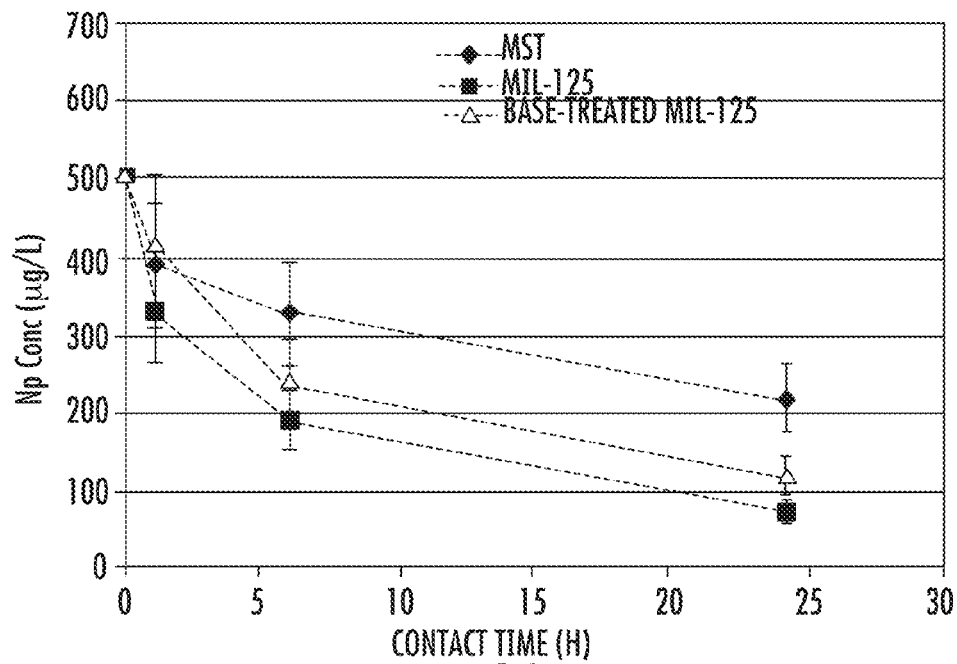
FIG. 34 is a graph of Np concentration versus contact time with MST, MIL-125(Ti), and TiOx.
Figure 35:
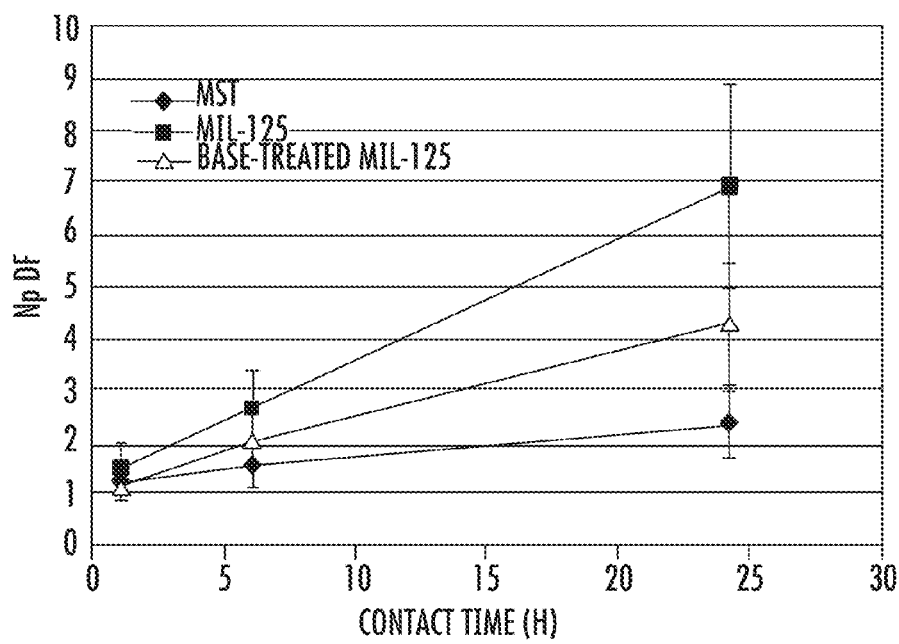
FIG. 35 is a graph of Np DF versus contact time with MST, MIL-125(Ti), and TiOx.
Figure 36:
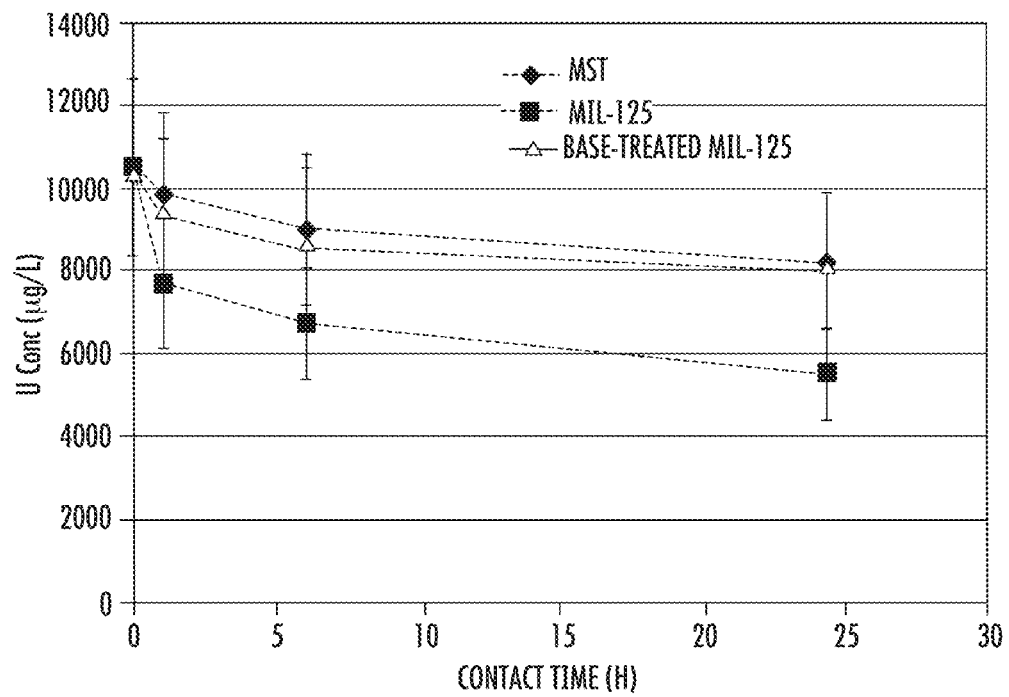
FIG. 36 is a graph of U concentration versus contact time with MST, MIL-125(Ti), and TiOx.
Figure 37:
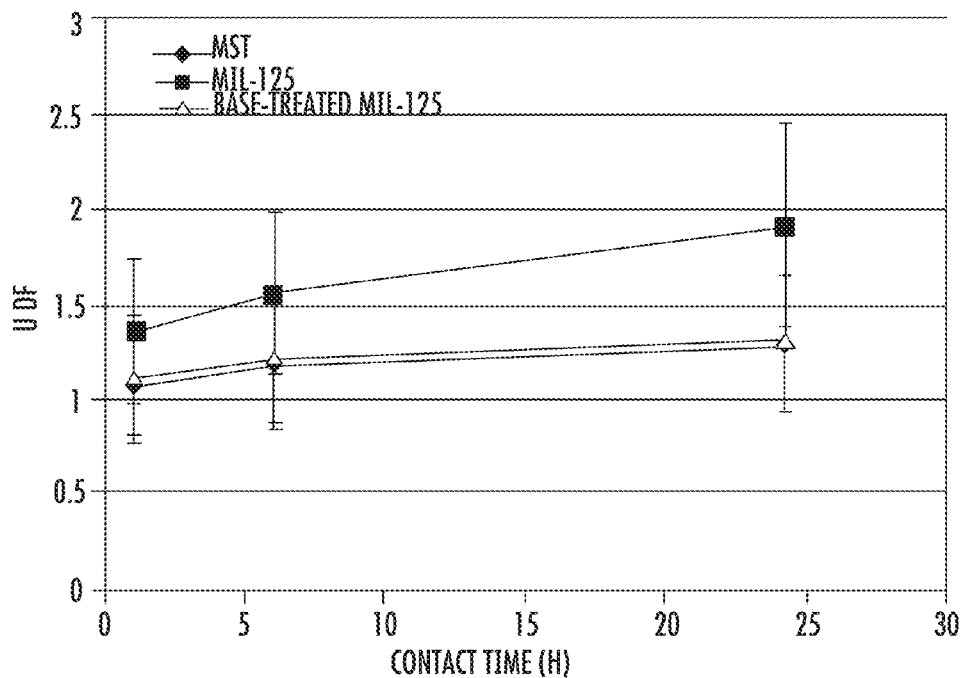
FIG. 37 is a graph of U DF versus contact time with MST, MIL-125(Ti), and TiOx.

Reference will now be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

In describing the various figures herein, the same reference numbers are used throughout to describe the same material, apparatus, or process pathway. To avoid redundancy, detailed descriptions of much of the apparatus once described in relation to a figure is not repeated in the descriptions of subsequent figures, although such apparatus or process is labeled with the same reference numbers.

Synthesis of MOFs and MOF-Templated Synthesis of Porous Inorganic Sorbents:

Materials and Methods:

All chemicals were obtained from Fisher Scientific or Sigma Aldrich. Chemicals and solvents were used without further purification, with the exception of N,N-dimethylformamide (DMF) which was dried overnight with barium oxide and distilled. Dry methanol was purchased from Sigma Aldrich. Radioactive components were obtained from the following sources: $^{85}$Sr and $^{137}$Cs radiotracers from Perkin Elmer Life Sciences, Boston, Mass., uranyl nitrate hexahydrate from Mallinckrodt, Phillipsburg, N.J., and nitric acid solutions of plutonium(IV) and neptunium(V) were derived from plutonium and neptunium production operations at Savannah River Site. The MST used for comparison in sorption testing was supplied by Optima Chemical Group LLC (Douglas, Ga.), and the SrTreat® was obtained from Selion Oy, Finland. All MOF syntheses were performed using oven-dried glassware which had been cooled to room temperature under vacuum. Teflon liners for Parr reactors were oven dried and cooled to room temperature under positive $N_2$ flow.

Instrumentation:

Low-resolution transmission electron microscopy (TEM) was obtained on a JEOL 100CX-II Transmission Electron Microscope, and high-resolution TEM (HRTEM) was obtained on a JEOL 2010F-FasTEM. TEM micrographs were obtained on carbon-coated copper grids. A Hitachi 4700 field emission scanning electron microscope (SEM) was used to determine particle size and morphology. To prepare SEM samples, nanoparticulate dispersions were diluted and thoroughly dispersed in EtOH via sonication. A drop of the dispersion was placed on glass and allowed to air dry. A Cressington 108 Auto Sputter Coater equipped with an Au/Pd (80/20) target and MTM-10 thickness monitor was used to coat the sample with a thin conductive layer before taking SEM images. Powder X-ray diffraction (PXRD) data was gathered on a Bruker SMART APEX II diffractometer using Cu radiation, and powder patterns were analyzed with the APEX II package using the phase ID plugin. Thermogravimetric analysis (TGA) was performed in air using a Shimadzu TGA-50 and a Shimadzu TGA-50H with a platinum pan, heated at a rate of 5° C. per minute. Nitrogen adsorption experiments were performed with a Quantachrome Autosorb-1C. Particle size was measured in EtOH on a Malvern Zeta-Sizer dynamic light scattering instrument. Elemental analysis and measurement of Ln concentration was obtained with a Varian 820-MS Inductively Coupled Plasma-Mass Spectrometer (ICP-MS) with samples dissolved in a 5% $HNO_3$ aqueous matrix. Porous inorganic materials were dissolved in 10 mL concentrated $H_2SO_4$ and heated to 180° C. for 20 minutes with vigorous stirring using a CEM MARS 5 microwave. Energy dispersive X-ray spectroscopy (EDS) was used to determine the elemental composition of the porous inorganic materials, using an Oxford Instruments 7200 INCA PentaFETx Energy Dispersive X-ray Spectrometer. The EDS data were processed with the Inca Microanalysis Suite. Each EDS sample was prepared by placing nanoparticulate dispersion in EtOH on carbon tape and allowing to air dry. The spectrometer was referenced to Cu immediately prior to obtaining elemental composition by EDS.

Syntheses:

MIL-125:

MIL-125 was prepared based off the protocol from *Angew. Chem. Int. Ed.* 2012, 51, 3364-3367. In a dry 50-mL side arm round bottom flask, 1.50 g (9.03 mmol) terephthalic acid ($H_2BDC$) was added. The round bottom was evacuated for 10 minutes prior to the establishment of an $N_2$ atmosphere. 27 mL DMF and 3 mL methanol were added under $N_2$ with stirring. 0.75 mL (2.75 mmol) titanium isopropoxide was added under $N_2$ with stirring. The resulting solution was transferred via syringe into a 120-mL Teflon liner under $N_2$ atmosphere and sealed in a Parr reactor. The reactor was heated at 150° C. for 20 hours before cooling naturally to room temperature. The resulting white solid was collected by centrifugation (10,000 RPM for 10 minutes) and washed three times with water. The MOF was stored in water prior to use.

UiO-66:

UiO-66 was prepared based off the protocol from *Chem. Eur. J.* 2011, 17, 6643-6651. In a dry 125-mL side arm round bottom flask, 142.54 mg (0.86 mmol) $H_2BDC$ and 5.24 g (42.9 mmol) Benzoic Acid were combined. The round bottom was evacuated for 10 minutes prior to the establishment of an $N_2$ atmosphere. 56 mL of DMF were added under $N_2$ with stirring. 200.8 mg (0.86 mmol) $ZrCl_4$ was dissolved in 4 mL of DMF and added to the reaction solution under $N_2$. The solution was stirred at room temperature for 30 minutes before being transferred via syringe to a 120-mL Teflon liner under $N_2$ atmosphere and sealed in a Parr reactor. The reactor was heated at 120° C. for 20 hours before cooling naturally to room temperature. The resulting white solid was collected by centrifugation (10,000 RPM for 10 minutes) and washed three times with water. The MOF was stored in water prior to use.

Base-Treatment of MOF Templates (TiOx, TiOxyPhos, ZrOx, ZrOxyPhos):

Up to 100 mg MOF was collected from the storage solution by centrifugation (10,000 RPM for 10 minutes). The MOF was then sonicated to full suspension in 5 mL of water and transferred town HDPE bottle. An equal volume of 10M NaOH solution (TiOx, ZrOx), or 210 mM $Na_3PO_4$ solution (TiOxyPhos, ZrOxyPhos) was added, creating a suspension of MOF with mass/vol ratio less than 10. The bottle was capped and agitated at 300 RPM on a plate shaker overnight. The resulting white solid was collected by centrifugation and washed with water three times. The inorganic material was stored in water until use. Material was obtained in up to 90% yield (TiOx), 75% yield (TiOxyPhos), 72% yield (ZrOx), and 57% yield (ZrOxyPhos).

$H_3PO_4$-Treatment of MOF Templates (TiPhos, ZrPhos):

50 mg MOF was collected from the storage solution, by centrifugation (10,000 RPM for 10 minutes). The MOF was then sonicated to full suspension in 6.66 mL water (MIL-125) or 7.50 mL water (UiO-66) and transferred to an HDPE bottle. 3.40 mL (MIL-125) or 2.50 mL (UiO-66) 1 M $H_3PO_4$ solution was added to the MOF-template solution. The bottle was capped and agitated at 300 RPM on a plate shaker overnight. The resulting white solid was collected by centrifugation and washed with water three times, followed by three washes with N,N-dimethylformamide (DMF), followed by three additional washes with water. The inorganic material was stored in water until use. Material was obtained in up to 39% yield (TiPhos) and 61% yield (ZrPhos).

Peroxide-Treated-TiOx (TiOx-$H_2O_2$):

6 mL of TiOx slurry (6.71 mg Ti/mL) was centrifuged at 4400 rpm for 10 minutes to isolate the solid. The solid was then washed once by redispersing in distilled $H_2O$, and isolating by centrifuging. The solid was then redispersed in approximately 5 mL of distilled $H_2O$ and the pH was adjusted from 10.9 to 7.1 with the dropwise addition of 1 M $HNO_3$, while stirring. 0.30675 g of 28 wt % $H_2O_2$ (3:1 $H_2O_2$:Ti molar ratio) was diluted to a total volume of ~2 mL with additional distilled $H_2O$. This solution was then added dropwise to the TiOx suspension with stirring, over a period of 30 minutes. After the addition was complete, the reaction was stirred at room temperature for approximately 24 hours. A color change from white to yellow was observed immediately upon the addition of $H_2O_2$. After 24 hours, the product was isolated by centrifuging, and was washed 6 times with distilled $H_2O$. After the final wash the product was redispersed in distilled $H_2O$, and the pH was adjusted to 4.1 with the addition of 1 M $HNO_3$. The product was stored and used in this slurry form.

MIL-68(In):

MIL-68 was prepared by the protocol from *Inorg Chem*, 2008, 47, 11892-11901. 2.0471 g (5.25 mmol) In(NO$_3$)$_2$.xH$_2$O and 1.005 g (6 mmol) terephthalic acid were combined in a 50-mL roundbottom flask, to which 25 mL N,N'-dimethylformamide was added with stirring. This solution was stirred for 45 minutes and transferred to a Teflon-lined high pressure reaction vessel. This vessel was sealed and heated at 100° C. for 48 hours before cooling naturally to room temperature. The resulting white solid was collected by centrifugation and washed three times with water. The MOF was stored in water prior to use.

MIL-53(In)—$NH_2$:

MIL-53-$NH_2$ was prepared by the protocol from *RSC Adv*, 2012, 2, 5051-5053. In a 25-mL roundbottom flask, 10 mL DI water, 0.8001 g (2.65 mmol) In(NO$_3$)$_2$.xH$_2$O, and 0.7501 g (4.65 mmol) 2-aminoterephthalic acid were combined with stirring. The solution was transferred to a 20-mL Teflon-lined acid digestion vessel and heated at 150° C. for 5 hours. The resulting yellow powder was collected by centrifugation and washed with acetone. Residual organic ligands were removed from the pores of the MOF by refluxing in DMF at 150° C. overnight. After reflux, the MOF was collected by centrifugation, washed with water, and stored in water until use.

Aqueous $Na_2S$ Treatments:

50 mg MOF was collected from the storage solution by centrifugation. The MOF was sonicated to full suspension in 8.58 mL DI water to which 1.42 mL 0.75 M $Na_2S$ in water was added. The solution was vortexed to mix and agitated overnight on a rotisserie style sample mixer in a 15-mL centrifuge tube. The resulting white solid was collected by centrifugation, washed twice with methanol and twice with DI water before being stored in 5 mL DI water.

Organic $Na_2S$ Treatments:

50 mg MOF collected from storage solution by centrifugation. The MOF was sonicated to full suspension in 8 mL anhydrous methanol to which 2 mL 0.64 M $Na_2S$ in methanol was added. The solution was vortexed to mix and agitated overnight on a rotisserie style sample mixer in a 15-mL centrifuge tube. The resulting white solid was collected by centrifugation, washed twice with methanol and twice with DI water before being stored in 5 mL DI water.

Analysis of Materials and Performance:

X-ray Absorption Spectroscopy.

The X-ray absorption data were collected at Beamline X18 Å at the National Synchrotron Light Source (NSLS). Spectra were collected at the titanium K-edge (4966 eV) in transmission mode. The X-ray white beam was monochromatized by a Si(111) monochromator and detuned by 25% to minimize the harmonic content of the beam. A Ti foil was used as the reference for energy calibration. The incident beam intensity ($I_0$) was measured by a 15 cm ionization chamber with 25% $N_2$ and 75% He gas composition. The transmitted beam intensity ($I_t$) and reference ($I_r$) were both measured by 30 cm ionization chambers with 90% $N_2$ and 10% Ar gas composition. XAS spectra (three scans) were collected at room temperature (~25° C.) for each sample, which was mixed with boron nitride to achieve approximately one absorption length. The data were processed and analyzed using the Athena and Artemis programs of the IFEFFIT package based on FEFF 6.

Lanthanide (Ln) Separation.

50 mg of each sorbent was suspended in aqueous solution at either pH=3 or pH=6, with pH adjusted using 1 M $HNO_3$ or 1 M NaOH. The pH for each sorbent, as well as the Ln solutions, were measured every 24 hours and readjusted to the appropriate pH. Samples were not used until the pH did not change by more than 0.1 pH units over 24 hours. The samples were collected by centrifugation and suspended in 1 mL Ln solution (composition provided in Table 1) to obtain the proper phase ratio of 20 mL/g. Full suspension was obtained by sonication, followed by agitation for 24 hours on a plate shaker at 300 RPM. Sorbents were then extracted by centrifugation and supernatant analyzed by ICP-MS in 5% aqueous $HNO_3$ solution. Ln concentrations were obtained by measuring against a negative control.

TABLE 1

Composition of Lanthanide Solution

| Component | Mass (mg) | [Ln] (mol/L) |
|---|---|---|
| La(NO$_3$)$_3$•6H$_2$O | 294.5 | 2.72E-03 |
| Pr(NO$_3$)$_3$•6H$_2$O | 270.7 | 2.49E-03 |
| Nd(NO$_3$)$_3$•6H$_2$O | 949.7 | 8.67E-03 |
| Sm(NO$_3$)$_3$•6H$_2$O | 192.8 | 1.74E-03 |
| Eu(NO$_3$)$_3$•5H$_2$O | 29.8 | 2.78E-04 |
| Gd(NO$_3$)$_3$•6H$_2$O | 36.8 | 3.26E-04 |
| ErCl$_3$•6H$_2$O | 17.9 | 1.88E-04 |
| Tb(NO$_3$)$_3$•5H$_2$O | 20.6 | 1.89E-04 |

Fukushima Seawater Remediation.

Sorption testing was performed using simulated seawater containing 8 ppm Sr (composition provided in Table 2). The seawater was also spiked with $^{85}Sr$ radiotracer to allow for quantification of the Sr removal via gamma spectroscopy. Each sorbent was added at a metal (Ti or Zr) concentration, of 2.4 g/L. MST and SrTreat® were included in the test set for comparison. Test bottles were shaken at 175 rpm in a shaker-oven at 25° C. Test bottles were sampled after 1 or 24 hours of contact. At the sampling time the test bottle was filtered through a 0.10-μm polyvinylidene fluoride (PVDF) membrane syringe filter to remove the solids. Aliquots of the filtrate were then analyzed on a Packard Cobra II Gamma Counter. Comparison to a blank control was used for quantifying the amount of Sr removed in each test. Similar experiments were also performed using a 10× diluted sample of simulated seawater. For these experiments, sorbents were added at a metal concentration (Ti or Zr) of 0.19 g/L.

TABLE 2

Composition of Simulated Fukushima Seawater Solution

| Component | Concentration |
| --- | --- |
| NaCl | 23.926 g/L |
| Na$_2$SO$_4$ | 4.008 g/L |
| KCl | 0.738 g/L |
| NaHCO$_3$ | 0.196 g/L |
| MgCl$_2$·6H$_2$0 | 10.831 g/L |
| CaCl$_2$·2H$_2$0 | 1.519 g/L |
| Sr(NO$_3$)$_2$* | 0.019 g/L (8 ppm Sr) |

*The solution was also spiked with $^{85}$Sr radiotracer to allow for measurement of Sr removal via gamma counting.

Hg, Pb, Cd Sorption Testing:

Sorption testing was performed with aqueous solutions at pH 6 containing either 10 ppm Pb or Cd, or 5 ppm Hg. Sorbents were suspended in water and their pH adjusted to 6 every 24 hours until deviation was less than 0.1 pH units. Sorbents were added at a phase ratio of 0.1 g/L to the aqueous metal solutions. Bottles were shaken at 225 rpm on a plate shaker. Test bottles were sampled after 24 and 36 hours of contact. For sampling, a 20 μL aliquot was removed and diluted to 4 mL in aqueous media for ICP-MS analysis. For Pb and Cd, a 2% HNO$_3$ aqueous media was used, while Hg was diluted with 10% HCl media. Concentrations of metals remaining were determined by comparison against a blank control sample.

NaOH-treatment of MOFs (TiOx, ZrOx):

200 mg MOF is suspended in 20 mL 5 M NaOH in a 30-mL HDPE bottle. The material is agitated 18 hours on a plate shaker at 300 RPM. Material is collected by centrifugation, washed three times with deionized water, and stored in deionized water as a slurry.

Phosphate-Treatment of MOFs (TiOxyPhos, ZrOxyPhos):

200 mg MOF is suspended in 20 mL 210 mM Na$_3$PO$_4$ in a 30-mL HDPE bottle. The material is agitated 18 hours on a plate shaker at 300 RPM. Material is collected by centrifugation, washed three times with deionized water, and stored in deionized water as a slurry. Investigation whether drying the material affects radionuclide sorption has not been performed.

Extraction of Uranium from Acid Mine Drainage Simulant:

Acid mine drainage (AMD) simulant was prepared as in J. Haz. Mater. (2007) 148, 499-504, at a pH=2.7.

TABLE 3

Composition of Acid Mine Drainage Simulant

| Component | mg/L | MW | mM |
| --- | --- | --- | --- |
| U | 12 | 238.03 | 0.050 |
| Mn | 173 | 54.938 | 3.149 |

TABLE 3-continued

Composition of Acid Mine Drainage Simulant

| Component | mg/L | MW | mM |
| --- | --- | --- | --- |
| Ca | 158 | 40.078 | 3.942 |
| Mg | 8.9 | 24.305 | 0.366 |
| Al | 170.4 | 26.982 | 6.315 |
| Zn | 41 | 65.38 | 0.627 |
| Fe | 180 | 55.845 | 3.223 |
| SO$_4$ | 1400 | 96.061 | 14.574 |
| F | 110 | 18.998 | 5.790 |

AMD simulant was added to a HDPE bottle and pH was adjusted to 2.7. Porous metal materials were washed with DI water and pH was adjusted to 2.7. Porous metal materials were added at two different concentrations m/v=0.1 (4 mg in 40 mL) and m/v=1 (10 mg in 10 mL) and agitated for 1 hour at 300 RPM on the plate shaker. The porous metal sorbent was collected by centrifugation and the supernatant was recovered for analysis by ICP-MS.

Extraction of Radionuclides from High Level Waste:

Preparation of Simulated Waste Solutions:

The MIL-125(Ti), TiOx, and TiOx-H$_2$O$_2$ were evaluated as possible sorbents for the separation of strontium and actinides from high level nuclear waste (HLW), like that stored at the Savannah River Site (SRS). In addition, the Sr removal capability of the TiOxyPhos, ZrOx, and ZrOxyPhos were also examined in the HLW simulant. For this testing, simulated HLW solutions were prepared with a similar chemical composition to typical tank waste stored at SRS. All solutions were prepared using reagent grade chemicals and ultrapure water (MilliQ Element). Table 4 provides a summary of the composition of the simulated waste solution used in the performance testing. Prior to the addition of sodium carbonate to the simulated waste solution, the sodium carbonate was dissolved in ultrapure water and contacted with MST for a minimum of 48 hours to remove any tramp strontium. Radioactive components included $^{85}$Sr and $^{137}$Cs radiotracers (Perkin Elmer Life Sciences, Boston, Mass.), uranyl nitrate hexahydrate (Mallinckrodt, Phillipsburg, N.J.), and nitric acid solutions of plutonium(IV) and neptunium(V), which derive from plutonium and neptunium production operations at SRS. After assembling, the solution was allowed to mix for 2 weeks at ambient room temperature using a magnetic stirrer. After this equilibration time, the solution was filtered through a 0.45-micron Nylon-membrane filter to remove any undissolved solids. The filtrate was stored in a tightly-stoppered, high density polyethylene (HDPE) bottle at ambient laboratory temperature. Due to the relatively short half-life of $^{85}$Sr, this radiotracer was added to the simulant just prior to testing. The composition of the simulated solution is provided in Table 4.

TABLE 4

Composition of Simulated High Level Waste Solution.

| Component | Measured Concentration |
| --- | --- |
| NaNO$_3$ | 2.35 ± 0.18M |
| NaOH | 1.27 ± 0.13M |
| Na$_2$SO$_4$ | 0.531 ± 0.040M |
| NaAl(OH)$_4$ | 0.389 ± 0.039M |
| NaNO$_2$ | 0.127 ± 0.010M |
| NaCO$_3$ | 0.0302 ± 0.0030 |
| Total Na | 5.05 ± 0.51M |
| Total Sr | 0.676 ± 0.135 mg/L |
| $^{85}$Sr | ≥10,000 dpm/mL (target) |

TABLE 4-continued

Composition of Simulated High Level Waste Solution.

| Component | Measured Concentration |
|---|---|
| Total Pu | 0.128 ± 0.006 mg/L |
| $^{237}$Np | 0.463 ± 0.093 mg/L |
| Total U | 10.1 ± 2.02 mg/L |
| $^{137}$Cs | 123,000 ± 6130 dpm/mL |

Batch Contact Tests with Simulated Waste Solution:

Strontium and actinide removal testing with the simulant occurred at 25° C. with sorbent concentrations targeted to provide an equivalent Ti concentration as the current baseline material used at SRS (i.e., 0.4 g/L of monosodium titanate (MST) or 0.192 g Ti/L). Tests including the TiOx-$H_2O_2$ were performed using a lower concentration to provide an equivalent Ti concentration as what is proposed for the modified MST (i.e., 0.2 g/L of modified MST (mMST) or 0.096 g Ti/L). Samples of MST and mMST were also run in these tests to provide a direct comparison. The MST used in these studies was prepared using a sol-gel process developed at the Savannah River National Laboratory (SRNL) and supplied by Optima Chemical Group LLC (Douglas, Ga., Lot #00-QAB-417) as a 15 wt % suspension in water containing 0.10-0.15 M NaOH and 100-150 mg/L $NaNO_2$. mMST used in these studies was prepared by the post-synthesis treatment of MST with hydrogen peroxide. Bench-scale quantities of the mMST were prepared using 25 grams of the Optima-supplied MST. Test bottles were shaken at 175 rpm in a shaker-oven during sorption testing. Sampling of the test bottles occurred at varying times of contact. Prior to sampling the test bottles, the bottles were manually agitated to obtain a representative sub-sample of both the solids and solutions. The samples were filtered through 0.10-μm polyvinylidene fluoride (PVDF) membrane syringe filters to remove the solids. A measured amount of the filtrate was then acidified with an equal volume of 5 M nitric acid solution, mixed well, and allowed to stand with occasional mixing for a minimum of 2 hours before radiochemical analyses. Gamma spectroscopy measured the $^{85}$Sr activity. The $^{239,240}$Pu content was analyzed by radiochemical separation of the plutonium followed by alpha counting of the extracted plutonium. Selected isotopes including $^{86,88}$Sr, $^{237}$Np, $^{239,240}$Pu, and $^{235,238}$U were also measured by inductively coupled plasma-mass spectrometry (ICP-MS).

Results and Discussion

Synthesis and Characterization.

The MOF templates MIL-125 and UiO-66, with framework formulas $Ti_8O_8(OH)_4(BDC)_6$ and $Zr_6O_4(OH)_4(BDC)_6$ (BDC=1,4-benzenedicarboxylate), respectively, were prepared by solvothermal procedures that were modified from the literature syntheses. These MOFs were selected as precursors because they share a common bridging ligand and possess stable SBUs formed from metal-oxo clusters. Characterization by transmission electron microscopy (TEM) and scanning electron microscopy (SEM) revealed distinct crystals for both MOFs, with MIL-125 having disc-shaped morphology and UiO-66 having octahedral morphology. The identity of these MOF precursors was confirmed through powder X-ray diffraction (PXRD) and thermogravimetric analysis (TGA), which are consistent with those previously reported. BET surface areas similar to those reported in the literatures were obtained for the materials using a previously published freeze-drying technique.

Figure 38A:
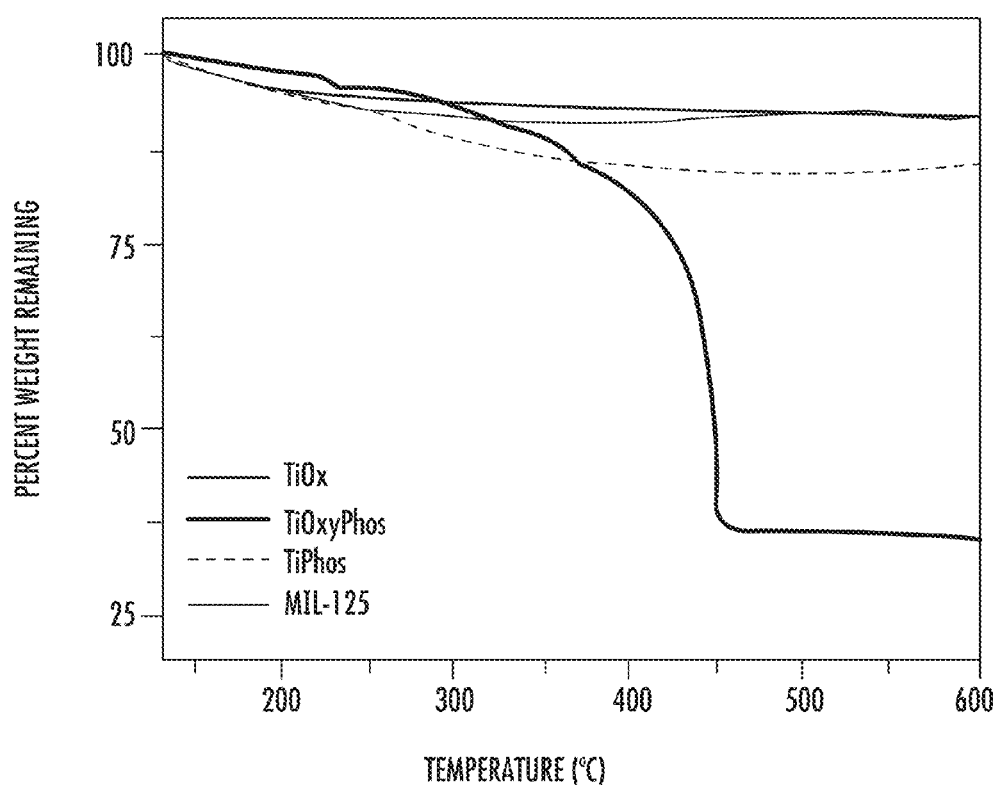
FIG. 38A-38F are graphs setting forth data for MOF templates and MOF-derived porous inorganic materials. a) TGA of Ti materials show no significant weight loss, while the MIL-125 template shows a distinct drop in weight around 400° C. b) PXRD reveals long range ordering for the MIL-125 template beyond 2θ of 50 degrees, while post-treatment materials show no significant ordering. c) Nitrogen isotherm for surface area characterization of the MIL-125 templated materials reveal preservation of porosity and surface areas, with amplified hysteresis loops for materials prepared with Na$_3$PO$_4$ or H$_3$PO$_4$. d) TGA of Zr materials show no significant weight loss, while the MIL-125 template shows a distinct drop in weight around 400° C. TGA, e) PXRD, and f) nitrogen isotherms of Zr materials possess characteristics similar to those derived from MIL-125.
Figure 38B:
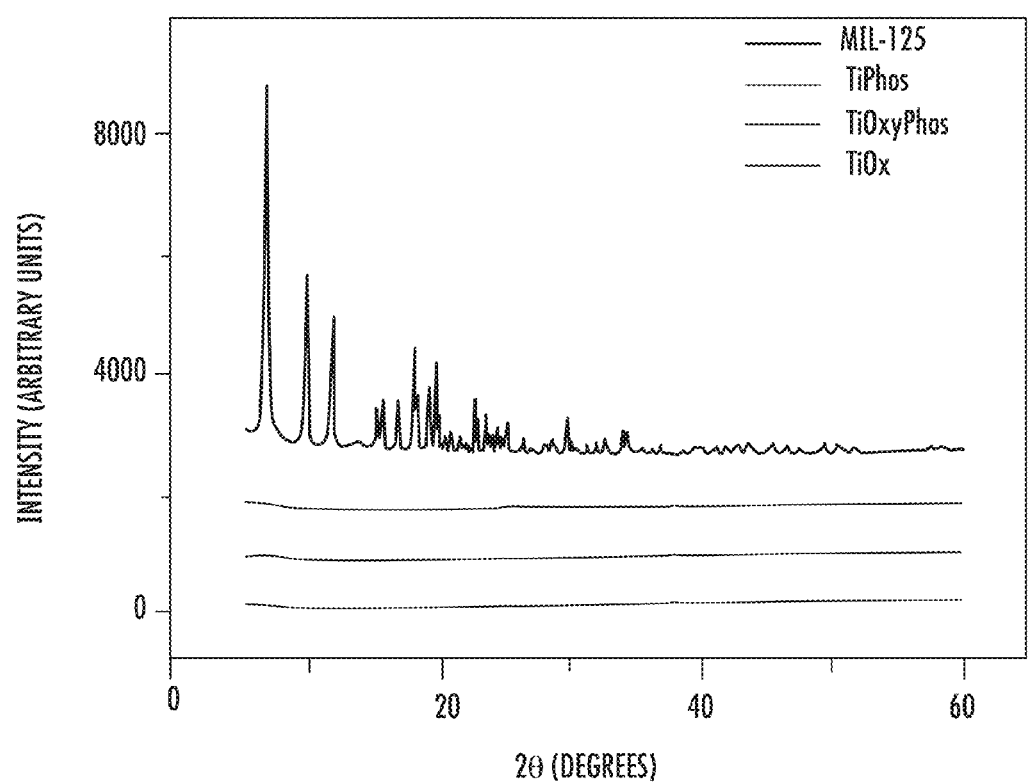
Figure 38C:
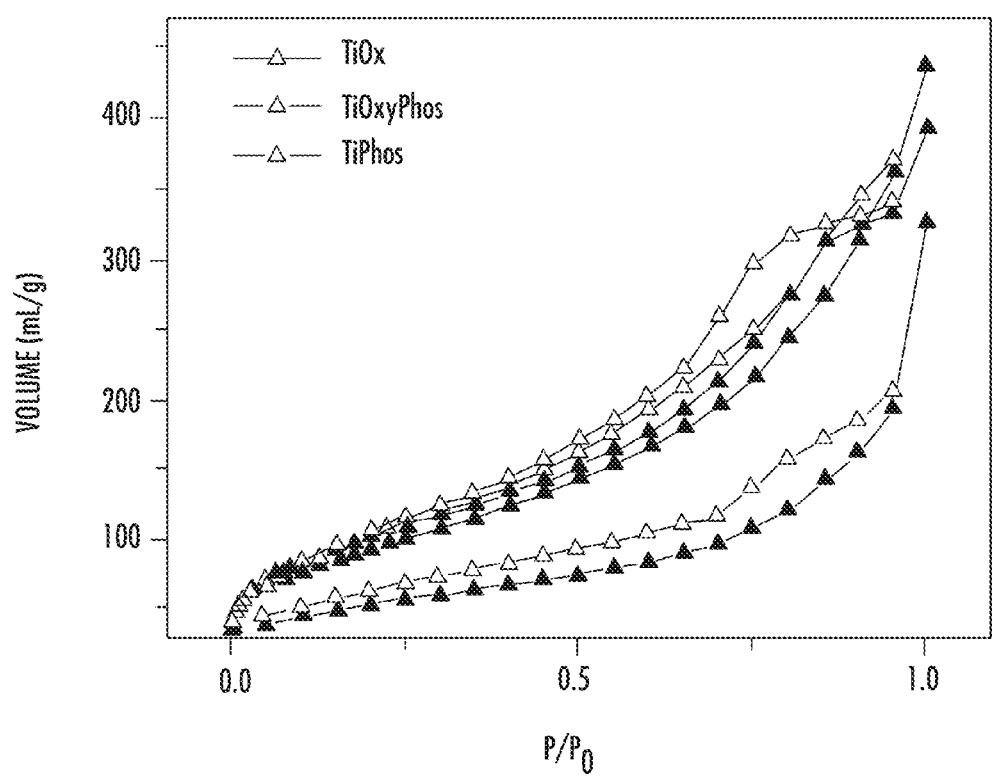
Figure 38D:
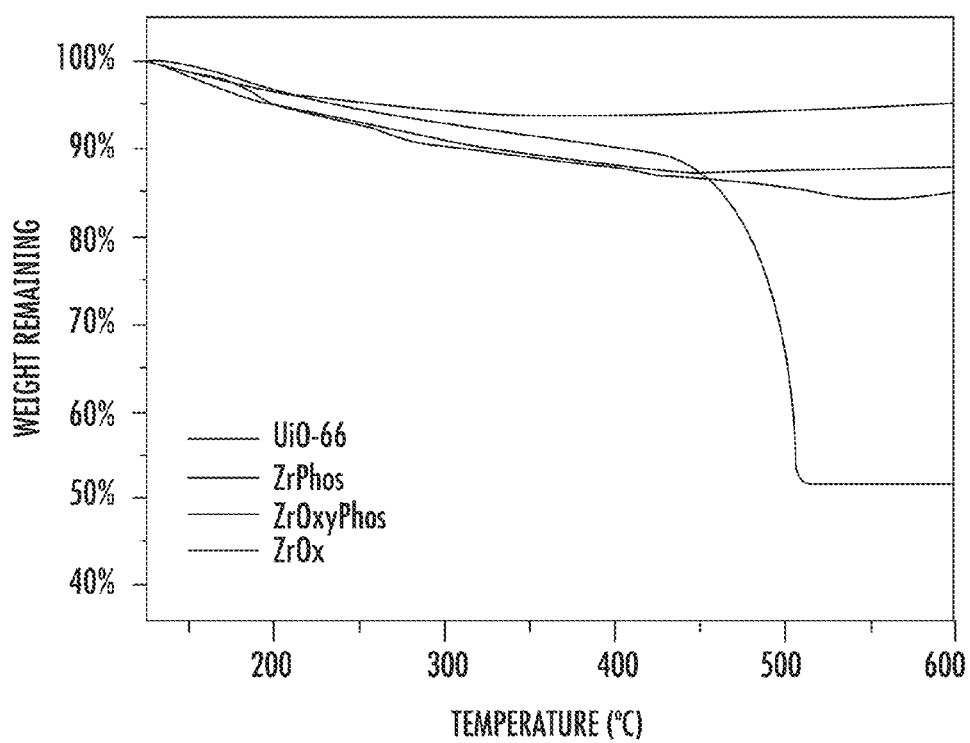
Figure 38E:
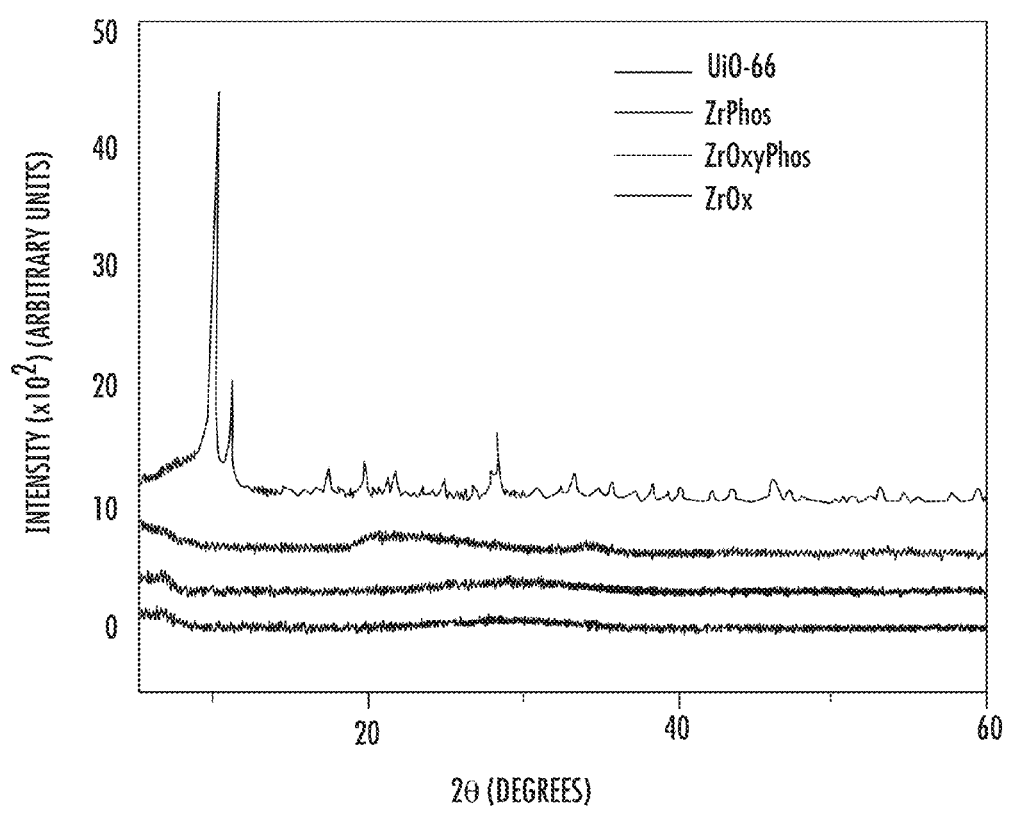
Figure 38F:
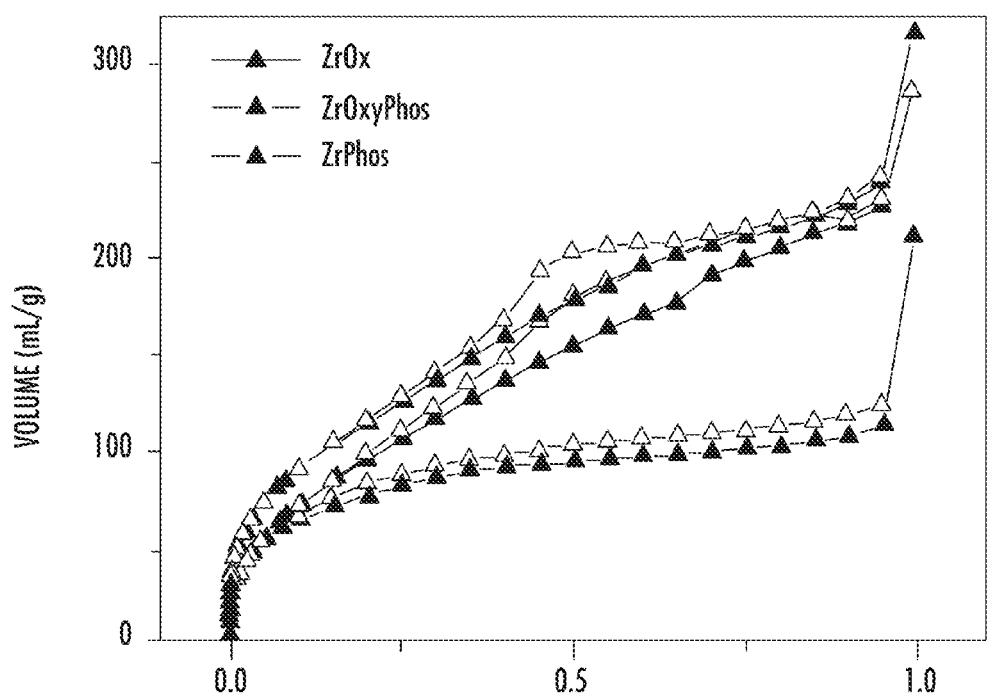

It was believed that the organic linkers could be removed by introduction of an appropriate digestion solution. Thermodynamics would drive a ligand exchange process where metal atoms from the SBUs link together via inorganic bridging groups present in the digestion solution. To evaluate this hypothesis, the MOF templates were suspended overnight in aqueous solutions of NaOH, $Na_3PO_4$, or $H_3PO_4$, followed by collection via centrifugation and multiple washes with water to yield porous hydroxide (MOx), oxyphosphate (MOxyPhos), and phosphate (MPhos) materials, where M=Ti or Zr. MOFs treated with $H_3PO_4$ were also washed with DMF to remove the terephthalic acid liberated from the MOF during the ligand extraction process. In contrast to that of the MOFs, TGA measurements of the products revealed no weight loss apart from residual solvent evaporation (FIGS. 38a and 38d). The absence of any distinct weight loss from decomposition of organic material indicates the bridging ligands were fully removed during the treatment process, and investigation by PXRD revealed the materials were amorphous (FIGS. 38b and 38e).

Observation by electron microscopy revealed the inorganic materials retained the morphology of the original MOF precursor. SEM imaging shows the surface of the materials to be irregular compared to the original framework, which can be attributed to the formation of pores during the decomposition process TEM images revealed electron permeability was markedly increased following treatment with the digest solution, in some instances to the point of near transparency. The dimensions of the MOF-templated materials were observed to be smaller than those of the MOF precursors, which follows as a consequence of removing the bridging ligand. The diameters for all materials were investigated by dynamic light scattering (DLS) measurements, which revealed MIL-125 templated materials decreased by 53-61%, while UiO-66 templated materials decreased by 35-57% (FIGS. 43-50 and Table 5). These data are consistent with the reduction of the particle dimensions following the selective extraction of BDC ligands. The composition of these materials was assessed through inductively coupled plasma mass spectrometry (ICP-MS). Due to the stability of the sorbents, microwave digestion was performed at 180° C. in concentrated $H_2SO_4$. ICP-MS data reveal distinctly different metal composition than that of non-porous metal-oxides, metal-phosphates, or MOF precursors (Table 6). Energy dispersive spectroscopy (EDS) revealed the incorporation of Na when MOF precursors were treated with solutions derived from Na salts (FIG. 51), but otherwise supported the ICP-MS data.

TABLE 5

DLS Data for MOF Templates and Resulting Inorganic Materials

| | Z Avg (d, nm) | Number Average (d, nm) | PDI |
|---|---|---|---|
| MIL-125 | 1780 | 1554 | 0.156 |
| TiOx | 1211 | 833 | 0.330 |
| TiOxPhos | 1711 | 954 | 0.416 |
| TiPhos | 902 | 756 | 0.288 |
| UiO-66 | 449 | 394 | 0.138 |
| ZrOx | 262 | 225 | 0.190 |
| ZrOxPhos | 232 | 137 | 0.174 |
| ZrPhos | 250 | 200 | 0.160 |

TABLE 6

ICP-MS compositions for MOF-templated Materials and Possible Formulas

| Material | Formula | Metal Calc. | Metal Exp. | Phosphorus Calc. | Phosphorus Exp. |
|---|---|---|---|---|---|
| MIL-125 | $Ti_8O_8(OH)_4(BDC)_6$ | 25% | — | — | — |
| TiOx | $Ti_8O_8(OH)_4(\mu_2\text{-}OH)_{12}$ | 49% | 55.4% | — | — |
| TiOxPhos | $Na[Ti_8O_8(OH)_4(\mu_2\text{-}OH)_{10}(PO_4)]$ | 43% | 37.7% | 3.5% | 2.5% |
| TiPhos | $Ti_8O_8(OH)_4(H_2PO_4)_{12}$ | 22% | 30.1% | 21% | 21.9% |
| $TiO_2$ | $TiO_2$ | 60% | — | — | — |
| $Ti_3(PO_4)_4$ | $Ti_3(PO_4)_4$ | 27% | — | 24% | — |
| UiO-66 | $Zr_6O_4(OH)_4(BDC)_6$ | 33% | — | — | — |
| ZrOx | $Zr_6O_4(OH)_4(\mu_2\text{-}OH)_{12}$ | 62% | 52.6% | — | — |
| ZrOxPhos | $Na[Zr_6O_4(OH)_4(\mu_2\text{-}OH)_{10}(PO_4)]$ | 56% | 49.4% | 3.1% | 3.4% |
| ZrPhos | $Zr_6O_4(OH)_4(H_2PO_4)_{12}$ | 30% | 30.4% | 20% | 24.9% |
| $ZrO_2$ | $ZrO_2$ | 74% | — | — | — |
| $Zr_3(PO_4)_4$ | $Zr_3(PO_4)_4$ | 42% | — | 19% | — |

Nitrogen-uptake isotherms were used to investigate surface areas and pore sizes of the materials. Brunauer-Emmett-Teller (BET) analyses of the materials revealed that porosity was preserved by this novel ligand extraction method. Surface areas of 329 m$^2$g$^{-1}$, 184 m$^2$g$^{-1}$, 366 m$^2$g$^{-1}$, 379 m$^2$g$^{-1}$, 281 m$^2$g$^{-1}$, and 401 m$^2$g$^{-1}$ were obtained for TiOx, TiOxyPhos, TiPhos, ZrOx, ZrOxyPhos, and ZrPhos, respectively. Pore size distribution was initially investigated for all materials using the method of Barrett-Joyner-Hallenda (BJH), however all significant pore features were observed to be smaller than 20 nm where the method is inaccurate. The Horvath-Kawazoe (HK) method was used in an effort to examine the fine pore structure. Plots of pore size distribution with both BJH and HK methods are included for all materials in FIGS. 52-57. TiOx had significant pore features of 13.8 Å, 30 Å, and 100 Å. TiOxyPhos also had pores of 13.8 Å with a second significant pore distribution around 80 Å. TiPhos only had one feature with an average pore size of 5.6 Å. In comparison, ZrOx and ZrPhos had pores approximately 5.0 Å, with a second lesser feature around 60 Å or 50 Å, respectively, while ZrOxyPhos had pores closer to 12.8 Å. All materials possess Type IV isotherms, with hysteresis loops resulting from capillary condensation within pores, indicating the presence of mesopores of diameters of 3 nm to 10 nm. These mesopores are believed to facilitate rapid transport of adsorbates into the MOF-templated materials, and are essential to their functionality as radionuclide sorbents. Interestingly, the observed hysteresis appears to be amplified for both materials prepared through treatment with H$_3$PO$_4$, though it is also increased for the Ti material prepared with Na$_3$PO$_4$. While the rationale for this observation is not immediately evident, the variation in isotherms further reveal the differences obtained through choice of treatment solution.

Though the weight-specific surface areas of the materials are significantly smaller than those of their MOF precursors (1550 m$^2$g$^{-1}$ for MIL-125 and 1521 m$^2$g$^{-1}$ for UiO-66), this decrease is attributable to removal of the organic bridging ligands which are significantly less dense than the inorganic SBUs. Volume-specific surface areas allow for a more meaningful comparison, as these values are not skewed by the material density. Multiplying the mass-based surface area by the material density reveals MIL-125 and UiO-66 have volumetric surface areas of 1124 m$^2$ cm$^{-3}$ and 1115 m$^2$ cm$^{-3}$, respectively. In contrast, using densities for TiO$_2$ (4.23 g cm$^{-1}$) and ZrO$_2$ (5.68 g cm$^{-1}$) gives approximate volumetric surface areas of 1392 m$^2$ cm$^{-3}$ for TiOx and 2153 m$^2$ cm$^{-3}$ for ZrOx. These measurements indicate volumetric surface areas were not only preserved during this treatment process, but in both instances were significantly increased over the MOF precursors. Importantly, these materials were prepared from only two MOF templates, demonstrating that pore size, structure, and composition can be modified by choice of treatment solution. This provides a unique means for influencing the structure of an inorganic material, and allows for systematic tuning to impart and optimize desired characteristics for a variety of applications.

X-Ray Absorption Spectroscopy.

Figure 39A:
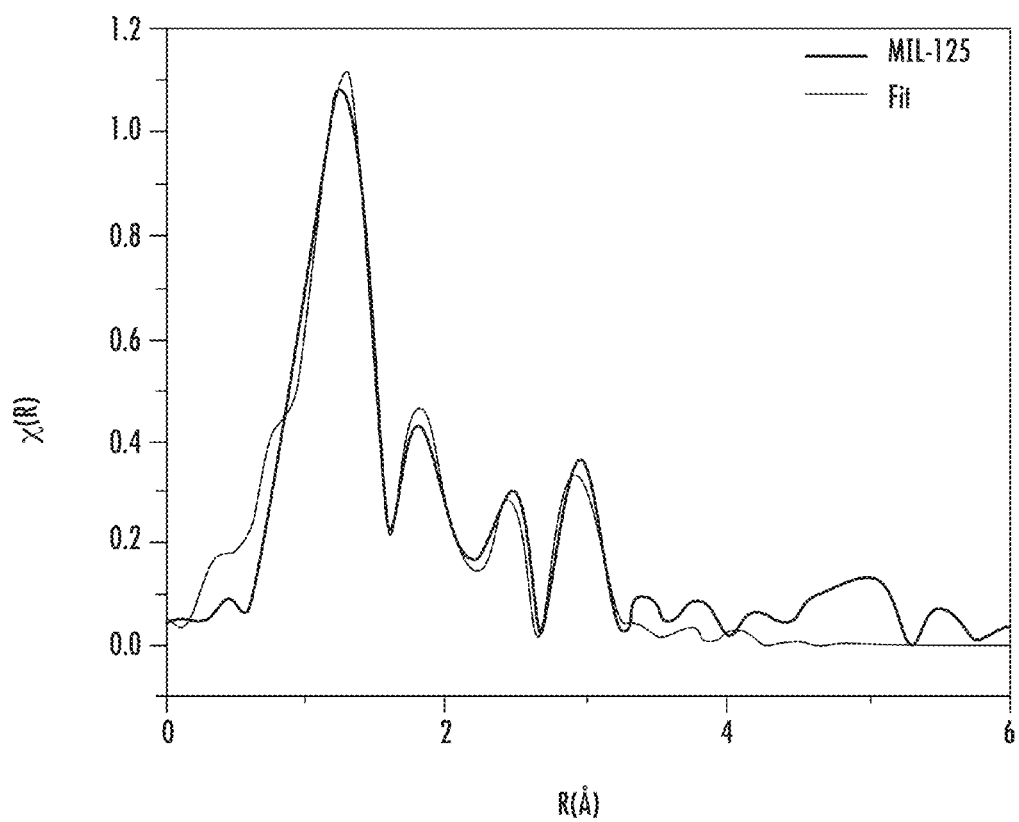
FIG. 39A-39F sets forth X-ray absorption data for MOF precursors and materials obtained by topotactic transformation of MOF templates. a) Experimental EXAFS spectrum in R for MIL-125 (solid trace) and fit (dashed line) obtained using the crystal structure model. b) Experimental EXAFS spectrum for Ti K-Edge for MIL-125 and following treatment with NaOH and H$_3$PO$_4$. c) XANES spectrum for the Ti K-Edge of materials prepared from MIL-125. The pre-edge feature (inset) contains three overlapping peaks, indicative of six-coordinate Ti. d) Experimental EXAFS spectrum in R for UiO-66 (solid trace) and fit (dashed line) obtained using the crystal structure model. e) Experimental EXAFS spectrum for Zr K-Edge for UiO-66 and following treatment with NaOH and H$_3$PO$_4$. f) XANES spectrum for Zr K-Edge for UiO-66 and following treatment with NaOH and H$_3$PO$_4$. The pre-edge shoulder region is enlarged in the inset plot, showing a change of intensity with different treatment solutions.
Figure 39B:
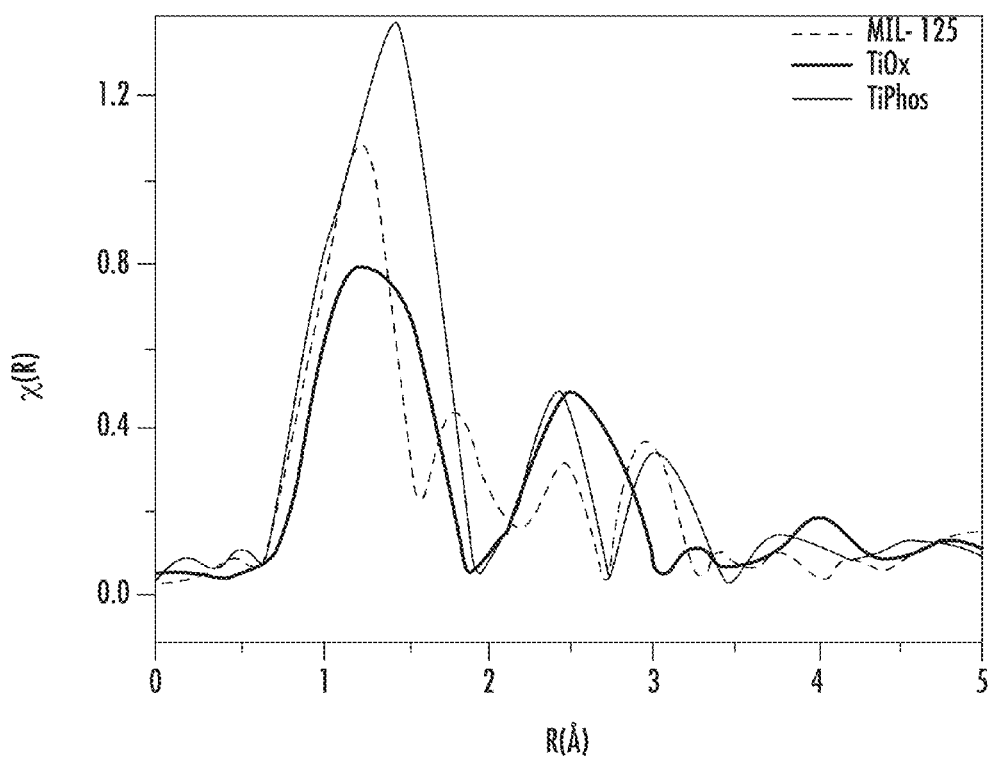
Figure 39C:
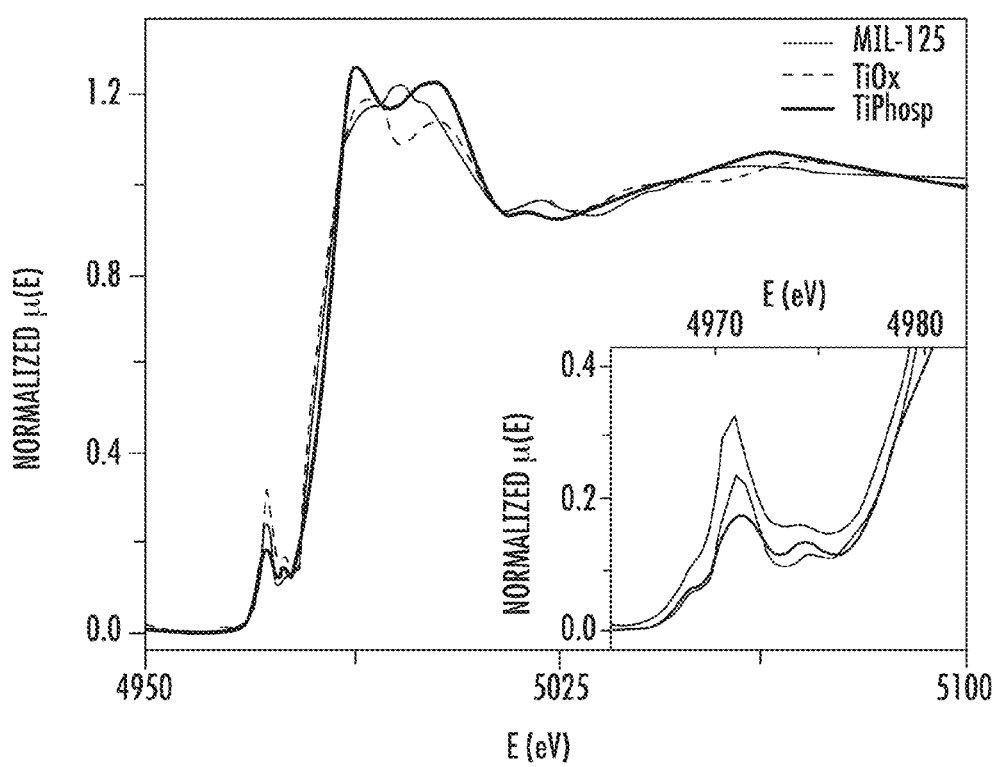

X-ray absorption spectroscopy (XAS) studies were performed to investigate the local coordination environments of the Ti or Zr sites in the amorphous inorganic materials compared to those of the original crystalline MOF structures. The X-ray absorption near edge structure (XANES) region of Ti K-edge spectra typically contains well resolved pre-edge features whose relative intensities are indicative of the coordination geometry of the absorbing Ti atoms. Prior XAS analysis of TiO$_2$ and amorphous titanium phosphates revealed the presence of three small peaks in the pre-edge region, which unambiguously indicated Ti in a six-coordinate environment with approximately octahedral geometry. A similar pre-edge pattern was also observed in the XAS data for the MOF precursor. This observation indicates a comparable six-coordinate Ti environment, which is consistent with the known structure derived from X-ray diffraction studies. Comparison of these XANES data with those obtained for the amorphous Ti materials shows minimal change in pre-edge features for all three inorganic materials, suggesting the preservation of a six-coordinate Ti environment following treatment regardless of solution. Notably, the pre-edge region is significantly different in spectra obtained for materials containing Ti atoms with fourfold, tetrahedral coordination environments, demonstrating a derivative of Ti(OH)$_4$ has not been formed. X-ray absorption fine structure (EXAFS) data collected for the Ti materials provide insight to the short-range structure around X-ray absorbing atoms. A reasonable fit to these data were obtained for the MIL-125 MOF precursors by relying on the known crystal structure as the model for generating theoretical scattering path data (FIG. 39a and Table 7). The porous sorbent materials produce EXAFS spectra that are significantly different from those of the MOF precursor, indicating some change in the local coordination environment of the metal sites. Without a priori knowledge on the type of coordination changes, the overlapping and multiple scattering paths coupled with the inhomogeneity of the local structure, typical of amorphous materials, prevent accurate fitting of the EXAFS data and therefore a quantitative assessment of the local structure changes. This is not uncommon. For example, α-Ti(HPO$_4$)$_2$.H$_2$O is not fit beyond the first coordination shell. Qualitative assessment of the EXAFS data however, which show changes across the entire measurable distance range, reveals that the amorphous MOF-derived Ti materials experience not just altered coordination environment at $2^{nd}$ and $3^{rd}$ shell scattering distances but in the immediate coordination sphere as well. These XAS data suggest that the six coordinate environment of the Ti scattering atom is preserved throughout ligand extraction.

TABLE 7

Summary of EXAFS Fitting Parameters and Distance Information for MIL-125 Obtained from Crystal Structure[a]

| Scattering Path | Distance from Crystal Structure | $R_{eff}$ (EXAFS fit) | Degeneracy (N) | $\sigma^2$ |
|---|---|---|---|---|
| Ti—O(3) | 1.894 | 1.983 | 2 | 0.003 |
| Ti—O(1) | 1.941 | 2.030 | 1 | 0.003 |
| Ti—O(2) | 1.982 | 1.920 | 2 | 0.008 |
| Ti—O(4) | 1.983 | 1.922 | 1 | 0.008 |
| Ti—Ti | 2.761 | 2.815 | 1 | 0.004 |
| Ti—C(4) | 2.868 | 2.907 | 2 | 0.0008 |
| Ti—C(4)—O(3) | 2.976 | 3.015 | 4 | 0.0008 |
| Ti—O(3)-2 | 3.350 | 3.389 | 2 | 0.001 |
| Ti—O(3)—O(2) | 3.874 | 3.913 | 4 | 0.001 |
| Ti—O(3) [+] O(2) | 3.875 | 3.914 | 4 | 0.001 |
| Ti—O(1)—O(4) | 3.234 | 3.273 | 2 | 0.001 |

[a] $\Delta E_0 = -0.92$ eV and $S_0^2 = 0.96$ used for each scattering path. R-factor: 0.009

Figure 39D:
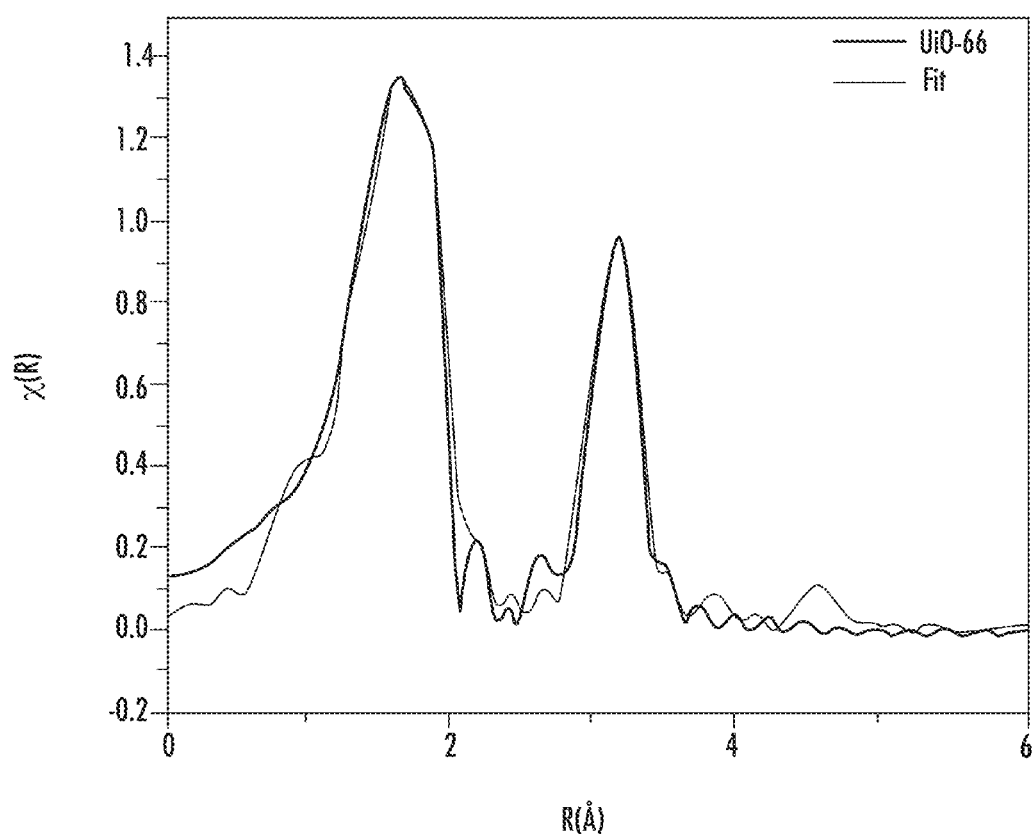
Figure 39E:
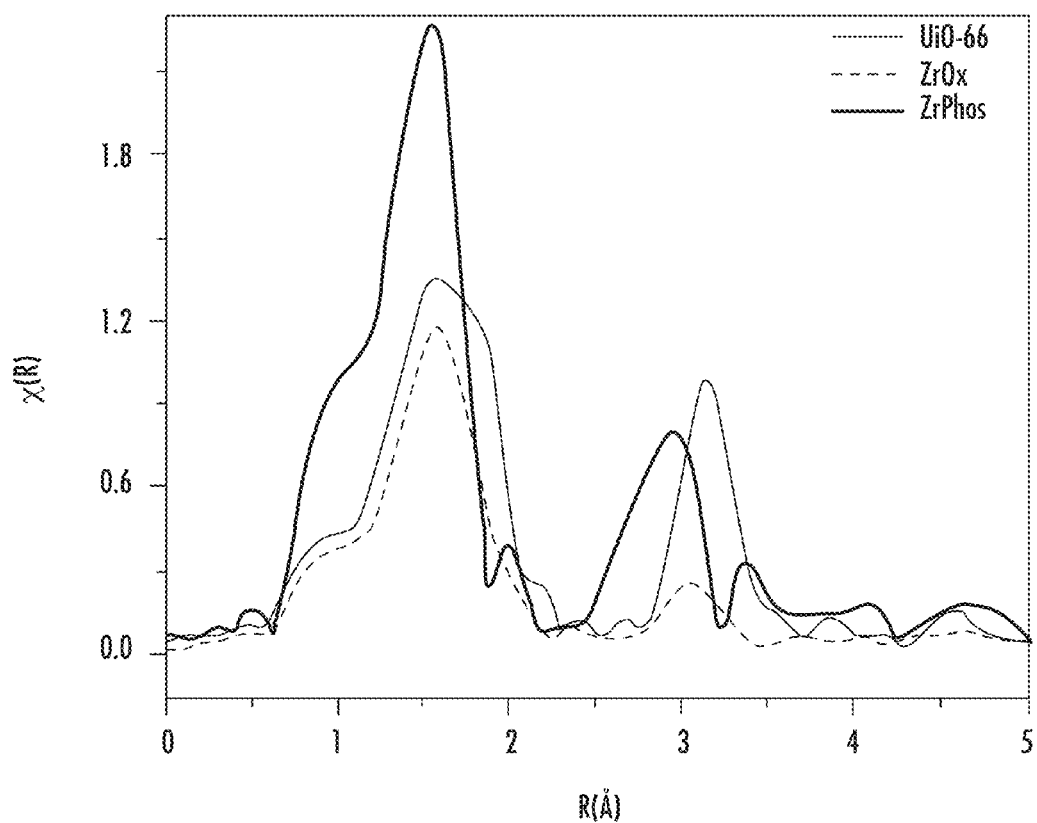
Figure 39F:
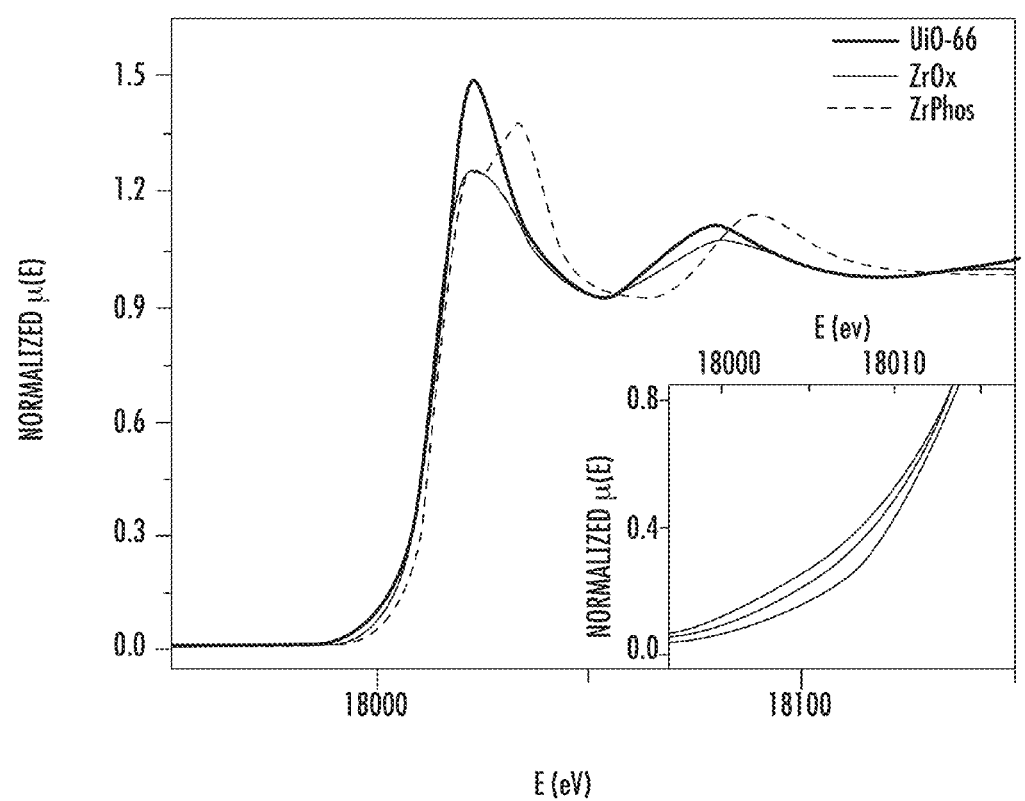
Figure 40A:
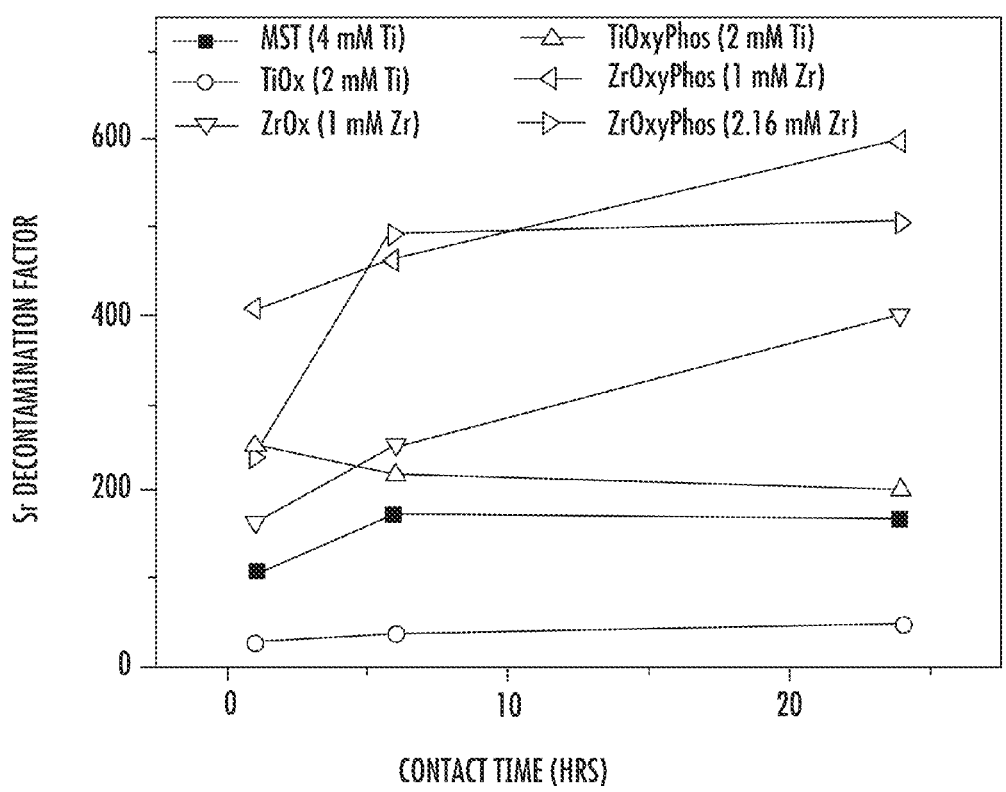
FIG. 40A-40D sets forth data showing the separation of radionuclides from HLW using MOF-derived inorganic materials over 24 hours. MOF-templated materials were added at different concentrations of metal, as indicated in the legend for each plot. Plots display decontamination factor as a function of contact time (hrs) for a) strontium, b) neptunium, c) plutonium, and d) uranium. Open symbols signify analyses surpassing the limits of detection. Lines are a guide for the eye.
Figure 40B:
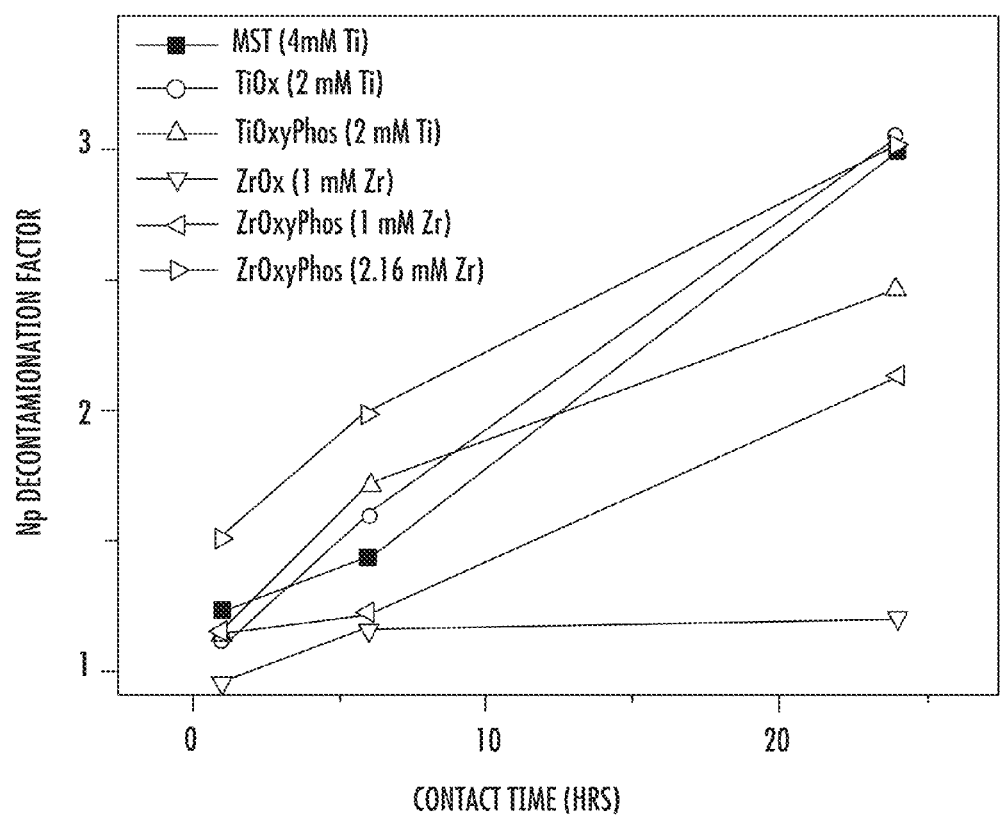
Figure 40C:
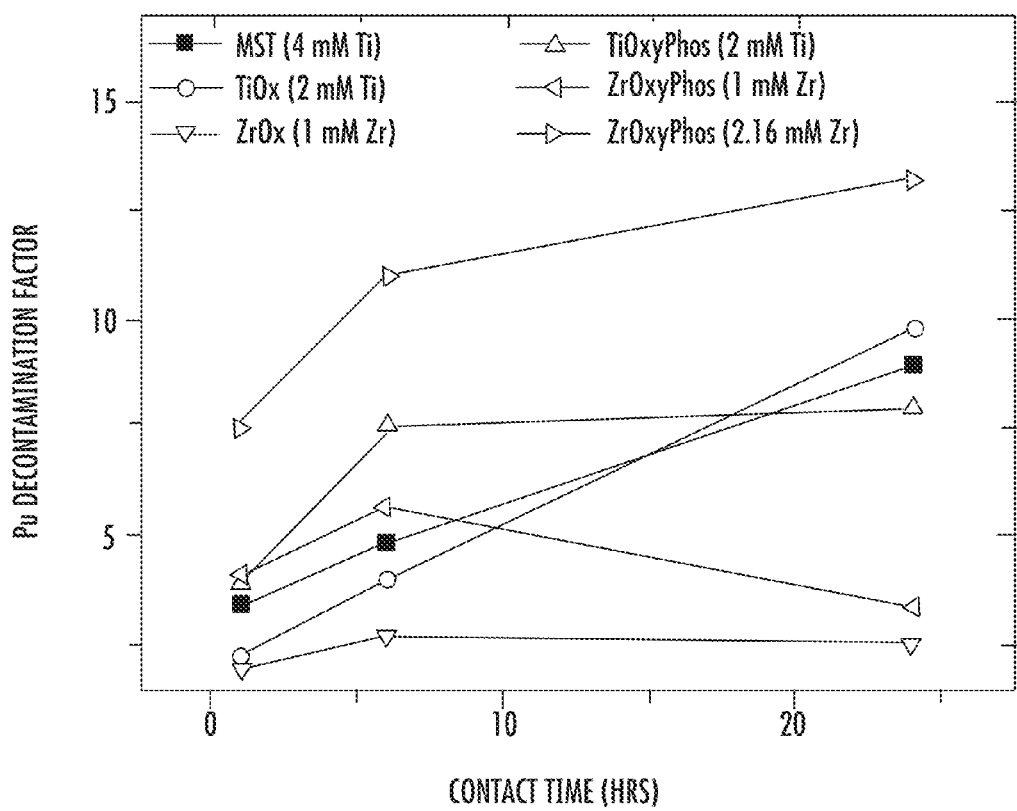
Figure 40D:
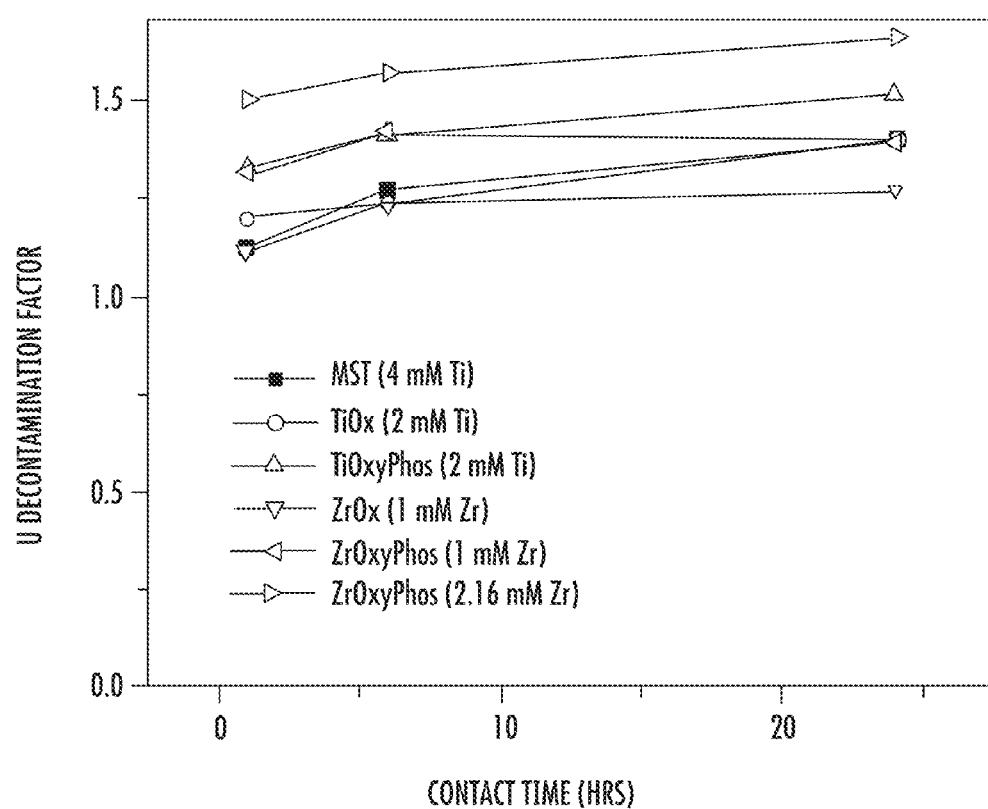

Similar conclusions for the Zr materials can be drawn through their XAS analysis. The type of XANES analysis that was discussed for the Ti materials is not possible for the Zr-based systems since, the pre-edge features are not resolved, as is usually the case for heavier ($2^{nd}$ and $3^{rd}$ row) elements. However, an increased intensity in the pre-edge shoulder region may be attributed to increased 1 s to 4 d transitions resulting from reduced symmetry of Zr sites. EXAFS analysis revealed changes in the coordination environment for the metals upon treatment with digestion solutions. As in the case of the Ti MOF precursor, a good fit to the EXAFS data was obtained for the Zr-MOF UiO-66 using the known structure as the model (FIG. 39d and Table 8). The parameters obtained from this fit are consistent with those of recently reported EXAFS data for this MOF The first shell peak, attributed to the Zr—O scattering paths reflects two distinct Zr—O coordination distances separated by ~0.2 Å. The feature at slightly longer distance is mostly attributed to the Zr—Zr scattering paths and arises due to the unique atomic arrangement in the SBU. In the amorphous Zr based materials, two distinct qualitative changes are observed: the first shell peak coalesces into one average Zr—O scattering distance and the intensity ratio between the $1^{st}$ and $2^{nd}$ shell feature is altered. Again, unique statistically significant fits to these data were precluded by the combination of unknown coordination number and geometry changes and unknown amount of inhomogeneity introduced to the local structure in creating the amorphous material.

TABLE 8

Summary of EXAFS Fitting Parameters and Distance Information for UiO-66 Obtained from Crystal Structure[a]

| Scattering Path | Distance from Crystal Structure | $R_{eff}$ (EXAFS fit) | Degeneracy (N) | $\sigma^2$ |
|---|---|---|---|---|
| Zr—O (short) | 2.09 | 2.08 | 2 | 0.004 |
| Zr—O (long) | 2.23 | 2.24 | 6 | 0.003 |
| Zr—Zr | 3.53 | 3.52 | 4 | 0.005 |

[a] $\Delta E_0 = -0.97$ eV and $S_o^2 = 1.00$ used for each scattering path. R-factor: 0.009

Extraction of Uranium from Acid Mine Drainage Simulant.

Results from sorption testing in simulated acid mine drainage are shown in Tables 9 and 10.

TABLE 9

Metal Concentration in Supernatant Post Sorption by TiOx

| | | | m/v = 0.1 | | | m/v = 1 | | |
|---|---|---|---|---|---|---|---|---|
| | Initial (mg/L) | Control (mg/L) | Final (mg/L) | $q_{max}$ | % rmvd | Final (mg/L) | $q_{max}$ | % rmvd |
| U | 14.5 | 14.79 | 11.968 | 27.95 | 18.98 | 1.738 | 12.76 | 88.24 |
| Mn | 155.4 | 155.10 | 151.78 | 33.2 | 2.14 | 146.17 | 8.93 | 5.75 |
| Ca | 128.31 | 126.55 | 130.404 | — | — | 127.2 | — | — |
| Mg | 17.74 | 18.36 | 18.432 | — | — | 18.67 | — | — |
| Al | 385 | 355 | 352 | 30 | 0.84 | 343 | 12 | 3.4 |
| Zn | 48.4 | 47.2 | 46.50 | 7.01 | 1.48 | 44.66 | 2.54 | 5.38 |
| Fe | 198.8 | 194.8 | 199.8 | — | — | 185.45 | 9.35 | 4.80 |

TABLE 10

Metal Concentration in Supernatant Post Sorption by TiOxyPhos

| | | | m/v = 0.1 | | | m/v = 1 | | |
|---|---|---|---|---|---|---|---|---|
| | Initial (mg/L) | Control (mg/L) | Final (mg/L) | $q_{max}$ | % rmvd | Final (mg/L) | $q_{max}$ | % rmvd |
| U | 14.5 | 14.79 | 11.569 | 32.12 | 21.73 | 2.33 | 12.17 | 85.92 |
| Mn | 155.4 | 155.10 | 149.05 | 60.49 | 3.9 | 140.85 | 14.25 | 9.18 |
| Ca | 128.31 | 126.55 | 126.59 | — | — | 123.13 | 3.42 | 2.70 |
| Mg | 17.74 | 18.36 | 17.98 | 3.9 | 2.12 | 17.89 | 0.47 | 2.55 |
| Al | 385 | 355 | 338.2 | 168 | 4.73 | 326.8 | 28.2 | 7.94 |
| Zn | 48.4 | 47.2 | 45.79 | 14.1 | 2.98 | 43.8 | 3.4 | 7.2 |
| Fe | 198.8 | 194.8 | 188 | 68 | 3.49 | 183.4 | 11.4 | 5.85 |

Decontamination of High Level Waste (HLW).

The wet processing conditions and high porosity of the MOF-derived materials allow applications as novel sorbents. The utility of these stable materials in several radionuclide separation processes were evaluated. Initial experiments used NaOH and $Na_3PO_4$ treated materials for decontamination of HLW, the byproduct of dissolving spent fuel rods for extraction of enriched uranium and weapons-grade plutonium (Pu). The Savannah River Site (SRS) near Aiken, S.C. currently houses approximately 38 million gallons of HLW that must be treated and disposed. The current disposal path involves separation of the highly radioactive species using both an inorganic sorbent and a solvent extraction process. The decontaminated stream is then disposed of on-site in a cement-like waste form, while the separated radionuclides are vitrified, along with the sludge portion of the waste, into a highly stable glass waste form suitable for geological disposal. The inorganic sorbent currently being used at SRS is a sodium titanate material, monosodium titanate (MST). This material selectively removes $^{90}Sr$ and actinides (U, Np, Pu) from the highly alkaline, high ionic strength HLW supernatant.

$Ti_3(PO_4)_4$ and $Zr_3(PO_4)_4$ are unstable at high pH, and so TiPhos and ZrPhos were not tested for this particular application. Sorption testing was performed using a simulated waste solution based on the composition of typical HLW at SRS (Table 4) MST, the current state-of-the-art sorbent used for HLW decontamination, was included in the test set for comparison. Porous titanate materials were added at one-half of the Ti concentration of MST, while Zr materials were added at approximately one-quarter molar equivalent to ensure sufficient Sr remained in solution for detection. Select results are displayed in FIG. 40A-40D as decontamination factors (DFs), which is defined as $$DF = \frac{C_0}{C_t}$$

where $C_0$ is the initial sorbate concentration and $C_t$ is the sorbate concentration at time t.

All porous inorganic materials had greatly enhanced Sr removal, surpassing the DF obtained with MST, even at lower concentrations, with the exception of TiOx. TiOx still removed 97.8% of the Sr after 24 hours when added at one-half the concentration of MST. Detailed studies indicate both U and Sr sorption occurs on the fibrous surface of MST, binding $Sr^{2+}$ by a specific adsorption mechanism rather than by ion exchange. It was proposed two Ti atoms at different radial distances contributed to the bonding of Sr by MST, while U was bound by uniquely distorted Ti octahedra. As this mechanism requires specific binding sites, it is believed that the porous inorganic materials extract Sr more rapidly due to their increased surface area allowing facile access to the entire surface of the material, and thus more potential binding sites. The Zr materials, in particular the ZrOxyPhos, had dramatically higher DFs than the MST or the other materials tested, further amplified by being added at approximately one-quarter molar equivalent to MST. Deploying this material in place of MST could increase throughput of HLW decontamination by more than an order of magnitude, mitigating a critical problem in the long term storage of nuclear waste.

The porous inorganic materials also showed excellent actinide removal performance in the HLW simulant. When compared to MST, the ZrOxyPhos material removed more Pu at a faster rate when added at a one-half molar equivalent concentration. The titanate materials, TiOx and TiOxyPhos, showed comparable performance to MST when added at one-half the concentration with a similar trend observed for U removal as well. When looking at Np removal performance, the MST, TiOx, and ZrOxyPhos all reached the same level of decontamination after 24 hours of contact, with the TiOx and ZrOxyPhos being added at one-half the molar concentration of MST.

Previously reported XAFS studies on actinides sorbed by MST indicate Np(IV) is bound by electrostatic sorption, while Pu(IV), Pu(VI), and Np(V) exhibit specific adsorption. Sorption was observed to be site specific, occurring on distorted Ti octahedra, making the coordination environment of Ti essential for good sorption. It is possible the structural change induced by using $Na_3PO_4$ as digest solution promotes formation of metal sites uniquely oriented for enhanced actinide bonding. Furthermore, these wet processing conditions yield surface hydroxyl groups, which are known to be favorable for sorption processes. The strong sorptive properties of these materials would not likely be obtained if prepared through pyrolytic techniques, as surface hydroxyl groups would be cleaved and metal coordination geometry altered by crystallization. Overall, these results show that the new porous inorganic sorbents presented here can be used for effective decontamination of HLW, often using less material than the current standard. Since these sorbents are non-elutable, they would be incorporated directly into a glass waste form for disposal; therefore, a large DF value (i.e., use of less sorbent) is the most important performance metric as there is a limit to the amount of Ti (or Zr) that can be incorporated into the glass, while still retaining the necessary stability properties of the glass.

A summary of the decontamination factors for the Sr and actinides obtained after contact with the MST, MIL-125(Ti), and TiOx is provided in Table 11; and results from testing with the mMST and TiOx-$H_2O_2$, along with the TiOx at the lower concentration are provided in Table 12. The decontamination factor is defined as follows:

$$DF = \frac{C_0}{C_t},$$

where $C_0$ is the initial sorbate concentration and $C_t$ is the sorbate concentration at time t. FIGS. 30 through 37 provide plots of the sorbate concentrations versus time and the decontamination factors versus time.

Table 13 provides the results of preliminary screening tests performed with TiOxyPhos, ZrOx, and ZrOxyPhos for Sr removal from the HLW simulant.

When added at an equivalent Ti concentration the MIL-125(Ti) worked as well, or better than, the current baseline material, MST, for both Sr and actinide removal. The TiOx had comparable actinide removal performance to the MST; however, the Sr removal was greatly enhanced. The TiOx sorbed Sr more rapidly and to a greater extent than the MST or MIL-125(Ti). The untreated MIL-125(Ti) demonstrated the best actinide removal for the three materials tested.

TABLE 11

Summary of Sr and Actinide Decontamination Factors for MST, MIL-125(Ti), and TiOx added at an equivalent Ti concentration to 0.4 g/L MST. The number in parentheses represents one sigma uncertainty.

| | Sorbent | | |
|---|---|---|---|
| | MST | MIL-125(Ti) | TiOx |
| Ti Conc. (g/L) | 0.192 | 0.193 | 0.179 |
| Sr DF | | | |
| 1 h | 29.1 (2.06) | 29.0 (2.05) | 99.4 (7.03) |
| 6 h | 40.3 (2.85) | 54.9 (3.88) | 139 (14.5) |
| 24 h | 52.6 (3.72) | 97.9 (8.13) | 135 (11.6) |
| Pu DF | | | |
| 1 h | 3.57 (0.260) | 4.17 (0.328) | 3.36 (0.257) |
| 6 h | 5.75 (0.404) | 8.62 (0.617) | 6.14 (0.414) |
| 24 h | 10.3 (0.696) | 19.7 (1.38) | 12.0 (0.821) |
| Np DF | | | |
| 1 h | 1.28 (0.362) | 1.50 (0.425) | 1.20 (0.338) |
| 6 h | 1.52 (0.430) | 2.61 (0.740) | 2.02 (0.573) |
| 24 h | 2.28 (0.645) | 6.90 (1.95) | 4.23 (1.20) |
| U DF | | | |
| 1 h | 1.07 (0.303) | 1.36 (0.385) | 1.13 (0.319) |
| 6 h | 1.17 (0.331) | 1.56 (0.441) | 1.21 (0.341) |
| 24 h | 1.28 (0.362) | 1.91 (0.540) | 1.29 (0.366) |

TABLE 12

Summary of Sr and Actinide Decontamination Factors for mMST, TiOx, and TiOx—$H_2O_2$ added at an equivalent Ti concentration to 0.2 g/L MST. The number in parentheses represents one sigma uncertainty.

| | Sorbent | | |
|---|---|---|---|
| | mMST | TiOx | TiOx—$H_2O_2$ |
| Ti Conc. (g/L) | 0.096 | 0.096 | 0.096 |
| Sr DF | | | |
| 1 h | 28.8 (2.04) | 28.9 (2.04) | 49.8 (3.52) |
| 6 h | 48.1 (3.40) | 37.6 (2.66) | 57.9 (4.10) |
| 24 h | 57.2 (4.04) | 46.4 (3.28) | 66.4 (4.69) |
| Pu DF | | | |
| 1 h | 7.17 (0.705) | 2.21 (0.180) | 31.7 (2.79) |
| 6 h | >254 | 4.04 (0.394) | >413 |
| 24 h | >685 | 9.78 (0.972) | >678 |
| Np DF | | | |
| 1 h | 1.52 (0.480) | 1.12 (0.353) | 1.84 (0.579) |
| 6 h | 2.12 (0.670) | 1.59 (0.501) | 1.84 (0.579) |
| 24 h | 2.54 (0.803) | 3.01 (0.949) | 2.04 (0.644) |
| U DF | | | |
| 1 h | 1.03 (0.292) | 1.21 (0.341) | 1.06 (0.301) |
| 6 h | 1.24 (0.352) | 1.24 (0.351) | 1.17 (0.330) |
| 24 h | 1.14 (0.323) | 1.39 (0.393) | 1.18 (0.333) |

TABLE 13

Summary of Sr Decontamination Factors for TiOxyPhos, ZrOx, and ZrOxyPhos. The TiOxyPhos was added an equivalent Ti concentration to 0.4 g/L MST, while the Zr compounds were added on an equivalent moles of metal basis. A sample of MST was run in parallel for comparison.

| | Sorbent | | | |
|---|---|---|---|---|
| | MST | TiOxyPhos | ZrOx | ZrOxyPhos |
| | | Ti or Zr Conc. (g/L) | | |
| | 0.193 | 0.193 | 0.367 | 0.366 |
| | Sr DF | | | |
| 1 h | 39.5 | 272 | 233 | >272 |
| 6 h | 57.2 | 389 | 318 | >389 |
| 24 h | 67.4 | 353 | 366 | >366 |
| 168 h | 75.8 | 341 | 575 | >575 |

Lanthanide Separations.

The second radionuclide separation application investigated was minor actinide and lanthanide separation, which is a key area of research for closing the nuclear fuel cycle. The consumption of uranium oxide fuel in a nuclear power reactor leads to the generation of many radioactive species including fission products such as Cs, Sr, and lanthanides (Ln), as well as Pu and minor actinides. The minor actinides are a large contributor to the long-term radiotoxicity of the waste generated from used nuclear fuel; therefore, their separation is desired. Current separation chemistry for this process is complex, requiring multistep schemes to accomplish adequate extraction of actinides, Ln, Cs, and Sr. Development of selective sorbents would significantly expedite waste reprocessing, potentially allowing for recovery of fissionable materials and increased energy utilization.

Experiments were performed to examine the affinity of the MOF-derived materials for Ln under acidic conditions relevant to nuclear fuel reprocessing. Experiments were performed at both pH 3 and 6 using a Ln stock solution with the composition provided in Table 1 and the hydroxide and phosphate materials (Ti and Zr) at a phase ratio of 20 mL/g. Both the sorbents and the Ln stock solution were equilibrated at the target pH prior to testing, with regular pH adjustments until the change was less than 0.1 pH units over 24 hours. The pH was also measured at the end of the experiment.

The materials performed better at higher pH where both the TiOx and ZrPhos showed excellent performance. At pH 3, ZrPhos removed between 72% and 92% of all Ln, while both TiOxyPhos and ZrOxyPhos removed approximately 50%. At pH 6 the TiOx removed greater than 98.5% of all of Ln in the test solution, while the TiOxyPhos and ZrPhos materials performed slightly better, each removing greater than 99% of all Ln present.

A decrease in pH values measured after sorption suggest different sorption mechanisms for different materials. At pH 3, ZrPhos had a post-sorption pH 1.22 units lower than the control solution, indicative of an exchange of Ln cations with surface-bound hydrogen. In contrast, TiOxyPhos was only 0.46 pH units lower than the control, and the pH of ZrOxyPhos was unchanged after sorption. Additionally, TiPhos, which absorbed less than 42% of each Ln, had the second largest deviation in pH, 0.92 pH units lower than the control. As pH was equilibrated over 96 hours until consistently stable readings were obtained, ion exchange with Ln cations is the only explanation for the change in pH. The pH readings before and after sorption are available in Table 14.

TABLE 14

Change in pH following Lanthanide Extraction

| Sample | pH 3 | | pH 6 | |
|---|---|---|---|---|
| | Pre-sorption | Post-sorption | Pre-sorption | Post-sorption |
| TiOx | 3.07 | 2.57 | 6.08 | 5.11 |
| TiOxyPhos | 3.04 | 2.48 | 6.02 | 4.92 |
| TiPhos | 3.00 | 2.02 | 5.94 | 2.77 |
| ZrOx | 3.08 | 3.73 | 5.97 | 4.72 |
| ZrOxyPhos | 3.01 | 3.01 | 6.03 | 3.71 |
| ZrPhos | 2.95 | 1.72 | 5.99 | 3.48 |
| Ln Solution (Control) | 2.97 | 2.94 | 6.00 | 5.98 |

At pH 6, significant deviations in post-sorption pH were observed for all materials. TiOx had the smallest deviation, lowering the pH by 0.87 units relative to the control. It was also one of the most effective sorbents, removing more than 99% of Ln in solution. TiOxyPhos and ZrPhos both removed more than 99% of Ln, but decreased the final pH by 1.06 and 2.50 units, respectively. TiPhos decreased the pH by the greatest amount, 3.21 pH units, but was one of the worst sorbents in this application.

Under both conditions, the largest decrease from the control occurred for the materials treated with $H_3PO_4$ (TiPhos, ZrPhos). Even after thorough washing and stabilizing the solution pH prior to sorption, the presence of additional surface H-atoms on these materials is expected. The materials treated with NaOH or $Na_3PO_4$ were observed to contain small quantities of Na. It is possible this cation modulated the change in pH through exchange of $Na^+$ for $H^+$. Based upon these post-sorption pH measurements, no correlation between pH and Ln extraction is apparent. It is evident that ion exchange cannot be the sole mechanism for the observed lanthanide extraction, suggesting specific binding may be occurring. Additional studies are ongoing to investigate the coordination environment of the extracted lanthanides in an effort to elucidate the sorption mechanism.

Distribution coefficients ($K_d$), values expressing a sorbent's capability at a given concentration, were determined for the materials using the following formula;

$$K_d = \frac{C_0 - C_e}{C_e} \times \frac{V}{m}$$

where $C_0$ (μg/mL) and $C_e$ (μg/mL) are the initial and equilibrium concentration of each Ln. V (mL) is the volume of testing solution, and m (g) is the sorbent dose. High $K_d$ values demonstrate the sorbent is effective at extracting the species of interest, with values above 50,000 considered outstanding.

Figure 41A:
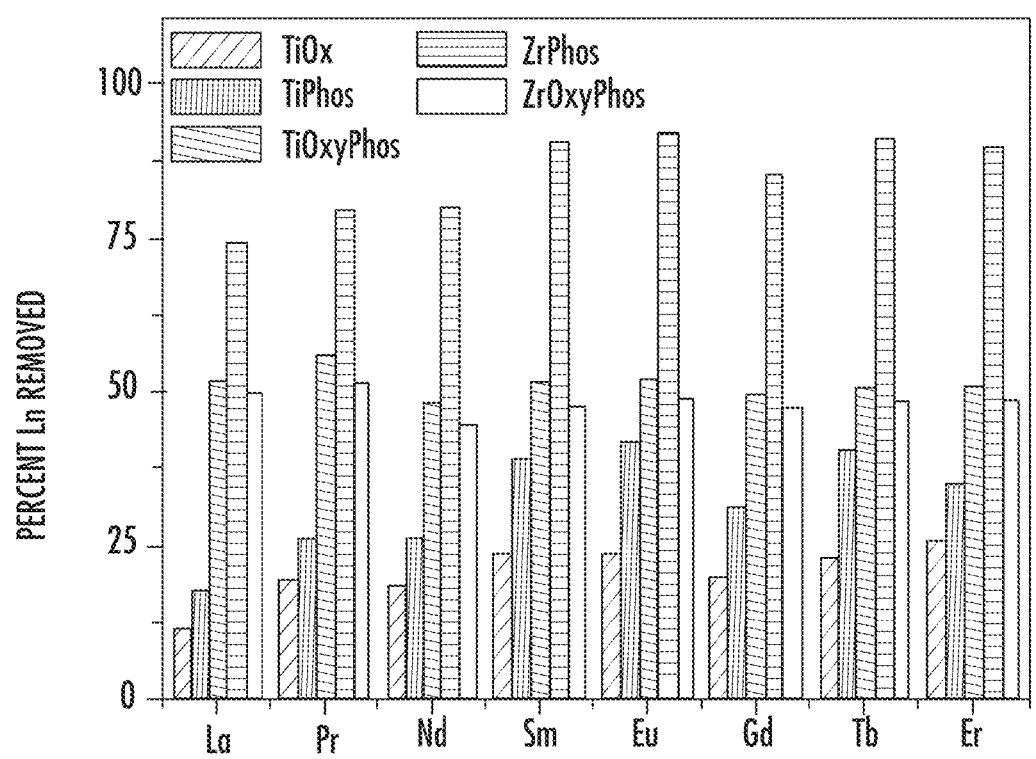
FIGS. 41A-41D sets forth extraction data of Lanthanides (Ln) using MOF-templated materials. a) Percent Ln removed at pH 3. ZrOx had no detectable extraction of any Ln and is not included. b) Percent Ln removed at, pH 6 for less effective sorbents. TiOx, TiOxyPhos, and ZrPhos all removed greater than 99% of the Ln in solution and are not displayed in the graph for the sake of clarity. c) Distribution coefficient ($K_d$) values for Ln extraction at pH 3. ZrOx is not shown. d) $K_d$ values for Ln extraction at pH 6 for select materials demonstrating particularly remarkable extraction properties.
Figure 41B:
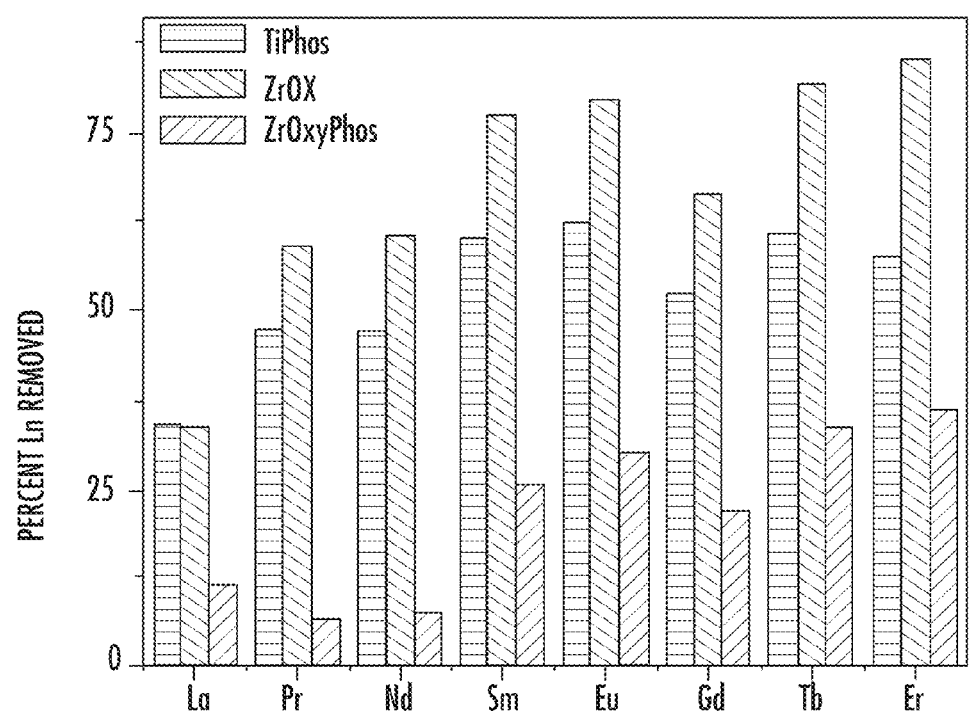
Figure 41C:
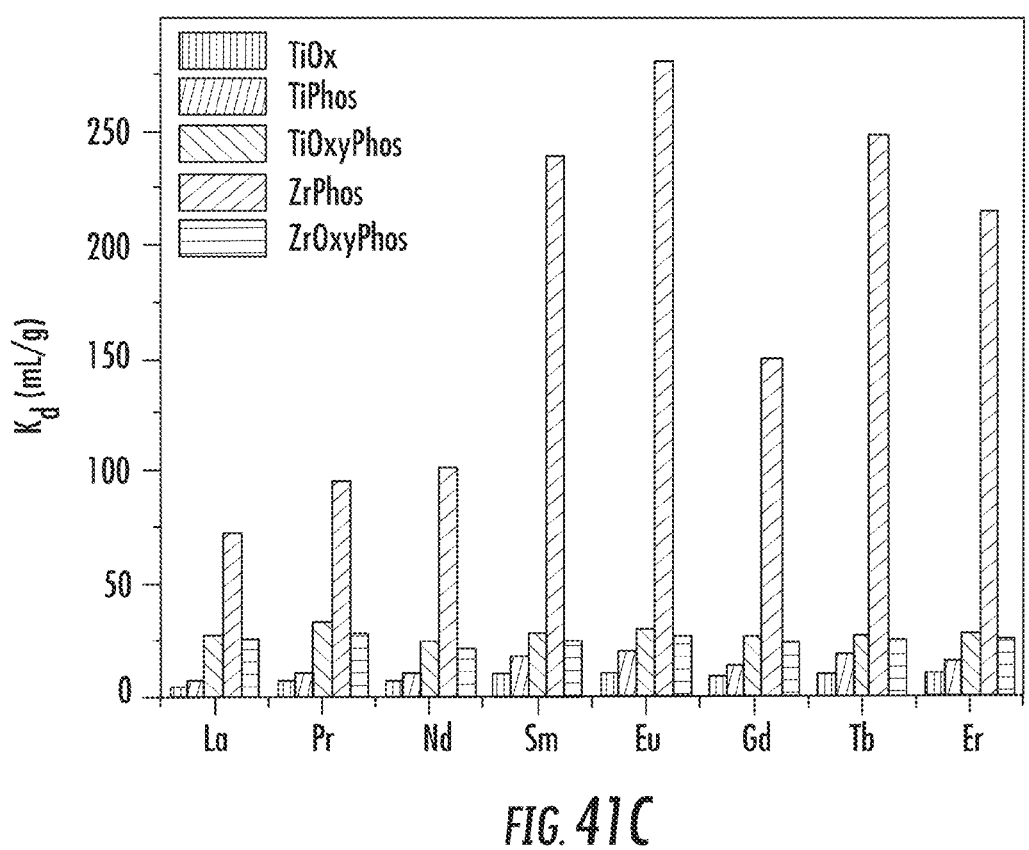
Figure 41D:
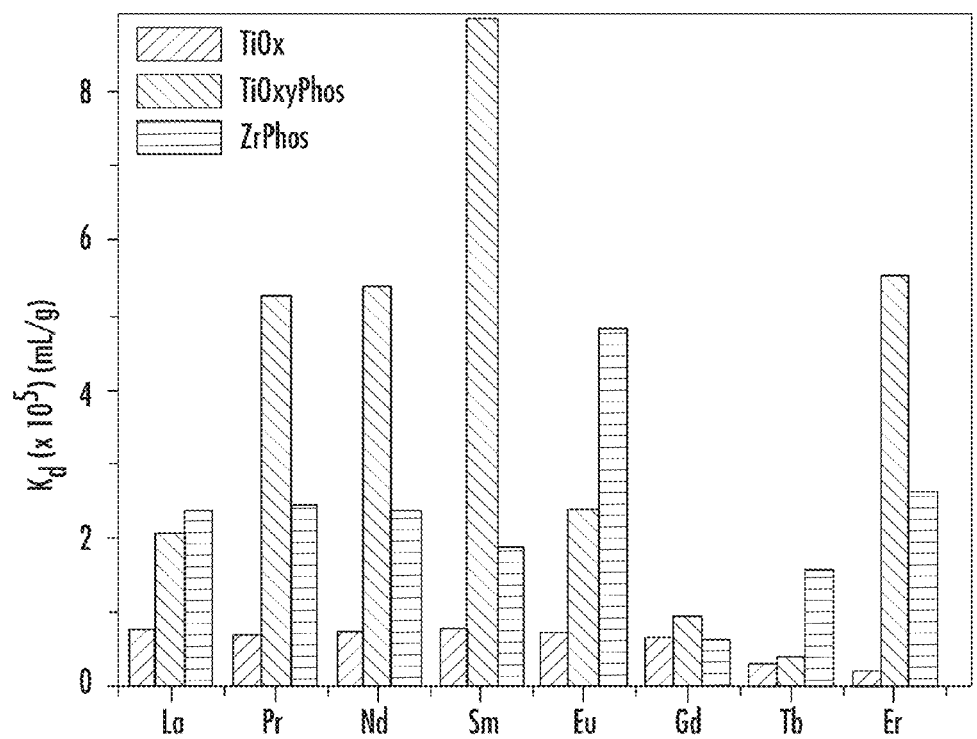

As shown in FIGS. 41C-41D, $K_d$ values were modest at pH 3, with ZrPhos demonstrating the best properties. Sorption significantly improved at pH 6, possibly due to passing the isoelectric point, of the MOF-templated sorbents, with ZrPhos, TiOxyPhos, and TiOx all yielding impressive $K_d$ values. It is worth noting that TiOx had similar affinity for all Ln, with a slight decrease observed for Tb and Er. In contrast, TiOxyPhos absorbed significantly more Eu and less Gd. ZrPhos was selective for Sm, but also had particularly strong affinity for Pr, Nd, and Er.

The ability of these non-optimized materials to discriminate between different Ln of similar size and identical charge suggested great potential for separation of Ln from actinides. TiOx and ZrPhos were investigated at a phase ratio of 100 mL/g for selective extraction of Ln from a solution spiked with Am and Pu. The pH of the solutions containing the MOF-templated materials were equilibrated at pH 6 and observed to be stable over 72 hours prior to addition to the Ln solution. ICP-MS analysis was performed after 24 hours of contact. Separation factors were obtained by dividing $K_d$ values for each Ln by the $K_d$ value for either Am or Pu.

Even at a decreased concentration of sorbent, the MOF-templated materials extracted greater than 98% of all Ln in solution, often surpassing the limits of detection by ICP-MS. Both ZrPhos and TiOx had better separation factors for the early lanthanides, La, Ce, Pr, and Nd. Notably, TiOx was over 16× more selective for Nd and almost 21× more selective for La as compared to Am. These separation factors are of the same relative magnitude as recently reported for Zr(IV) and Sn(IV) phosphate materials, though without the requirement of oxidizing Am to $AmO_2^{2+}$. More detailed experiments are needed to further optimize fully investigate the capability of these novel inorganic materials, for selective separation of lanthanides and actinides. The difference in performance between MOF-templated materials clearly demonstrates the influence of structure and composition upon Ln separations. By systematically tuning the treatment conditions, we anticipate the optimized structures will have great potential for these challenging separations.

Simulated Fukushima Seawater Remediation.

The third application investigated was removal of radioactive strontium from simulated seawater. This application is relevant to the clean-up of the Fukushima Daiichi disaster site where large amounts of contaminated seawater that was used for cooling is currently being stored and treated to reduce the radioactivity. One of the major contaminants needing removal is $^{90}Sr$. Experiments were performed using the hydroxide, oxyphosphate, and phosphate materials in simulated seawater containing Sr. MST and SrTreat®, a state-of-the-art Sr sorbent, were tested under the same conditions as a basis for comparison.

Figure 42:
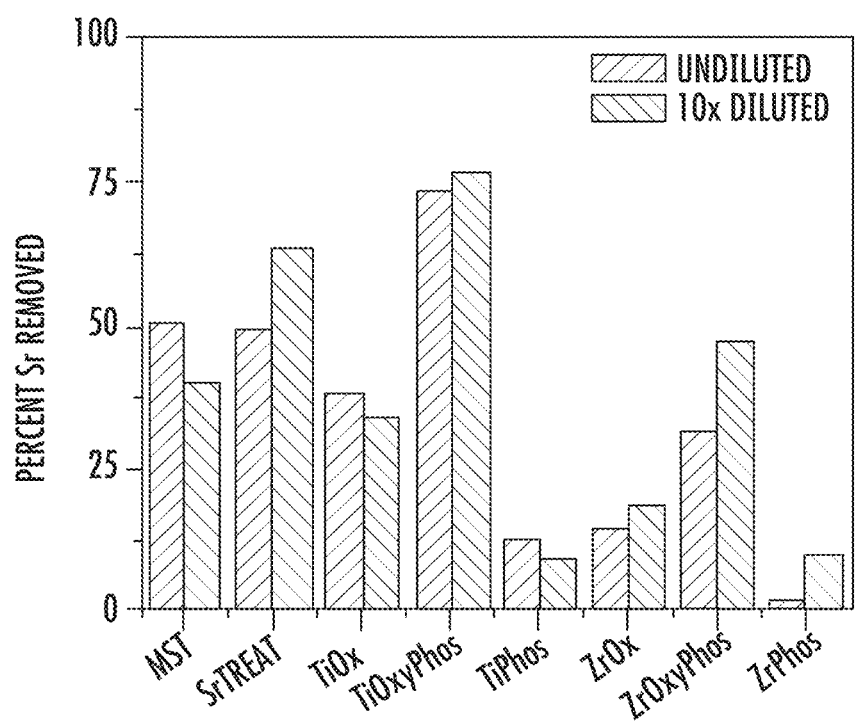
FIG. 42 sets forth decontamination data of Fukushima Seawater simulant following 1 hour contact time with MOF-templated materials, MST, and SrTreat®. Plots display percent Sr removed in undiluted seawater (grey) and 10× diluted seawater (red).
Figure 43:
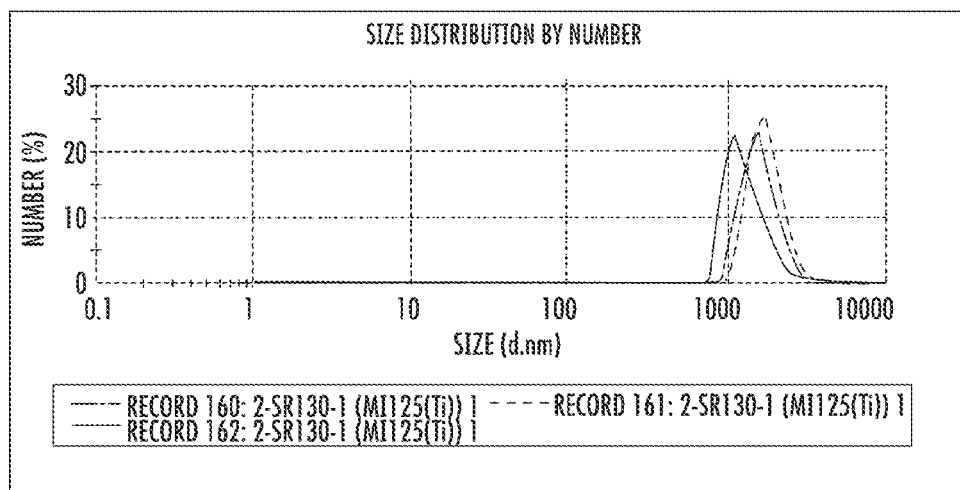
FIG. 43 sets forth the DLS Number Average for Mil-125.
Figure 44:
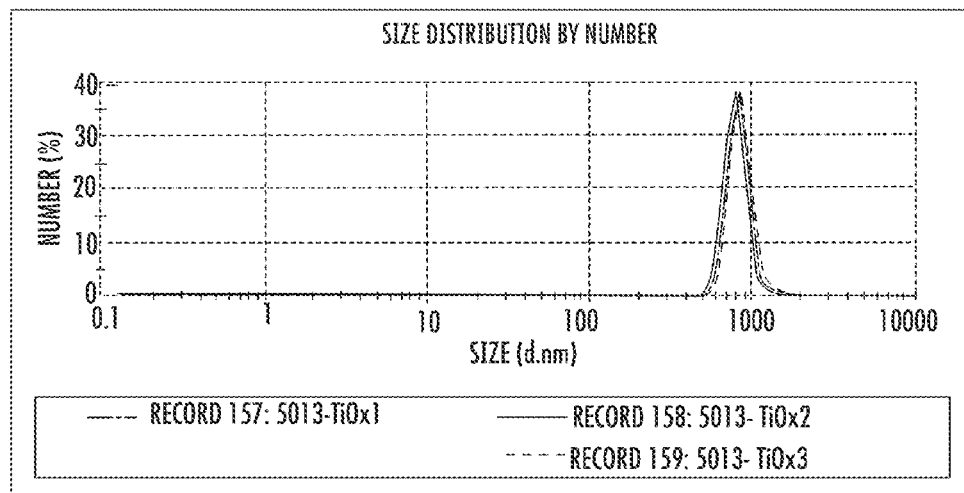
FIG. 44 sets forth the DLS Number Average for TiOx.
Figure 45:
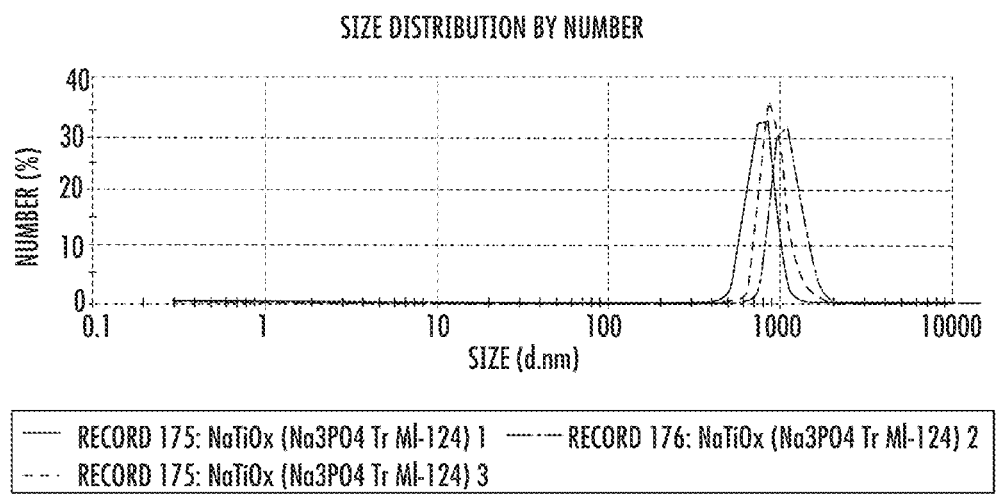
FIG. 45 sets forth the DLS Number Average for TiOxyPhos.
Figure 46:
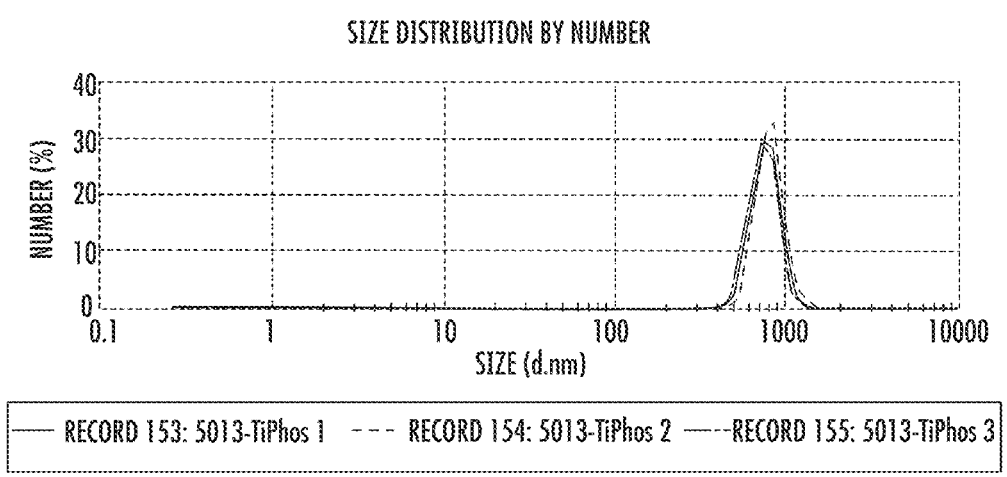
FIG. 46 sets forth the DLS Number Average for TiPhos.
Figure 47:
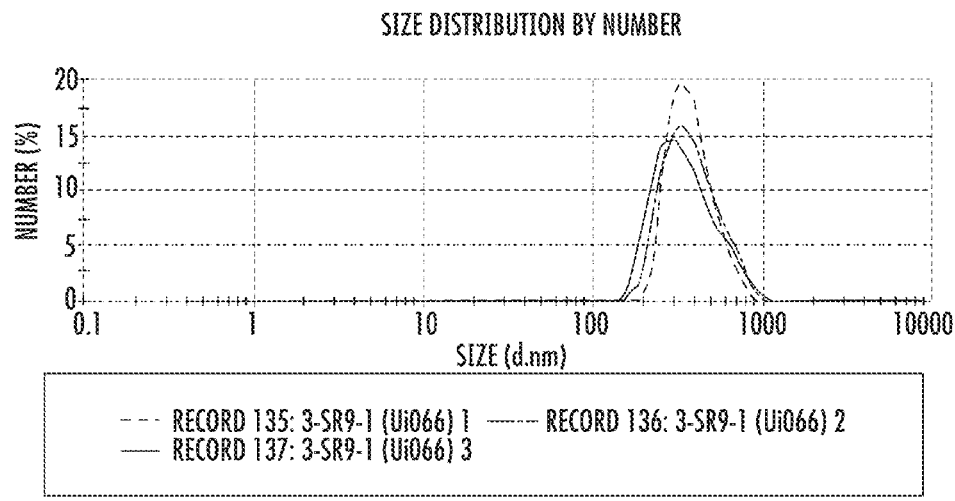
FIG. 47 sets forth the DLS Number Average for UiO-66.
Figure 48:
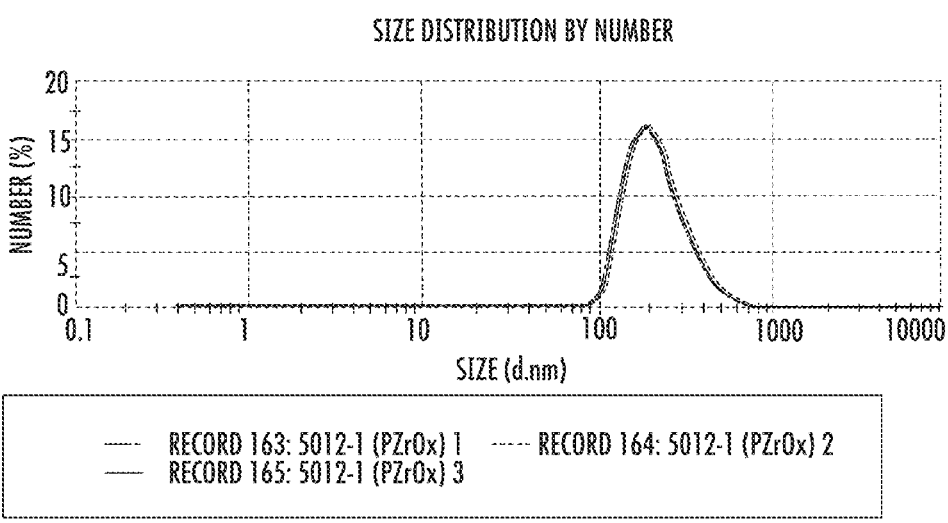
FIG. 48 sets forth the DLS Number Average for ZrOx.
Figure 49:
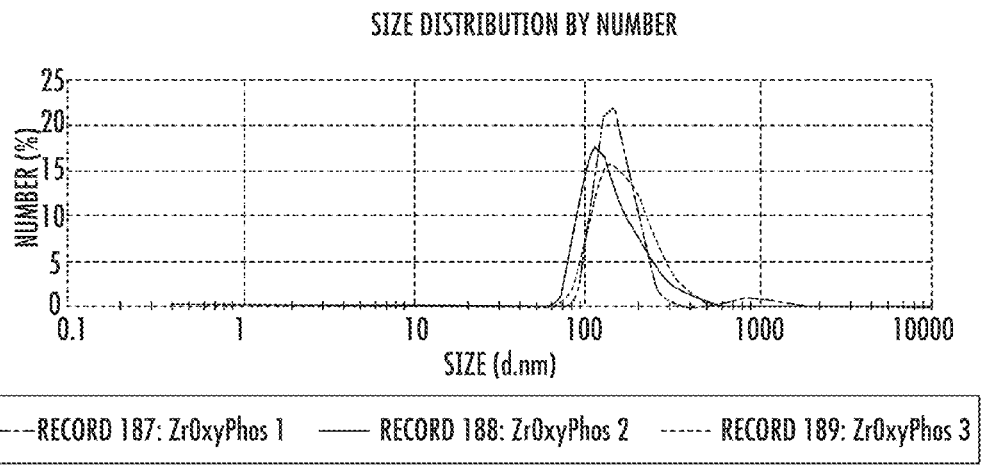
FIG. 49 sets forth the DLS Number Average for ZrOxyPhos.
Figure 50:
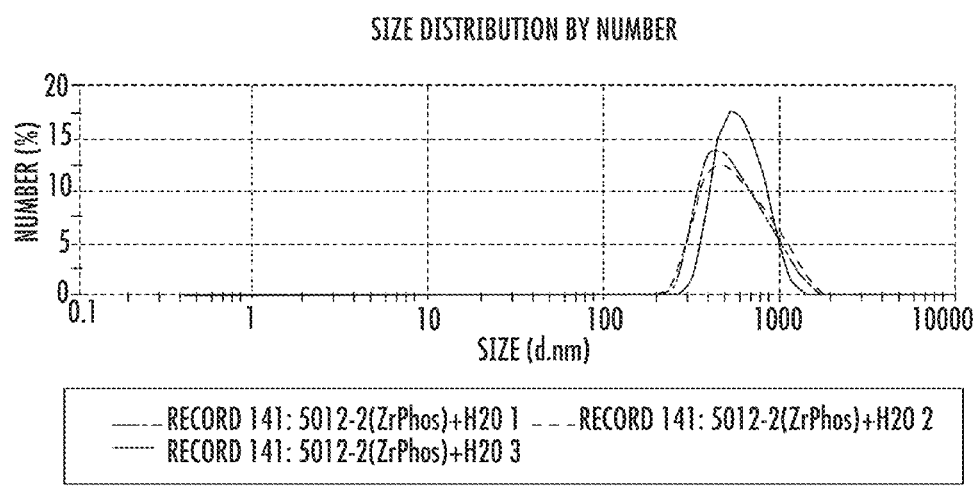
FIG. 50 sets forth the DLS Number Average for ZrPhos.
Figure 51A:
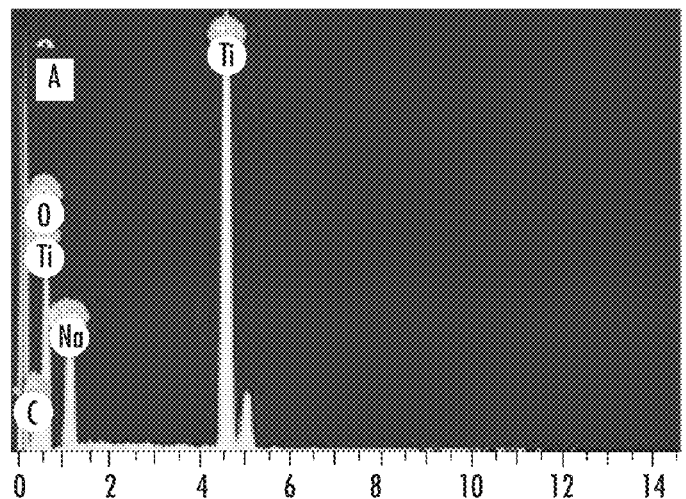
FIGS. 51A-51F is EDS data for a) TiOx b) TiOxyPhos c) TiPhos d) ZrOx e) ZrOxyPhos f) ZrPhos. The carbon is from the carbon tape upon which the samples are deposited for analysis.
Figure 51B:
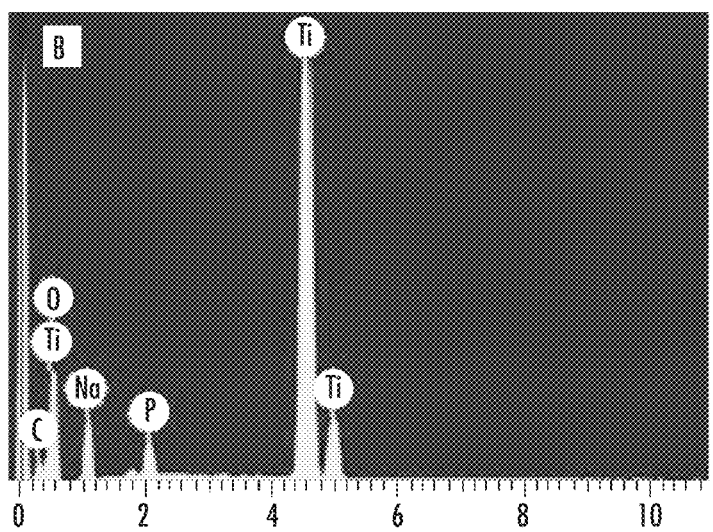
Figure 51C:
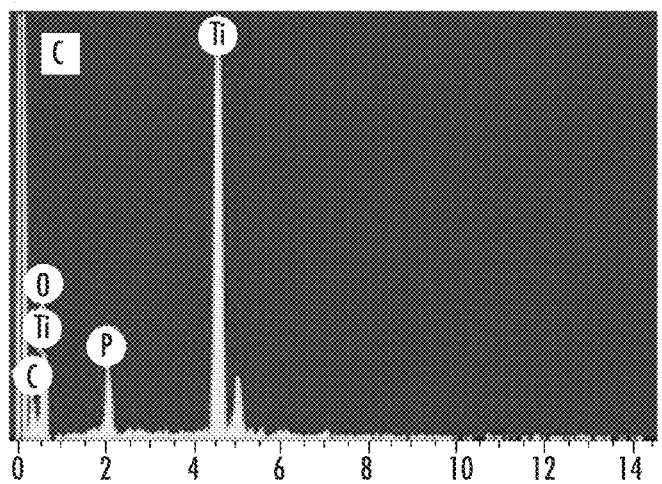
Figure 51D:
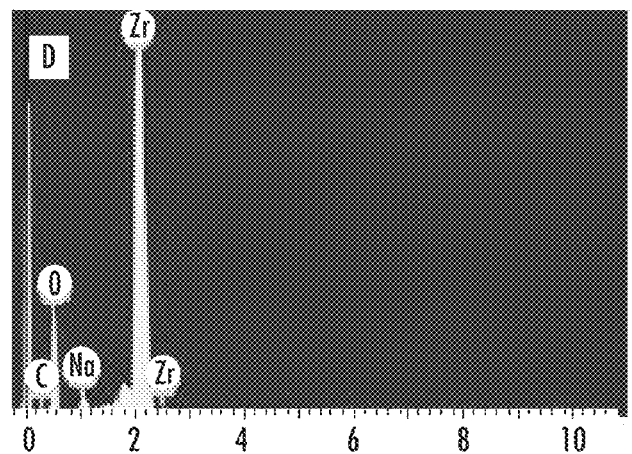
Figure 51E:
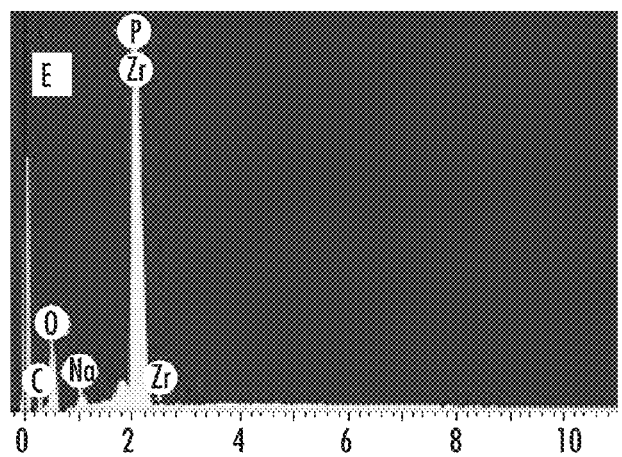
Figure 51F:
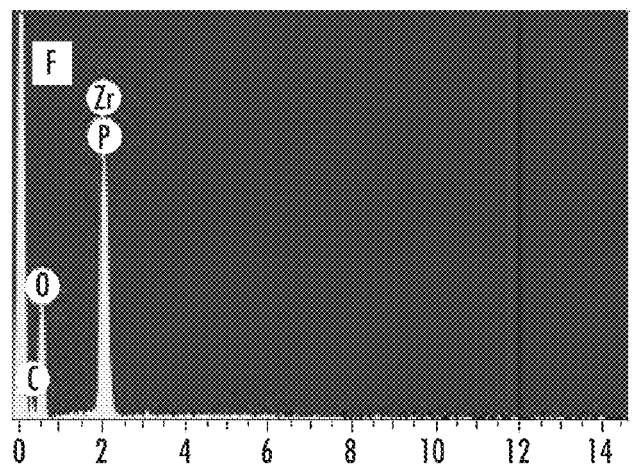
Figure 52A:
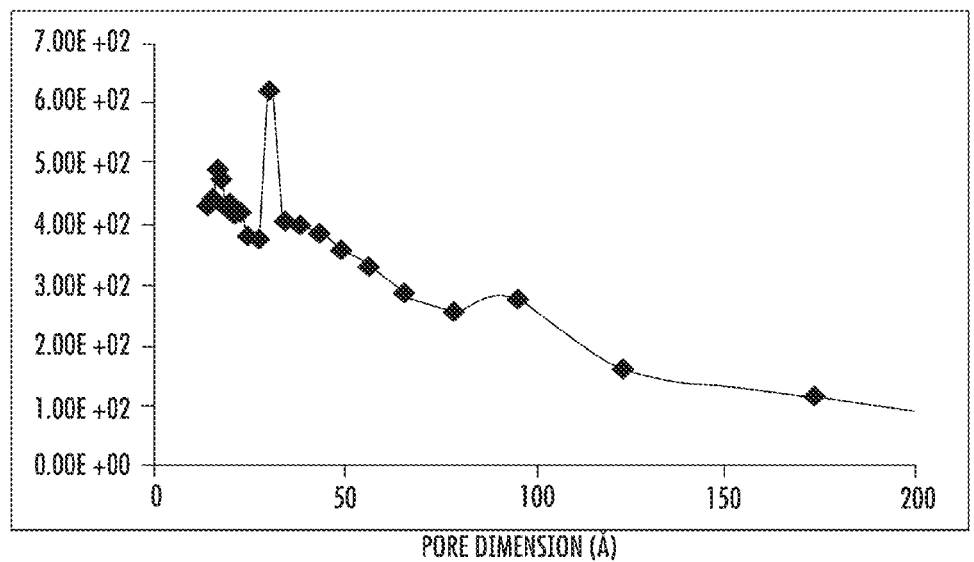
FIGS. 52A & 52B set forth pore size distribution for TiOx as determined by BJH (top) and HK methods (bottom), FIGS. 53A & 53B set forth the pore size distribution for TiOxyPhos, as determined by BJH (53A) and HK methods (53B).
Figure 52B:
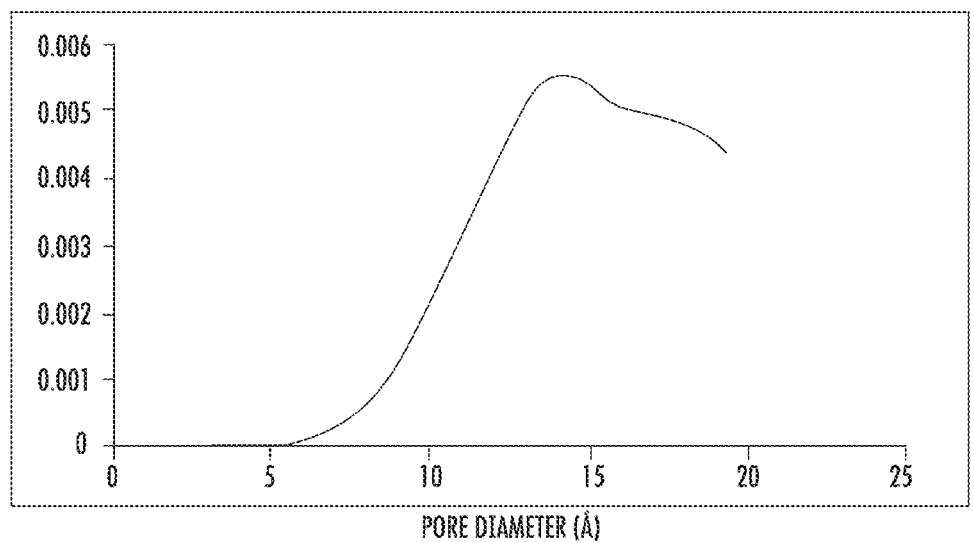
Figure 53A:
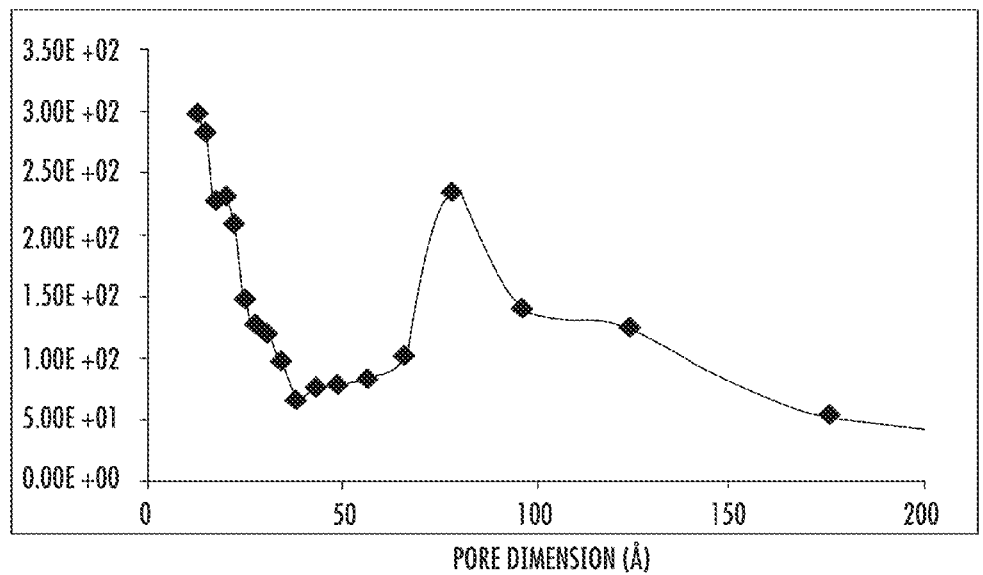
Figure 53B:
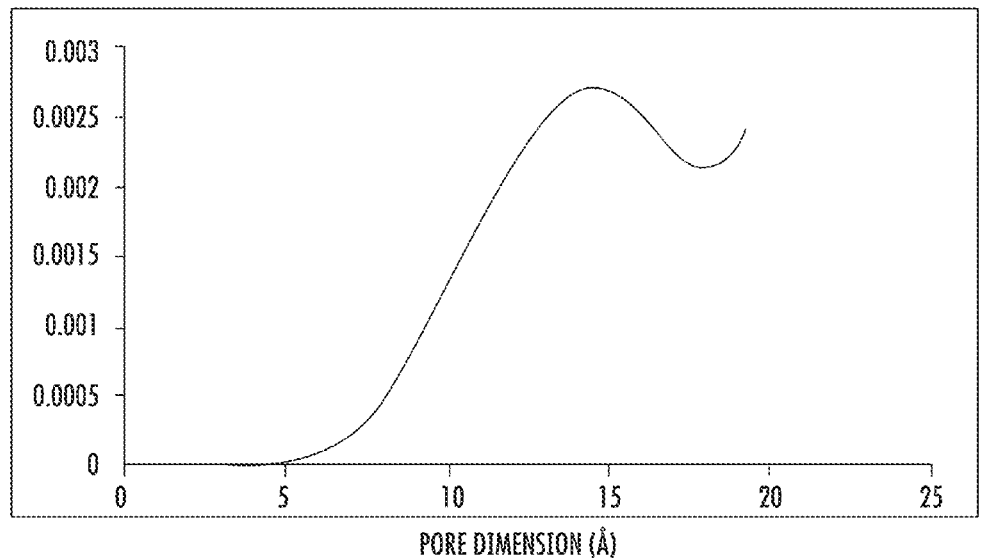
Figure 54A:
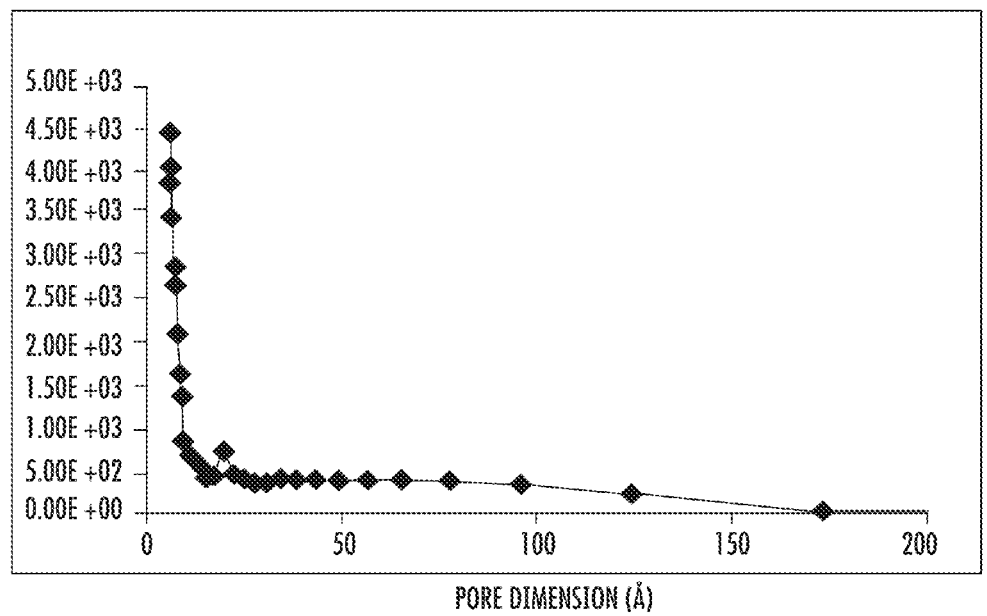
FIGS. 54A & 54B set forth the pore size distribution for TiPhos, as determined by BJH (54A) and HK methods (54B).
Figure 54B:
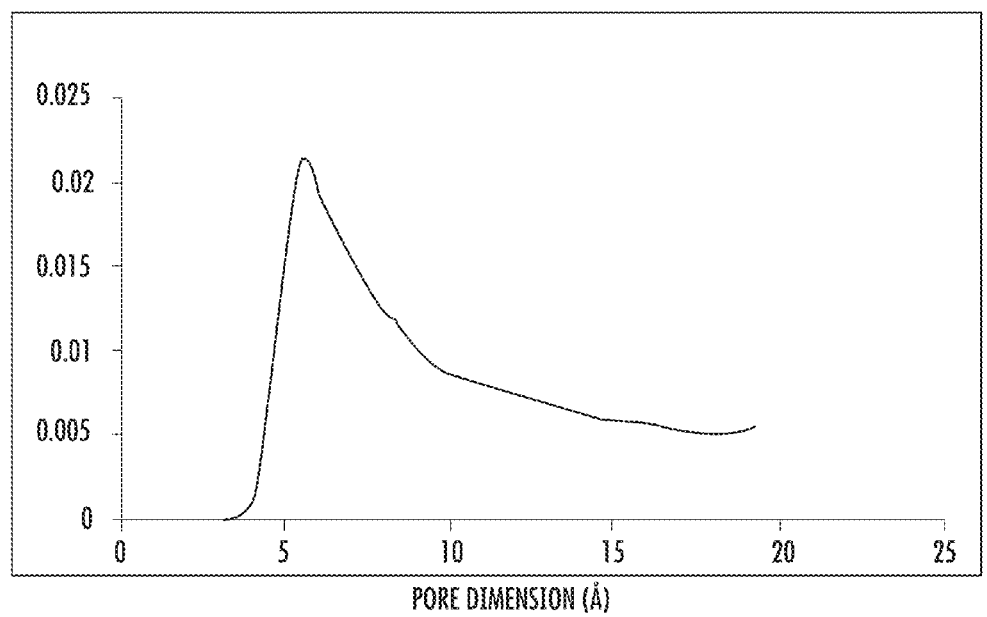
Figure 55A:
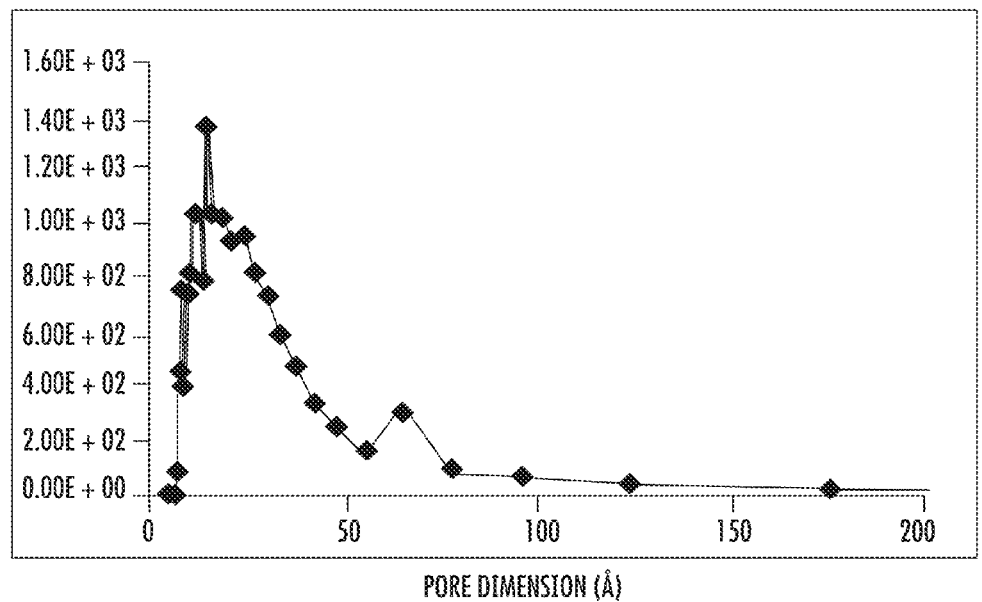
FIGS. 55A & 55B set forth the pore size distribution for ZrOx as determined by BJH (55A) and HK methods (55B).
Figure 55B:
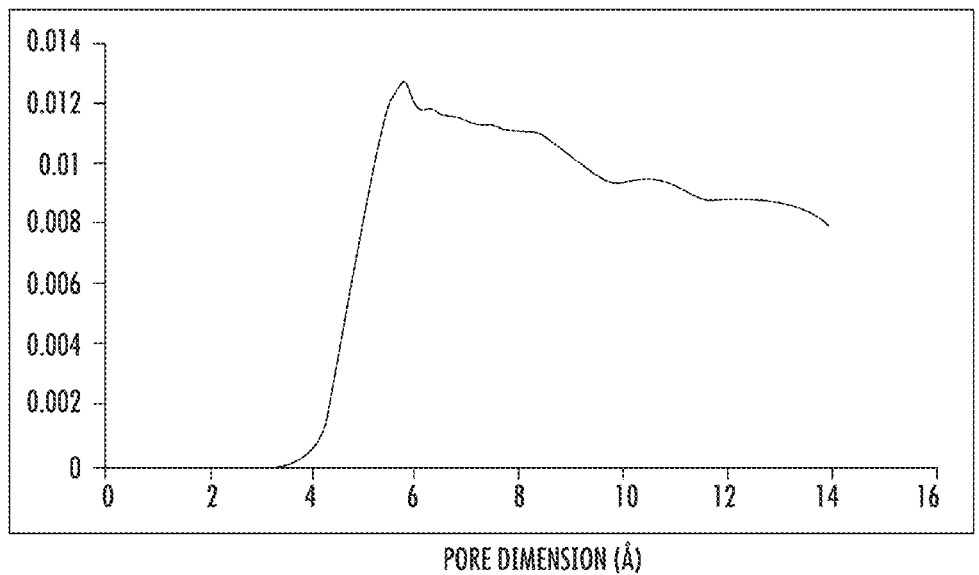
Figure 56A:
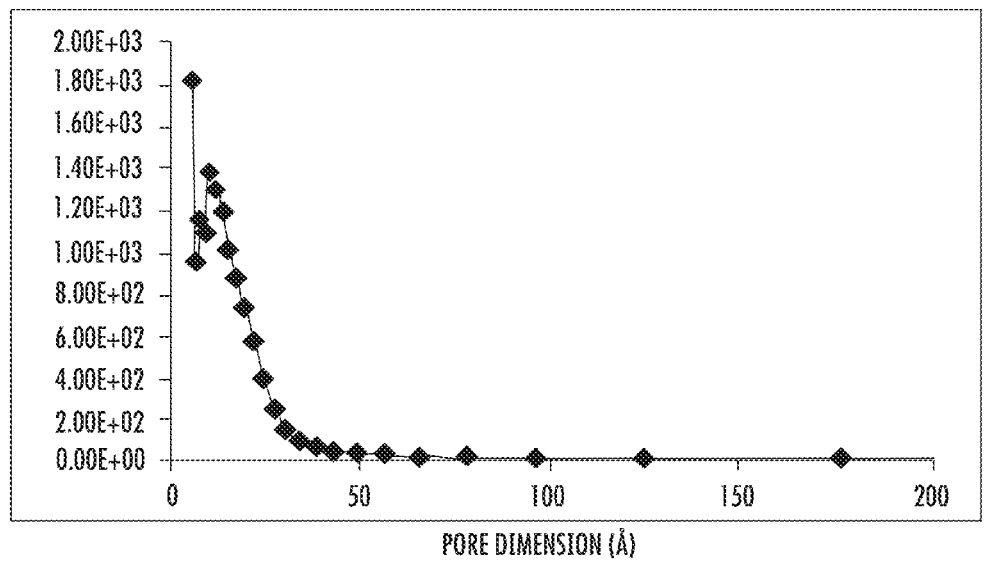
FIGS. 56A & 56B set forth pore size distribution for ZrOxyPhos as determined by BJH (56A) and HK methods (56B).
Figure 56B:
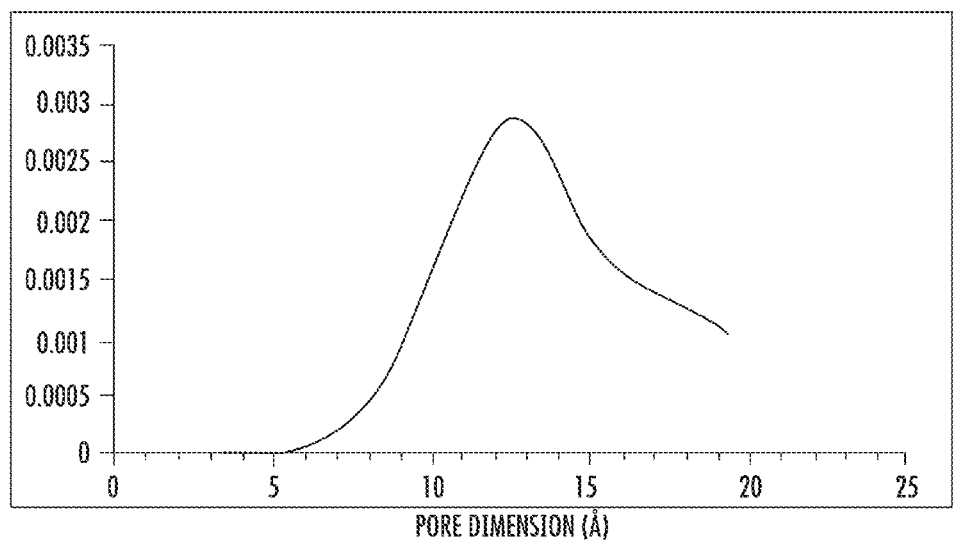
Figure 57A:
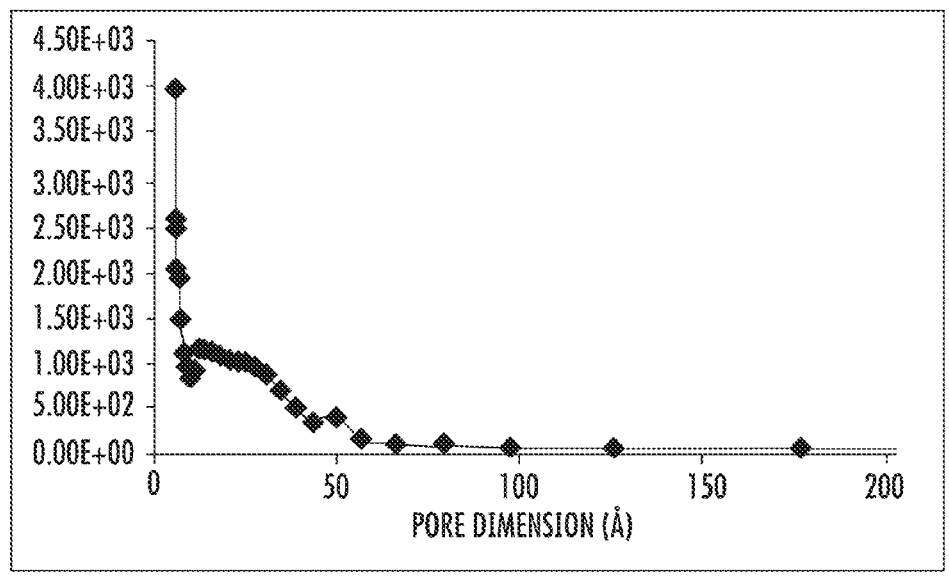
FIGS. 57A & 57B set forth pore size distribution for ZrPhos as determined by BJH (57A) and HK methods (57B).
Figure 57B:
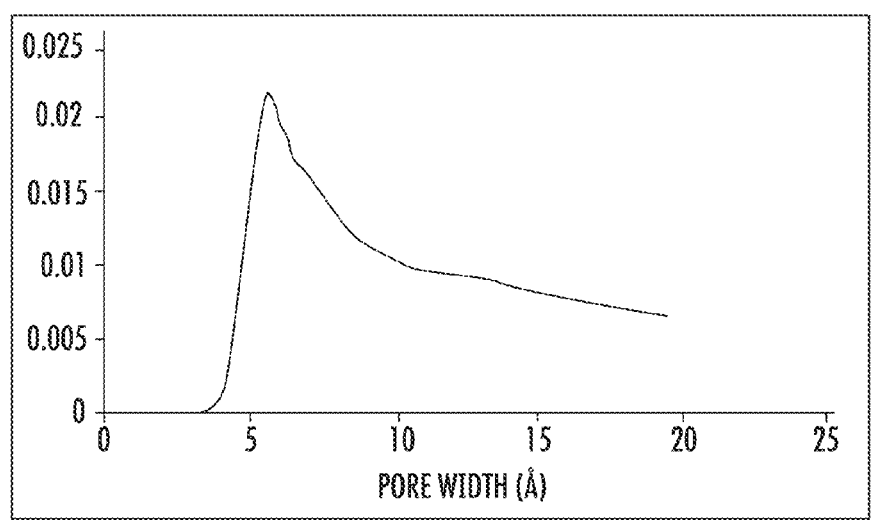
Figure 58A:
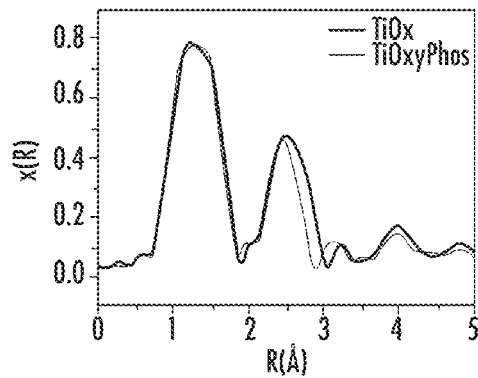
FIGS. 58A & 58B are EXAFS plots for (58A) MIL-125 treated with NaOH and $Na_3PO_4$ and (58B) UiO-66 treated with NaOH and $Na_3PO_4$.
Figure 58B:
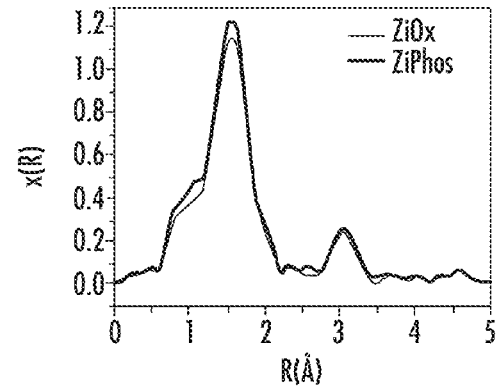
Figure 59:
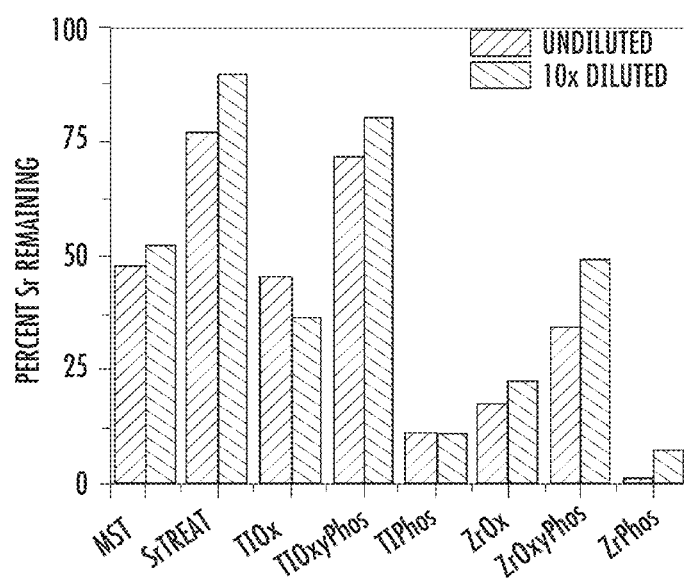
FIG. 59 sets forth decontamination data of Fukushima Seawater simulant following 24 hours contact time. Plots display percent Sr removed in undiluted seawater and 10× diluted seawater.

Two different simulants were tested using varying amounts of sorbent. The as-prepared simulated seawater containing 8 ppm Sr was spiked with $^{85}Sr$ to enable analysis by gamma spectroscopy. Ti based sorbents were added at a concentration of approximately 50 mM Ti, which is equivalent to 5 g/L MST. The Zr sorbents were added at an equal mass of metal ion, and therefore approximately half of the molar concentration (~26 mM Zr). A 10× dilution of the simulated seawater was also prepared and spiked with $^{85}Sr$, with sorbents were added at concentrations of 4 mM and 2 mM Ti and Zr, respectively, and analyzed after 1 and 24 hours of contact. The results are summarized in FIG. 42 and FIG. 59 and Tables 15-16.

Results generally indicated that the Sr sorption is rapid and for most sorbents is essentially complete within one hour of contact. SrTreat® is the notable exception to this trend as it appears to have a slower uptake of Sr. Of all of the newly prepared materials tested, TiOxyPhos appears the most promising, removing greater than 70% of the Sr in seawater simulant within 1 hour. This is comparable to the total amount of Sr removed by SrTreat® after a 24 hour contact.

A similar trend is seen in the diluted seawater where TiOxyPhos appears the most promising. After one hour of contact, the TiOxyPhos has removed a greater percentage of Sr than all of the materials tested. However, as seen in the undiluted seawater, SrTreat®, in contrast to the other sorbents, continues to sorb Sr over time ultimately reaching a higher percentage of removal after 24 hours.

The enhanced rate of sorption observed in the MOF-templated materials can be attributed to the extremely porous nature of TiOxyPhos facilitating rapid transport of radionuclides throughout the material, while uniform distribution of Ti provides abundant sites for Sr sorption. While the Ti materials outperform the Zr materials in general, due to the difference in atomic masses, the Zr materials are present at approximately half of the molar concentration and may ultimately prove more effective. It is within the skill of one of ordinary skill in the art to optimize the amount of sorbent and contact times needed to achieve the necessary decontamination. The overwhelming volume of water in need of treatment, projected to be between 164-230 million gallons by December, 2015, requires implementation of materials with exceptionally rapid sorptive properties. The unoptimized MOF-templated inorganic materials are capable of extracting more Sr in 1 hour than the current state-of-the art sorbent over 24 hours, making them ideal candidates for the remediation of radioactive seawater from the Fukushima Daiichi disaster.

TABLE 15

Summary of Sr Removal from Seawater for Several Control Sorbents (MST, mMST, SrTreat), MIL-125, and TiOx. Values are given as Decontamination Factor and Percent Sr removed.
Undiluted Seawater w/8 ppm Sr

| | Sorbent | | | | |
|---|---|---|---|---|---|
| | MST | mMST | SrTreat | MIL-125 | TiOx |
| | | | Conc. (g/L) | | |
| | 5 | 5 | 5 | 2.395 g Ti/L* | 2.395 g Ti/L* |
| 0.5-h DF | | | 1.52 | 1.06 | 1.93 |
| (% removed) | | | (34.30%) | (5.46%) | (48.10%) |
| 1-h DF | 1.86 | 1.40 | 1.78 | 1.07 | 1.96 |
| (% removed) | (46.18%) | (28.65%) | (43.70%) | (6.65%) | (48.96%) |
| 4-h DF | | | 2.46 | 1.06 | 1.94 |
| (% removed) | | | (59.34%) | (5.43%) | (48.42%) |
| 6-h DF | 1.80 | 1.41 | 3.22 | 1.03 | 1.89 |
| (% removed) | (44.41%) | (28.99%) | (68.97%) | (2.78%) | (47.10%) |
| 8-h DF | | | | | |
| (% removed) | | | | | |
| 24-h DF | 1.82 | 1.43 | | | |
| (% removed) | (45.20%) | (30.01%) | | | |
| 54-h DF | | | 4.50# | | |
| (% removed) | | | (77.77%) | | |
| 168-h DF | 1.85 | 1.45 | | | |
| (% removed) | (45.85%) | (31.08%) | | | |

*Equivalent Ti concentration to 5 g/L MST.
Sample was not shaken from 8-54 hours.

TABLE 16

Summary of Sr Removal from Dilute Seawater for Several Control Sorbents (MST, mMST, SrTreat), MIL-125, and TiOx. Sorbent concentrations are varied. Values are given as Decontamination Factor and Percent Sr removed.
10 X Diluted Seawater

| Sorbent | MST | mMST | Base-Treated MIL-125 | MST | mMST | SrTreat | MIL-125 | Base-Treated MIL-125 |
|---|---|---|---|---|---|---|---|---|
| Conc. (g/L) | 5 | 5 | 2.395 g Ti/L* | 0.4 | 0.4 | 0.4 | 0.1916 g Ti/L† | 0.1916 g Ti/L† |
| 0.5-h DF | | | | 1.25 | 1.21 | 1.48 | 1.06 | 1.53 |
| (% removed) | | | | (19.72%) | (17.47%) | (32.32%) | (5.83%) | (34.81%) |
| 1-h DF | 303.60 | 12.47 | 961.11 | 1.24 | 1.20 | 1.60 | 1.04 | 1.52 |
| (% removed) | (99.67%) | (91.98%) | (99.90%) | (19.08%) | (16.43%) | (37.61%) | (4.19%) | (34.09%) |
| 4-h DF | | | | 1.26 | 1.21 | 1.89 | 1.05 | 1.53 |
| (% removed) | | | | (20.70%) | (17.05%) | (47.16%) | (4.64%) | (34.58%) |
| 6-h DF | 233.89 | 13.01 | 1260.37 | 1.31 | 1.23 | 2.02 | 1.04 | 1.58 |
| (% removed) | (99.57%) | (92.31%) | (99.92%) | (23.71%) | (18.42%) | (50.38%) | (4.18%) | (36.58%) |
| 8-h DF | | | | | | | | |
| (% removed) | | | | | | | | |
| 24-h DF | 298.15 | 13.40 | ∞ | | | | | |
| (% removed) | (99.66%) | (92.54%) | (100.00%) | | | | | |
| 54-h DF# | | | | | | 2.09# | | |
| (% removed) | | | | | | (52.19%) | | |
| 168-h DF | 271.52 | 13.32 | 12961.23 | | | | | |
| (% removed) | (99.63%) | (92.49%) | (99.99%) | | | | | |

*Equivalent Ti concentration to 5 g/L MST.
†Equivalent Ti concentration to 0.4 g/L MST.
Sample was not shaken from 8-54 hours.

Four porous indium-sulfide materials were prepared by a novel MOF-templated ligand exchange process using two different indium MOF precursors: Mil-68, and Mil-53-NH$_2$. The favorable K$_{sp}$ for In$_2$S$_3$ (~10$^{-14}$) is the driving force for this exchange process, where the organic terephthalic acid or 2-aminoterephthalic acid bridging ligands were exchanged for S$^{2-}$ or HS$^-$ by overnight immersion in a solution of Na$_2$S. Choice of solvent was observed to play a role in the surface area of the resulting materials, thusly influencing the sorptive properties. The final MOF-templated materials are denoted by their approximated composition followed by the numerical designator for their original template and the solvent in which they were treated. For example, In$_2$S$_3$-68 (W) is the porous inorganic material prepared from treating Mil-68 with Na$_2$S in water, while In$_2$S$_3$-53(M) is from treating Mil-53-NH$_2$ with Na$_2$S in methanol.

Figure 60:
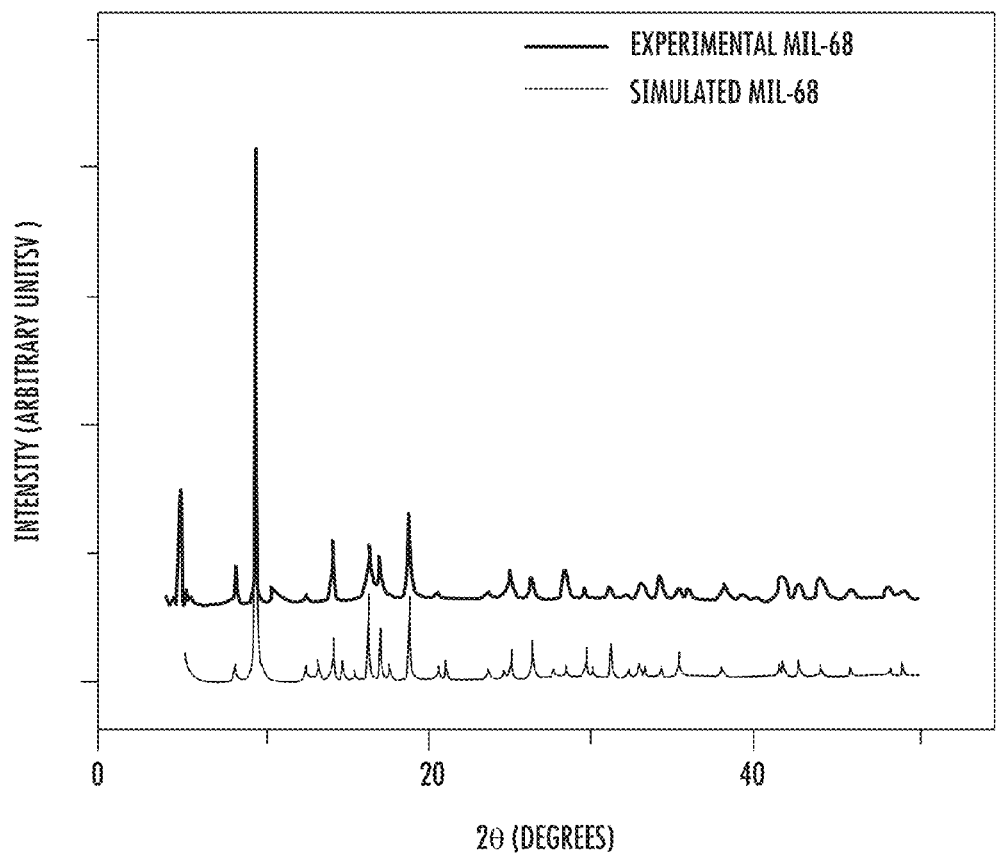
FIG. 60 is PXRD spectrum of Mil-68 as synthesized (red trace) and simulated PXRD of Mil-68 obtained using the crystallographic information file for the single crystal structure of Mil-68. $In_2S_3$ materials are amorphous and show no diffraction peaks by PXRD.
Figure 61:
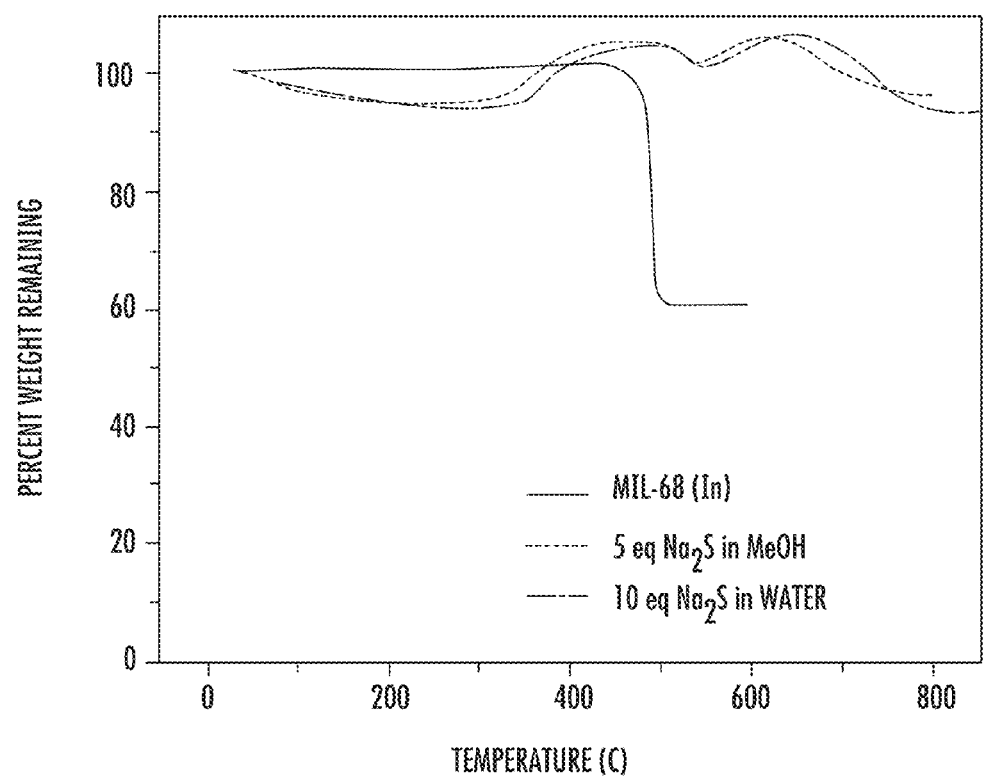
FIG. 61 is TGA data comparing Mil-68 MOF template (grey solid line), $In_2S_3$ formed by treatment with 5 eq $Na_2S$ in methanol (red dashed line), $In_2S_3$ by treatment with 10 eq $Na_2S$ in water (blue dotted line).
Figure 62:
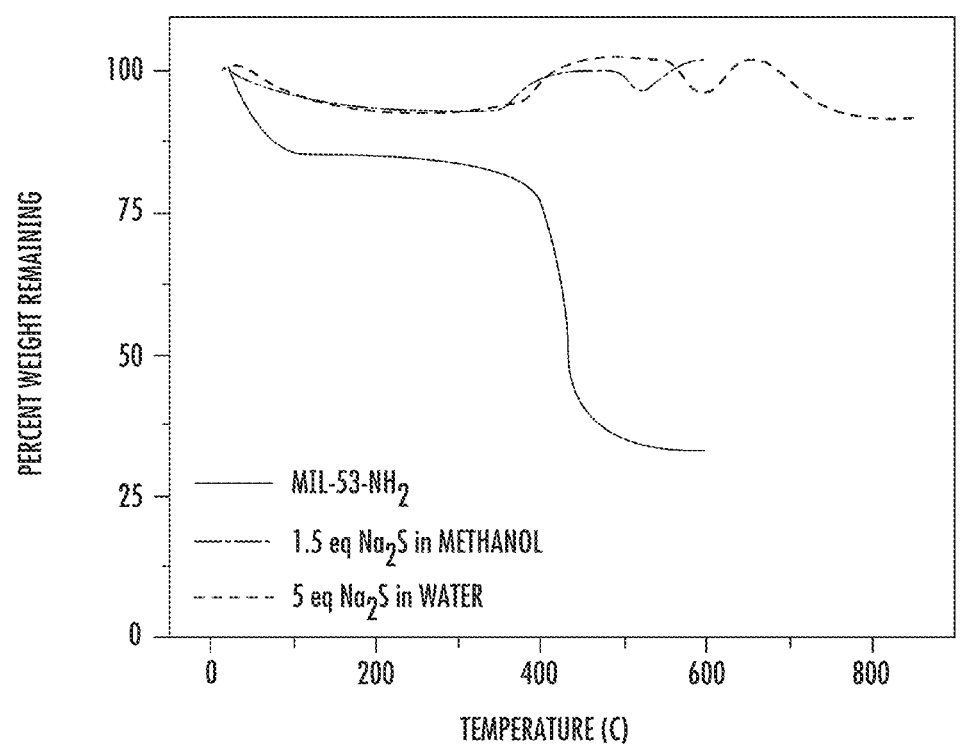
FIG. 62 is TGA data comparing Mil-53-$NH_2$ MOF template (grey solid line), $In_2S_3$ formed by treatment with 1.5 eq $Na_2S$ in methanol (red dashed line), $In_2S_3$ by treatment with 5 eq $Na_2S$ in water (blue dotted line).
Figure 63:
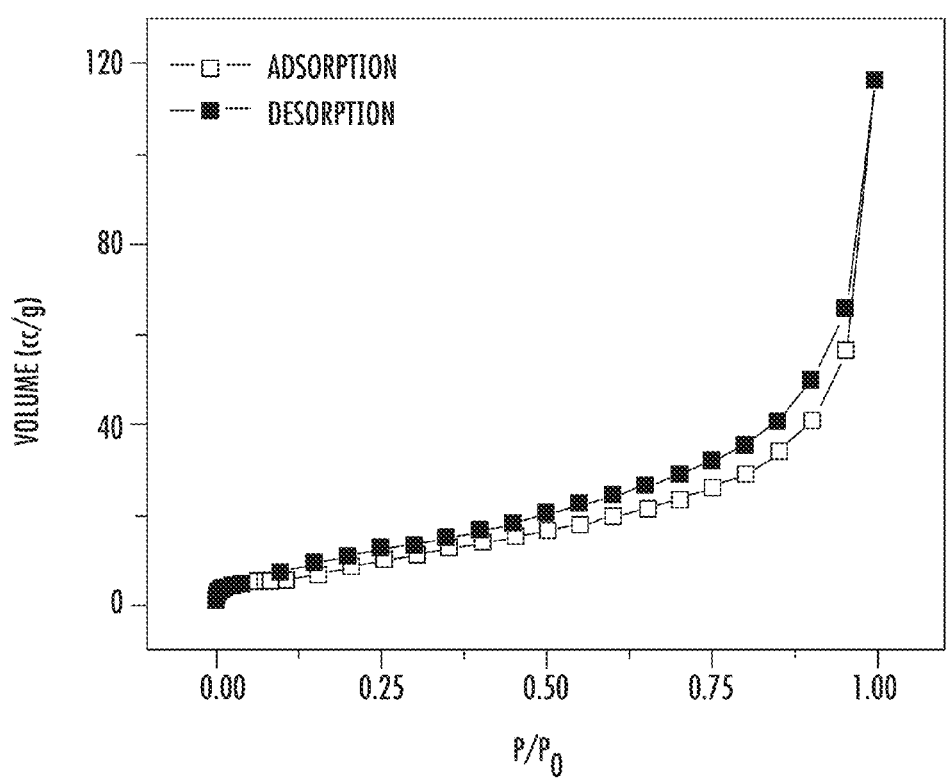
FIG. 63 is BET surface area isotherm for $N_2$ adsorption with $In_2S_3$ prepared by treating Mil-68 with 5 eq $Na_2S$ in methanol. Surface areas of 17.8 $m^2/g$ (BET) and 17.6 $m^2/g$ (Langmuir) were observed.
Figure 64:
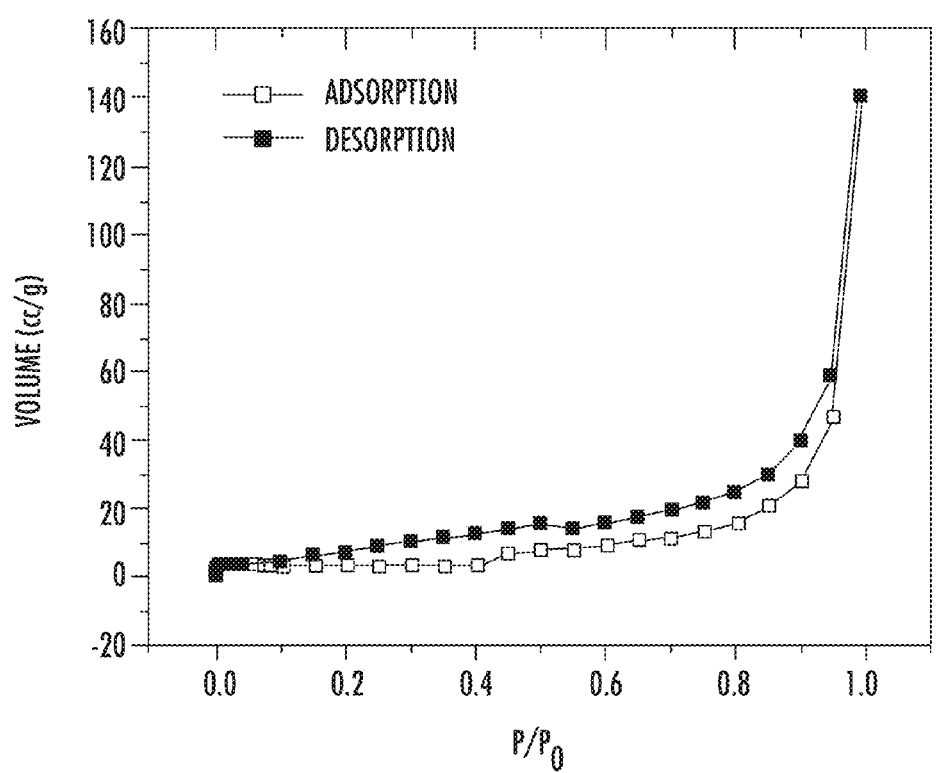
FIG. 64 is BET surface area isotherm for $N_2$ adsorption with $In_2S_3$ prepared by treating Mil-68 with 10 eq $Na_2S$ in water. Surface areas of 18.1 $m^2/g$ (BET) and 17.8 $m^2/g$ (Langmuir) were observed.
Figure 65:
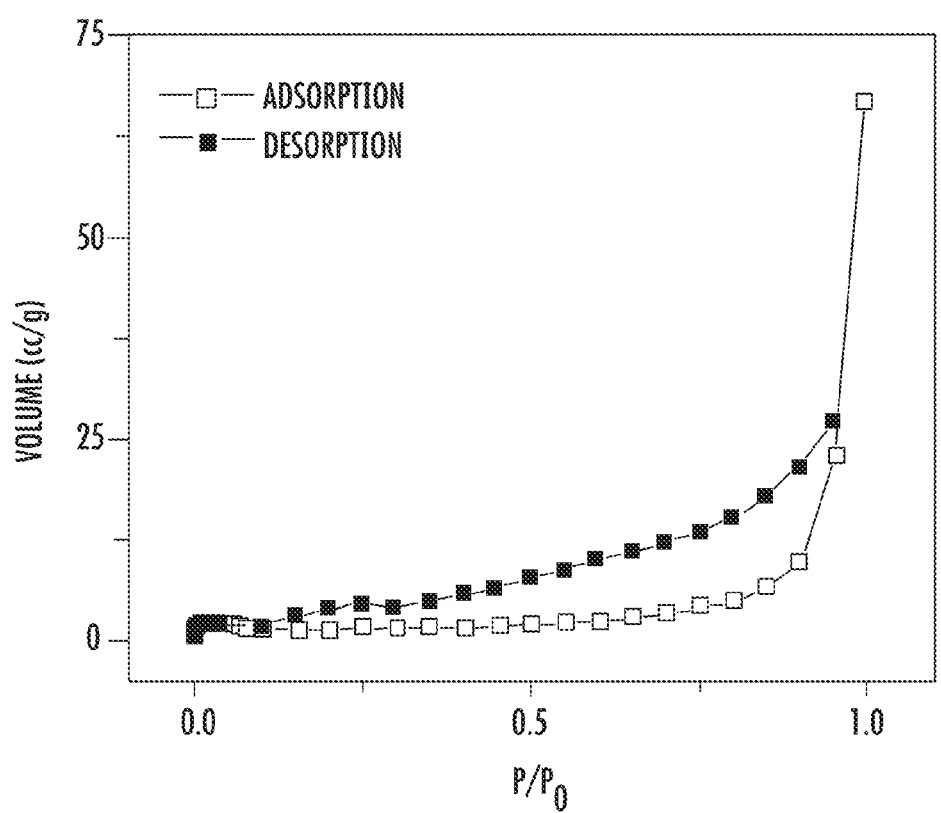
FIG. 65 is BET surface area isotherm for $N_2$ adsorption with $In_2S_3$ prepared by treating Mil-53-$NH_2$ with 5 eq $Na_2S$ in methanol. Surface areas of 13.8 $m^2/g$ (BET) and 13.8 $m^2/g$ (Langmuir) were observed.
Figure 66:
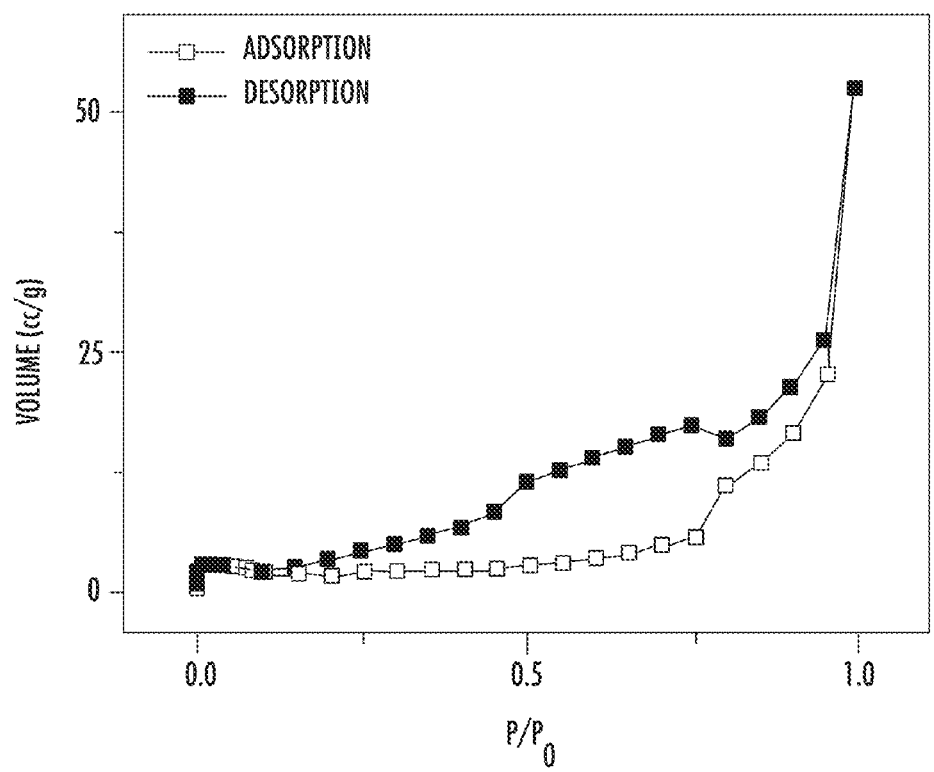
FIG. 66 is BET surface area isotherm for $N_2$ adsorption with $In_2S_3$ prepared by treating Mil-53-$NH_2$ with 5 eq $Na_2S$ in water. Surface areas of 10.7 $m^2/g$ (BET) and 10.9 $m^2/g$ (Langmuir) were observed.

Preliminary characterization of the MOF-templated indium sulfides was performed by TGA (FIGS. 61-62). A small initial weight loss below 200° C. is indicative of residual solvent, trapped in the porous materials. The absence of any distinct weight loss around 400-450° C. demonstrates the absence of residual organic bridging ligands. A weight gain is observed for all porous indium sulfides beginning at approximately 350° C., which can be attributed to the partial oxidation of the material. The weight loss observed in all materials around 550-600° C. is likely the release of SO$_2$. Powder X-ray diffractometry revealed the resulting materials are all amorphous, in, stark contrast to the highly crystalline MOF templates (FIG. 60), while TEM images reveal the bulk morphology of the template is still retained after the ligand exchange process (FIGS. 69A and 69B).

Surface area measurements of the MOF-templated indium sulfides reveal specific surface area of the template materials are diminished, but still measurable. In$_2$S$_3$-68 materials possessed BET surface areas ranging from 17.8-18.1 m$^2$/g, while In$_2$S$_3$-53 materials spanned 10.8-13.7 m$^2$/g (FIG. 63-FIG. 66). Using the density of crystalline α-In$_2$S$_3$, the volumetric surface areas are from 87.2-88.7 m$^2$/cm$^3$ for In$_2$S$_3$-68, and 52.9-67.1 m$^2$/cm$^3$ for In$_2$S$_3$-53 materials. It is apparent the topology of the MOF template influences the surface area of the resulting material, as does the choice of treatment solution. Treatment of Mil-68 in water resulted in the higher surface area, while treatment of Mil-53-NH$_2$ in methanol yielded the more porous material. Treatment with other polar organic solvents, such as isopropyl alcohol, ethanol, N,N'-dimethylformamide, pyridine, or ethylene glycol, is also anticipated to influence the porosity and surface area of the final materials. By mixing ratios of different solvents, we expect the surface area of the indium sulfides can be carefully tuned for optimization in various processes. Furthermore, while the aforementioned solvents are selected due to their solvating ability for Na$_2$S, application of alternate sulfur sources, such as thiohydracrylic acid, thioacetamide, or thiourea, would accommodate a wider spectrum of solvents and result in new materials of high surface area.

Figure 67:
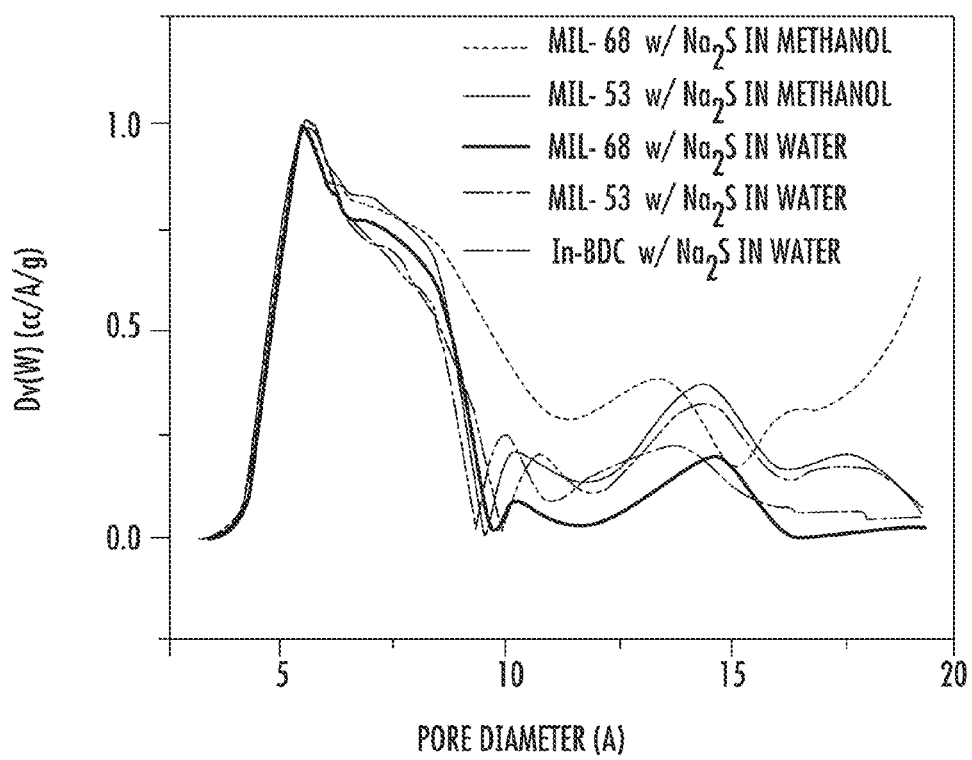
FIG. 67 is the HK method pore size distribution for $In_2S_3$ materials from treatment of Mil-68 and Mil-53-$NH_2$ templates with $Na_2S$ in methanol or water.
Figure 68:
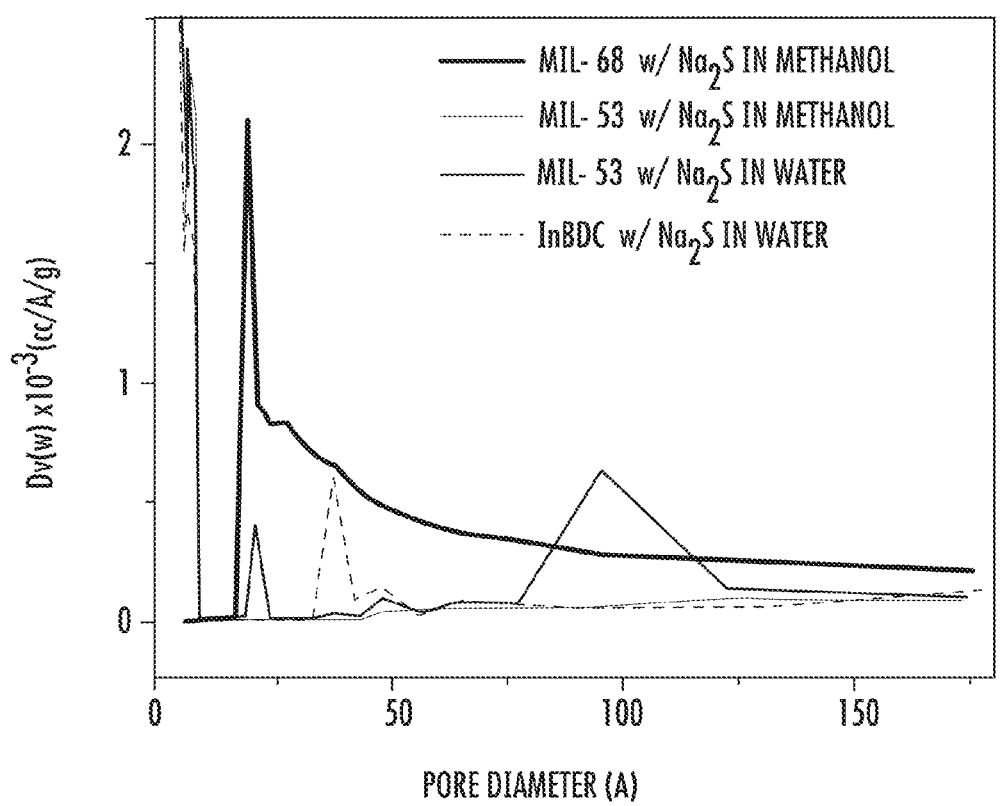
FIG. 68 is the BJH method pore size distribution for $In_2S_3$ materials from treatment of Mil-68 and Mil-53-$NH_2$ templates with $Na_2S$ in methanol or water.

Pore size distribution measurements were made with both HK and BJH methods. The HK method, accurate for pores with diameters less than 20 Å, reveals all In$_2$S$_3$ materials possess a dominant pore size of approximately 5.8 Å (FIG. 67). The Mil-53-NH$_2$-templated materials demonstrate similar pore features, with pores of approximately 10 and 15 Å in diameter. In$_2$S$_3$-68(W) also has a pore feature around 100 Å, according to the BJH analysis (FIG. 68). In contrast, Mil-68 materials have divergent pore sizes. In$_2$S$_3$-68(M) has a large distribution of pores up to approximately 12 Å, and a second narrow distribution of pores at approximately 25 Å, while the only remaining significant pore size for In$_2$S$_3$-68 (W) occurs around 15 Å.

Figure 71:
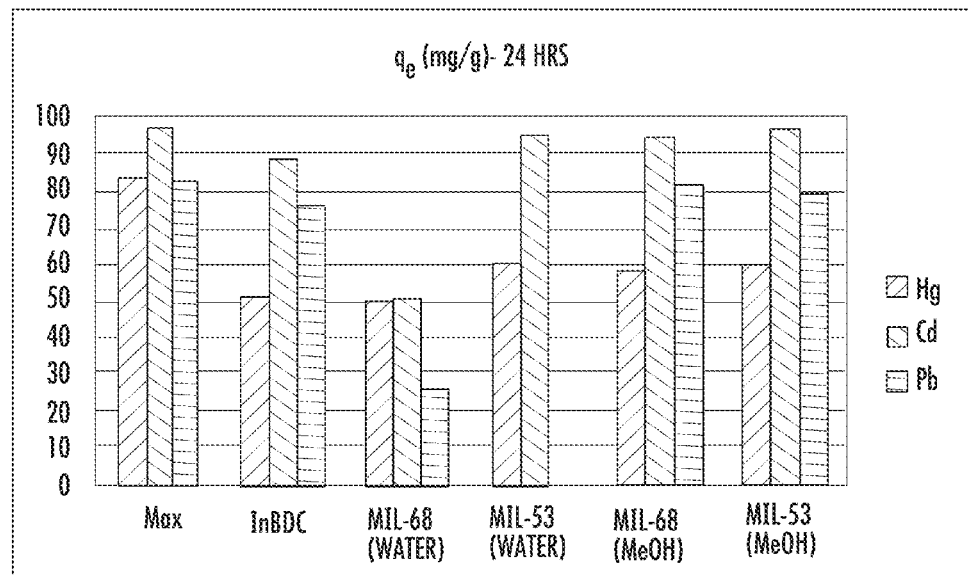
FIG. 71 displays sorption capacity (mg metal/g sorbent) after 24 hours contact with MOF-templated $In_2S_3$ sorbents. Chart displays MOF template and solvent used for ligand exchange process. MeOH denotes methanol.
Figure 73:
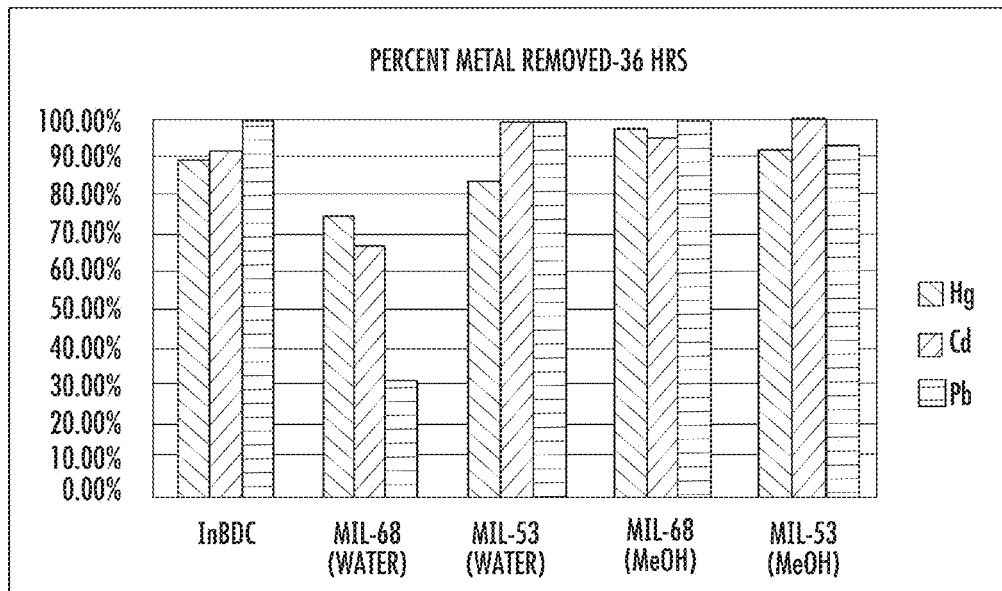
FIG. 73 displays percent of metals removed from solution after 36 hours contact with MOF-templated $In_2S_3$ sorbents. Chart displays MOF template and solvent used for ligand exchange process. MeOH denotes methanol.
Figure 74:
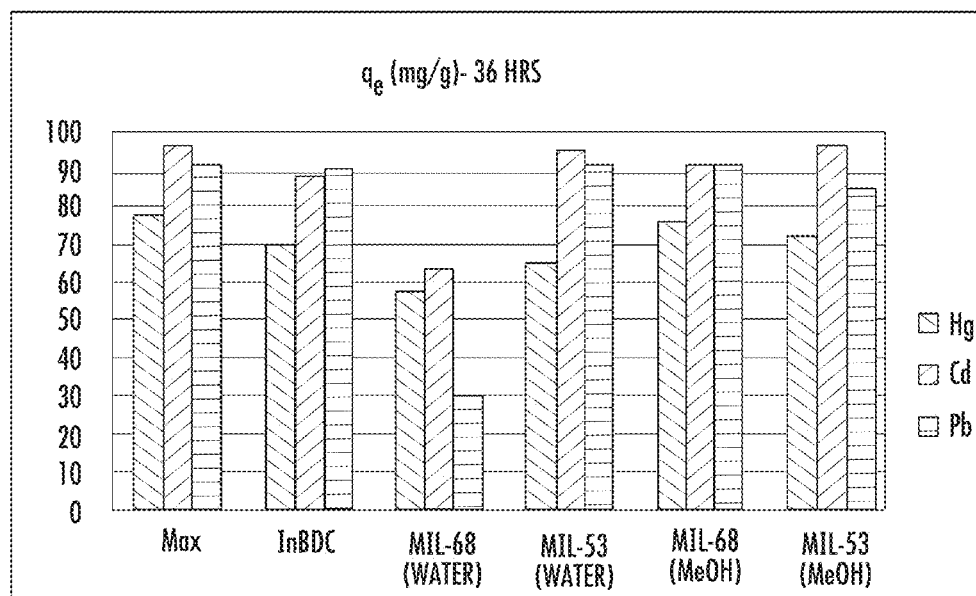
FIG. 74 displays sorption capacity (mg metal/g sorbent) after 36 hours contact with MOF-templated $In_2S_3$ sorbents. Chart displays MOF template and solvent used for ligand exchange process. MeOH denotes methanol.
Figure 75:
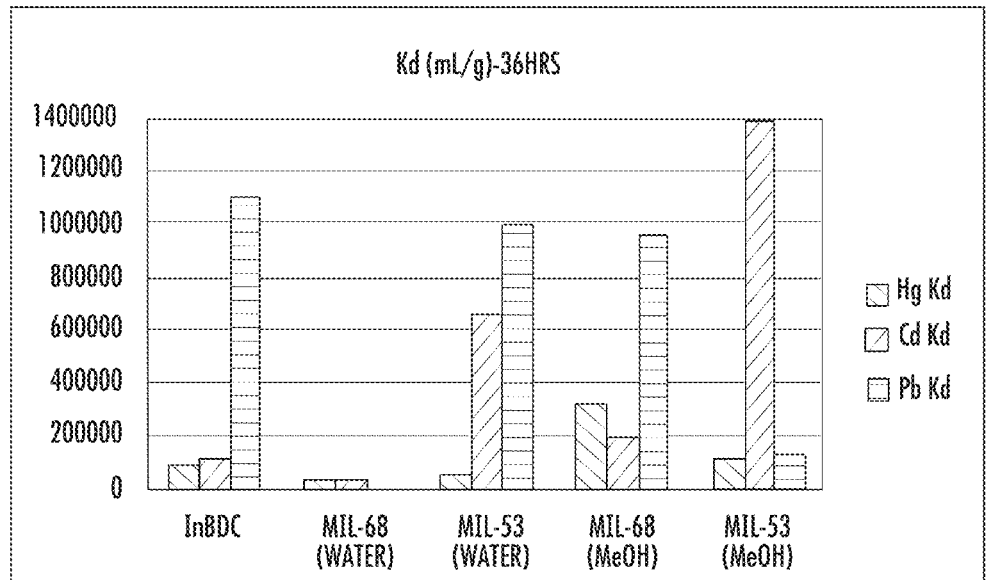
FIG. 75 displays distribution coefficients (mL solution/g sorbent) after 36 hours contact with MOF-templated $In_2S_3$ sorbents. Chart displays MOF template and solvent used for ligand exchange process. MeOH denotes methanol.
Figure 76:
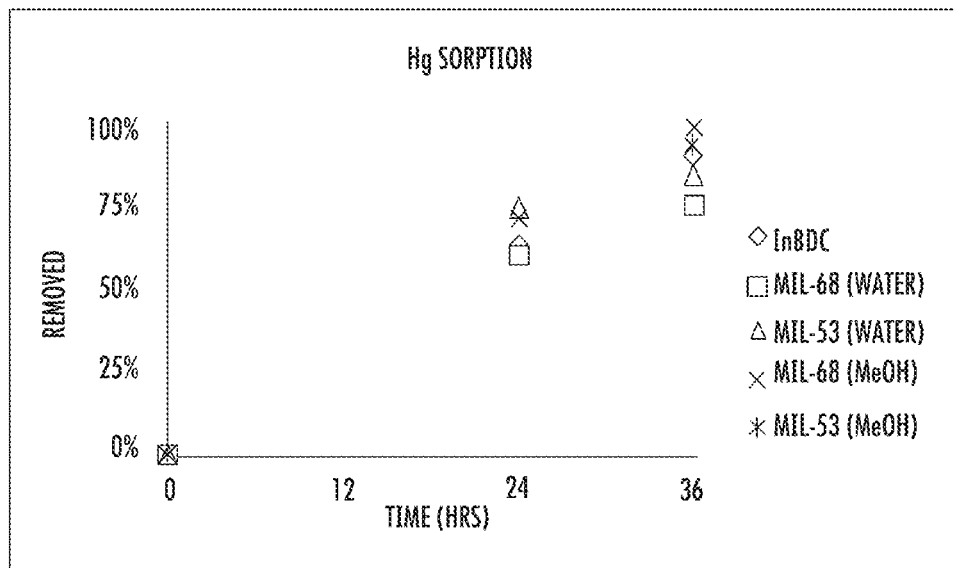
FIG. 76 shows a summary of percent Hg removed by $In_2S_3$ materials at 24 and 36 hours. Legend denotes MOF template and solvent used for ligand exchange process. MeOH denotes methanol.
Figure 77:
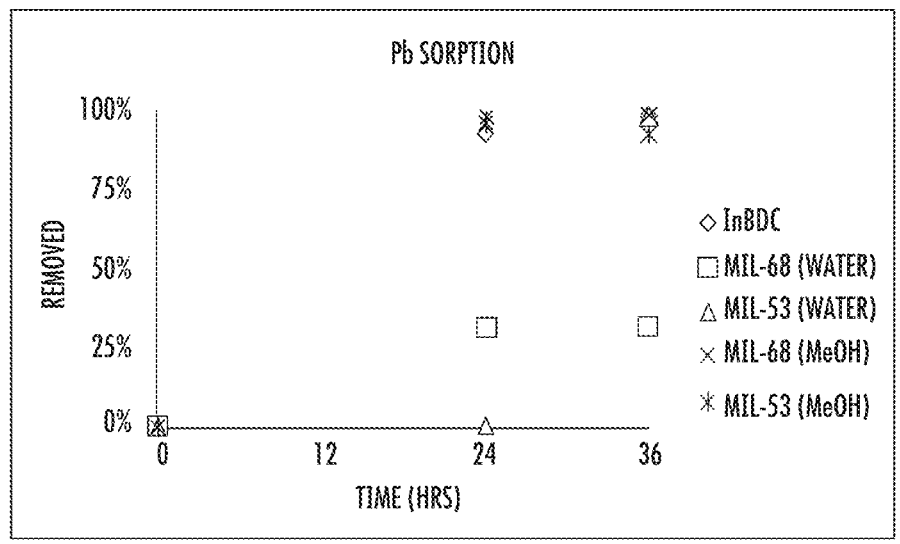
FIG. 77 shows a summary of percent Pb removed by $In_2S_3$ materials at 24 and 36 hours. Legend denotes MOF template and solvent used for ligand exchange process. MeOH denotes methanol.
Figure 78:
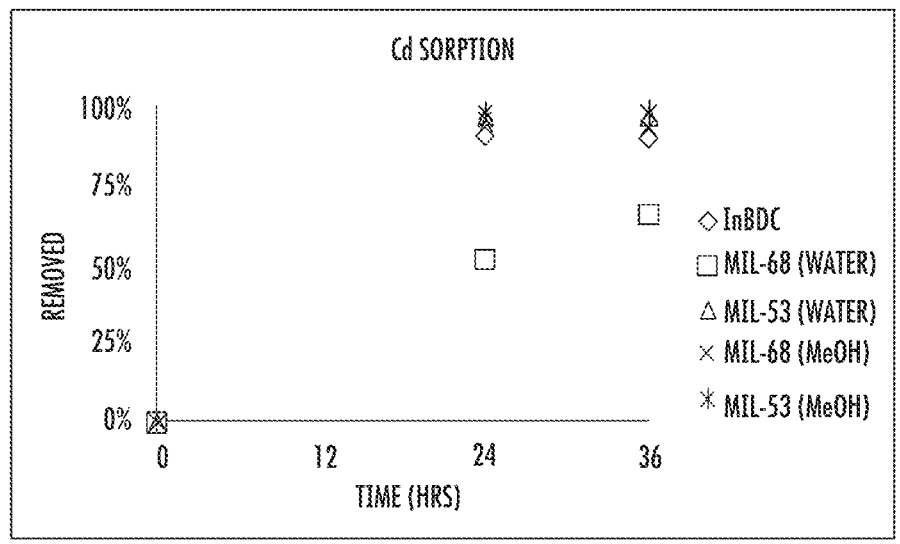
FIG. 78 shows a summary of percent Cd removed by $In_2S_3$ materials at 24 and 36 hours. Legend denotes MOF template and solvent used for ligand exchange process. MeOH denotes methanol.

Hard-soft acid base theory indicates sulfides should have a high affinity for "soft" metals, such as Au, Ag, Hg, Pb, or Cd. These porous indium sulfides were investigated for sorption of Hg, Pb, and Cd over a span of 36 hours. Preliminary results indicate good sorptive properties for all materials, with rapid saturation occurring in less than 24 hours for Cd and Pb (FIG. 70, FIG. 76-FIG. 78). In$_2$S$_3$-68 (M) and In$_2$S$_3$-53(M) absorbed approximately 100% of all Cd or Pb in solution after 24 hours, while In$_2$S$_3$-53(W) accomplished the same in 24 hours for Cd and 36 hours for Pb. These materials also absorbed between 80% and 95% of all Hg in solution after 36 hours (FIG. 73-FIG. 75). Maximum sorption capacities under these conditions are 96.9 mg/g, 92.4 mg/g, and 78.3 mg/g for Cd, Pb, and Hg, respectively, all of which were achieved by the aforementioned MOF-templated indium sulfide materials, often in less than 24 hours of contact (FIG. 71, FIG. 74). In contrast, In$_2$S$_3$-68(W) performed poorly, absorbing less than 75% of Cd or Hg and less than 50% of Pb. Though the surface area for this material was greatest, the relatively low sorptive properties we believe are due to having a lower proportion of large diameter pores compared to the other materials.

Figure 72:
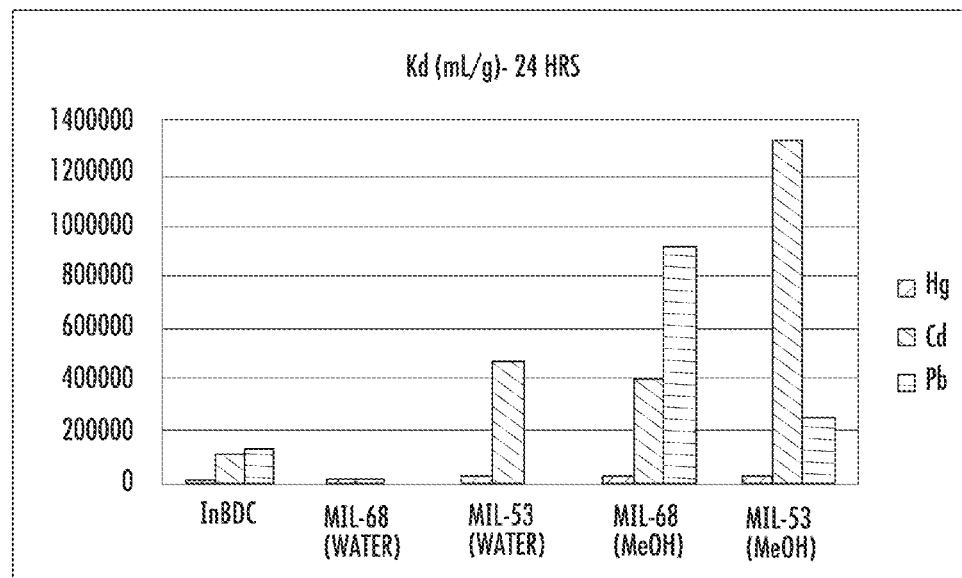
FIG. 72 displays distribution coefficients (mL solution/g sorbent) after 24 hours contact with MOF-templated $In_2S_3$ sorbents. Chart displays MOF template and solvent used for ligand exchange process. MeOH denotes methanol.

Distribution coefficients (K$_d$) revealed particularly strong affinity of In$_2$S$_3$-53(W) for Cd, and Pb, while In$_2$S$_3$-68(M) had strong affinity for Pb, and In$_2$S$_3$-53(M) had remarkable affinity for Cd (FIG. 72, FIG. 75). While these particular distribution coefficients are very impressive, it is also worth noting that the relatively low values in this plot are often higher than 1×10$^5$ mL/g, which is considered very good for most other sorbent materials.

Importantly, control experiments performed with crystalline In$_2$S$_3$ revealed minimal sorptive properties. Sorption isotherms obtained with In$_2$S$_3$ revealed saturation capacities of approximately 6.5 mg Cd/g In$_2$S$_3$ and 7.6 mg Pb/g In$_2$S$_3$. We can attribute this poor sorption to the lack of porosity and absence of accessible thiol groups on crystalline In$_2$S$_3$. By preparing porous amorphous indium sulfides by wet-processing of MOF templates, these delicate thiol functionalities can be incorporated, resulting in the observed sorption behavior.

The present disclosure provides a series of porous inorganic, materials from MOF templates. This novel ligand extraction process allowed the preparation of the first well-defined porous Ti and Zr materials as well as new porous metal phosphates that are prepared from MOF precursors. By varying the digest solution, one may alter the compositions, surface areas, and pore sizes of the resulting materials for various sorption processes and radionuclide separations. The wet processing techniques result in formation of surface hydroxyl or thiol groups and diverse metal geometries, neither of which are accessible through thermal preparations. ZrOxyPhos was superior in decontaminating HLW simulant, removing Sr, Pu, Np, and U to a significantly greater extent than the current state-of-the-art sorbent and with a lower quantity of metal. ZrPhos and TiOx extracted almost all Ln from slightly acidic aqueous solution, with TiOx showing up to 21× more selectivity for Am over early lanthanides. TiOxyPhos showed significant affinity for Sr in seawater, removing as much Sr in 1 hour as SrTreat® removes in 24 hours. The rapid uptake of radionuclides in these experiments surpassed the state-of-the-art sorbents due to the high porosity, accessibility of coordinating metal sites, presence of surface hydroxyl groups, and well-defined morphologies of these novel materials. In$_2$S$_3$-68(M), In$_2$S$_3$-53

(W), and In$_2$S$_3$-53(M) all displayed good sorption of Hg, Cd, and Pb from aqueous solutions, with distribution coefficients as high as 1.4×10$^6$ mL/g. The selective ligand extraction techniques disclosed herein are useful for preparing porous inorganic materials for use in radionuclide extractions and other diverse applications.

REFERENCES CITED

Hobbs, D. T.; Barnes, M. J.; Pulmano, R. L.; Marshall, K. M.; Edwards, T. B.; Bronikowski, M. G.; Fink, S. D. (2005) Strontium and actinide separations from high level nuclear waste solutions using monosodium titanate 1. simulant testing. *Separation Science and Technology*, 40 (15): 3093.

Nyman, M. and Hobbs, D. T., "A Family of Peroxo-titanate Materials Tailored for Optimal Strontium and Actinide Sorption." *Chem. Mater* 2006, 18 (26): 6425.

The above references are incorporated herein by reference.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention. In addition, it should be understood that aspects of the various embodiments may be interchanged, both in whole, or in part. Therefore, the spirit and scope of the invention should not be limited to the description of the preferred versions contained therein.

That which is claimed:

1. A method for preparing a sorbent material comprising:
    providing a MOF template having a plurality of bridging ligands;
    removing the bridging ligands by exposing the MOF template to a solution selected from the group consisting of acids and bases;
    incorporating into the MOF template an inorganic moiety dissolved in the solution, thereby forming an inorganic sorbent material having a morphology similar to the MOF and wherein the sorbent material has nano-absorbent properties.

2. The method according to claim 1 wherein MOF template is selected from MOF prepared using a metal selected from the group consisting of from Group IV metals through Group XIII metals and combinations thereof.

3. The method according to claim 1 wherein the MOF template contains organic bridging ligands.

4. The method according to claim 1 wherein the sorbent material has a pore size ranging from about 5.6 Å to about 100 Å.

5. The method according to claim 1 wherein the sorbent material has a volumetric surface area equal to or greater than the volume the surface area of the MOF template.

6. The method according to claim 1 wherein the inorganic material is selected from the group consisting of Titanium Oxide, Titanium Oxide Phosphate, Titanium Phosphate, Zirconium Oxide, Zirconium Oxide Phosphate, Zirconium Phosphate, In$_2$S$_3$, and NaInS$_2$.

7. The method according to claim 1 wherein the sorbent material has a surface area ranging from about 10 m$^2$g$^{-1}$ to about 401 m$^2$g$^{-1}$.

8. The method according to claim 1 comprising the additional step of treating the sorbent material with a peroxide to improve the sorption performance.

9. The method according to claim 1 comprising the additional step of treating the sorbent material with Na$_2$S or Na$_2$Se gas to form a highly porous metal chalcogenide.

* * * * *